(12) United States Patent
Thampy

(10) Patent No.: US 11,165,800 B2
(45) Date of Patent: Nov. 2, 2021

(54) CLOUD BASED SECURITY MONITORING USING UNSUPERVISED PATTERN RECOGNITION AND DEEP LEARNING

(71) Applicant: Oracle International Corporation, Redwood Shores, CA (US)

(72) Inventor: Sajjit Thampy, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 329 days.

(21) Appl. No.: 15/989,815

(22) Filed: May 25, 2018

(65) Prior Publication Data

US 2019/0068627 A1 Feb. 28, 2019

Related U.S. Application Data

(60) Provisional application No. 62/551,159, filed on Aug. 28, 2017.

(51) Int. Cl.
*H04L 29/06* (2006.01)
*G06N 99/00* (2019.01)
(Continued)

(52) U.S. Cl.
CPC ......... *H04L 63/1425* (2013.01); *G06N 5/047* (2013.01); *G06N 20/00* (2019.01);
(Continued)

(58) Field of Classification Search
CPC . H04L 63/1425; H04L 67/10; H04L 63/1416; H04L 63/20; H04N 12/0023;
(Continued)

(56) References Cited

U.S. PATENT DOCUMENTS

| 7,603,452 B1 | 10/2009 | Guo |
| 9,692,789 B2 | 6/2017 | Kirti et al. |

(Continued)

FOREIGN PATENT DOCUMENTS

| EP | 3080741 B1 | 3/2018 |
| WO | 2015088702 A2 | 6/2015 |
| WO | 2017147525 A1 | 8/2017 |

OTHER PUBLICATIONS

International Application No. PCT/US2014/065523, International Search Report and Written Opinion dated Feb. 23, 2015, 12 pages.
(Continued)

*Primary Examiner* — Joseph P Hirl
*Assistant Examiner* — Thomas A Gyorfi
(74) *Attorney, Agent, or Firm* — Kilpatrick Townsend & Stockton LLP

(57) ABSTRACT

Provided are systems and methods for a cloud security system that learns patterns of user behavior and uses the patterns to detect anomalous behavior in a network. Techniques discussed herein include obtaining activity data from a service provider system. The activity data describes actions performed during use of a cloud service over a period of time. A pattern corresponding to a series of actions performed over a subset of time can be identified. The pattern can be added a model associated with the cloud service. The model represents usage of the cloud service by the one or more users. Additional activity data can be obtained from the service provider system. Using the model, a set of actions can be identified in the additional activity data that do not correspond to the model. The set of actions and an indicator that identifies the set of actions as anomalous can be output.

20 Claims, 24 Drawing Sheets

(51) Int. Cl.
*G06N 5/04* (2006.01)
*G06N 20/00* (2019.01)
*H04W 12/12* (2021.01)
*H04L 29/08* (2006.01)
*H04W 12/30* (2021.01)

(52) U.S. Cl.
CPC .......... *H04L 63/1416* (2013.01); *H04L 63/20* (2013.01); *H04L 67/10* (2013.01); *H04W 12/12* (2013.01); *H04W 12/35* (2021.01)

(58) Field of Classification Search
CPC ........ H04N 12/12; G06N 20/00; G06N 5/047; G06N 20/20; G06N 5/003; G06N 7/005; G06N 3/0454
See application file for complete search history.

(56) References Cited

U.S. PATENT DOCUMENTS

| | | |
|---|---|---|
| 10,063,654 B2 | 8/2018 | Kirti et al. |
| 2003/0048174 A1 | 3/2003 | Stevens et al. |
| 2011/0185055 A1 | 7/2011 | Nappier et al. |
| 2013/0036459 A1 | 2/2013 | Liberman et al. |
| 2013/0066945 A1 | 3/2013 | Das et al. |
| 2013/0191921 A1 | 7/2013 | Mahaffey et al. |
| 2015/0106935 A1 | 4/2015 | Burns et al. |
| 2015/0319185 A1* | 11/2015 | Kirti ............... H04L 67/306 726/23 |
| 2017/0251013 A1 | 8/2017 | Kirti et al. |
| 2017/0295199 A1 | 8/2017 | Kirti et al. |
| 2017/0353477 A1* | 12/2017 | Faigon ............... G06N 7/005 |
| 2018/0234302 A1* | 8/2018 | James ............... H04L 41/145 |

OTHER PUBLICATIONS

Gupta et al., Identification of Effective Publication Cloud on Query, International Journal of Computer Trends and Technology (IJCTT)—vol. 4, Issue 7, Jul. 2013, 2003-2007, 5 pages.

International Application No. PCT/US2017/019508, International Search Report and Written Opinion dated May 2, 2017, 10 pages.

* cited by examiner

CLOUD BASED SECURITY MONITORING USING UNSUPERVISED PATTERN RECOGNITION AND DEEP LEARNING

CROSS-REFERENCES TO RELATED APPLICATIONS

This application claims priority to U.S. Provisional Application 62/551,159, filed on Aug. 28, 2017, which is incorporated herein by reference in its entirety.

BACKGROUND

Cloud service providers provide various services in the "cloud;" that is, over a network, such as the public Internet, and remotely accessible to any network-connected client device. Examples of the services models used by cloud service providers (also referred to herein as "cloud providers" or "providers") include infrastructure as a service (IaaS), platform as a service (PaaS), software as a service (SaaS), and network as a service (NaaS). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to customer on a subscription basis, and is centrally hosted by the cloud provider. Under this model, applications can be accessed, for example, using a web browser. NaaS providers provide network services to customers, for example by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users. Examples of service providers include corporations such as Box, Dropbox, Microsoft, Docusign, Google, Salesforce, Oracle, Amazon, and others. Each provider may provider multiple different services, but the providers often have no affiliation with one another, including not sharing infrastructure and security boundaries. Service provider systems are often also heavily secured and closed.

The reliance of organizations on computing environments has led to widespread adoption of applications for operations such as collaboration, sales and customer services, infrastructures, and so on. Applications provided through a cloud environment may enable organizations to rollout services faster and without much upfront investment on data center, hardware, software, and deployment projects. The accessibility of applications can increase employee productivity due to the availability of cloud enabled services from many locations, such as at work, at home, at a hotel, and other locations.

Because organizations and/or their users may subscribe to the services of many different cloud services providers, an organization may need ways to ensure the organization's own systems do not come to harm through the use of cloud services. Use of cloud services can lead to security risks that are not present when an organization hosts and manages services within the organization itself.

BRIEF SUMMARY

In various implementations, provided are systems and methods for a cloud security system that learns patterns of user behavior and uses the learned patterns to detect anomalous behavior. For example, the cloud security system can use machine learning techniques to learn patterns of user behavior, where the patterns represent actions regularly and/or habitually taken by users in using a cloud service. In various examples, the patterns can capture actions that occur over a span of hours, days, weeks, months, or another time period. In various implementations, the cloud security system can use the learned patterns to identify user behavior that does not fit within the learned patterns, which may indicate a security incident.

In various implementations, provided are methods, including computer-implemented methods, computing systems implementing a security management system, and computer-readable medium including instructions for a security management system that learns patterns of user behavior and uses the learned patterns to identify anomalous activity in a network. In various implementations, the techniques discussed herein include obtaining activity data from a service provider system. The activity data describes actions performed during use of a cloud service over a period of time. The actions are performed by one or more users associated with a tenant, where the service provider system provides the tenant with a tenant account. The tenant account enables the one or more users to access the cloud service. The techniques further include identifying a pattern in the activity data. The pattern corresponds to a series of actions performed over a subset of time during the period of time. The techniques further include adding the pattern to a model associated with the cloud service. The model represents usage of the cloud service by the one or more users. The techniques further include obtaining additional activity data from the service provider system. The techniques further include identifying, using the model, a set of actions in the additional activity data that do not correspond to the model. The techniques further include outputting the set of actions and an indicator that identifies the set of actions as anomalous.

In some aspects, identifying the pattern includes mapping the activity data according a set of usage levels associated with the cloud service. Mapping the activity data can produce normalized activity data. In some aspects, identifying the pattern includes using a sliding window to identify local maxima in the activity data. The pattern can include a local maximum.

In some aspects, techniques provided by the methods, systems, and computer-readable medium discussed above further include determining that a set of patterns in the activity data are similar. In these aspects, the techniques further include generating a combined pattern by combining the set of patterns.

In some aspects, techniques provided by the methods, systems, and computer-readable medium discussed above further include generating the model using a machine learning program. The model is generated using a plurality of patterns determined from the activity data.

In some aspects, identifying the set of actions further includes using a plurality of models including the model. Each model can be generated using a different machine learning program. In some aspects, outputting the set of actions is based on the set of actions not corresponding to a majority of the plurality of models. In some aspects, each model from the plurality of models is associated with a weight, and whether the set of actions does not correspond to a model from the plurality of models is determined by the weight associated with the model. In some aspects, outputting the set of actions is based on the set of actions not corresponding to at least one model from the plurality of models.

The foregoing, together with other features and implementations will become more apparent upon referring to the following specification, claims, and accompanying drawings.

DETAILED DESCRIPTION

Figure 1:
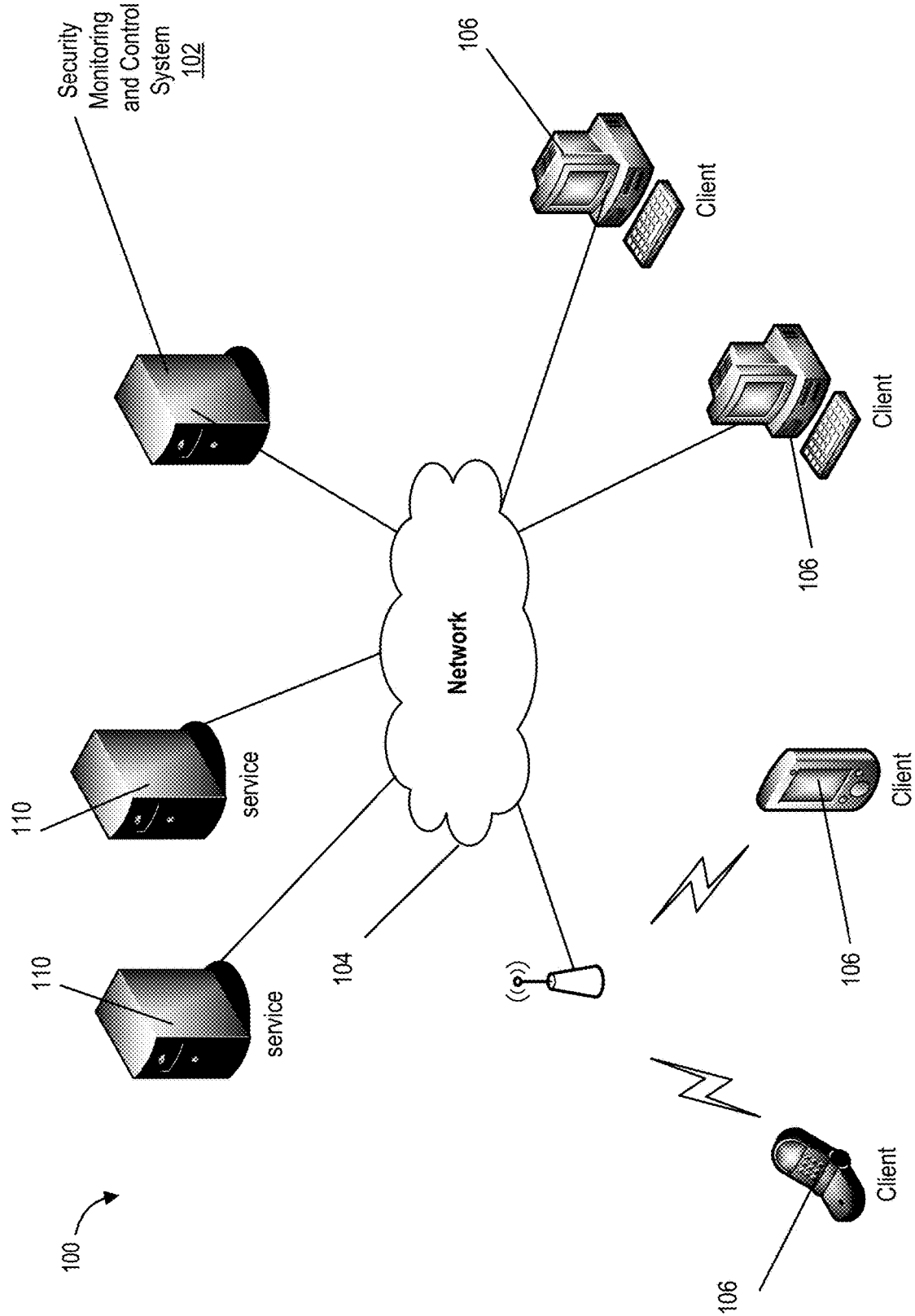
FIG. 1 illustrates an example of a system that includes a security monitoring and control system.

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, digital signal processors (DSPs), or the like. In some examples, some or all of the processing units can be implemented using customized circuits, such as application specific integrated circuits (ASICs), or field programmable gate arrays (FPGAs).

Cloud service providers provide API's that enable cloud security services, such as the Oracle Cloud Access Security Brokers service, to gain access to event logs that record users' use of a cloud service. The event logs can include, for example, an action performed, a resource that was affected by the action, a time stamp for the time at which the action was performed, and/or a user that performed the action, among other things.

Some cloud security services use policy-based monitoring to ensure that users' use of a cloud service does not pose a risk to the organization the users are a part of. Policy-based monitoring includes use of security rules, which may be generated by security personnel. A security rule, when triggered, can cause the security service to issue an alert, or execute some other action.

Policy-based monitoring can be easy to implement, but may only be effective for simple monitoring tasks. Policy-based monitoring may not be able to proactively learn user behavior, and use learned behavior to detect anomalous behavior. While some cloud security services use behavioral modeling, these services may only use thresholds to identify anomalous behavior. For example, when a behavioral model includes a user's average number of logins per day, the security service may trigger an alert when the user's number of logs exceeds this average number. In this and other examples, the security service may be using the user's past behavior as a proxy for the degree of anomalous behavior exhibited by the user.

In various implementations, provided are systems, methods, and computer-program products for a cloud security service that learns patterns of user behavior, and uses the learned patterns to detect anomalous behavior. In various implementations, the service can scan time series to find frequent or regular patterns of user behavior. Machine learning techniques can be used to generate models from the detected patterns. The models can then be used with machine learning techniques to recognize similar patterns in incoming user activity data, and trigger alerts or other actions when behavior is found that does not correspond to a known pattern.

Cloud service providers can provider various services to customers of the cloud services providers. Customers can be individual users and/or organizations, where an organization can include multiple users. An organization is an entity that brings people and resources together to serve a common purpose or purposes, within which user accounts are under common administration. Examples of organizations include companies, universities, utilities, and governmental entities, among others. Users are digital entities associated with a user identifier, such as a user name, and associated with one or more user accounts. Users of an organization, for example, can be associated with at least one user account that is maintained by the organization. Activities of a user may be driven by one person (e.g., a human being), multiple people, and/or software programs. Users and organizations can subscribe to the services of a cloud services provider by registering with the service provider. In most cases, the cloud services provider provides the users and organizations with an account within the systems of the services provider. Subscribers of a cloud service provider are also referred to herein as tenants.

The services provided by a cloud services provider, which can include network infrastructure, development and/or hosting platforms, and/or software, are hosted by the cloud services provider. Hosting the services means that the services run on and/or are maintained by computing systems under the control of the cloud services provider. The cloud services providers provide services to subscribers over a network, such as the Internet, and the subscribers use the services using computing systems under the control of each individual subscriber. Subscribers are also referred to herein as tenants of a cloud services provider.

Within the cloud services ecosystem, a security monitoring and control system can assist the individual users and organizations in monitoring use of cloud services, to ensure the cloud services are not being used for malicious or illegal purposes.

FIG. 1 illustrates an example of a system 100 that includes a security monitoring and control system 102 (also referred to herein as "security management system" and "security system"). The security monitoring and control system 102 may be implemented within a computing environment that includes a communication network 104. The network 104 may be a private network that can communicate with a public network (e.g., the Internet) to access services 110 provided by a cloud services provider. Examples of communication networks include a mobile network, a wireless network, a cellular network, a local area network (LAN), a wide area network (WAN), other wireless communication networks, or combinations of these and other networks. The security monitoring and control system 102 may be administered by a service provider, such as a security service provider (sometimes referred to as cloud access security brokers (CASB)) that configures and manages security for an organization that is using the security monitoring and control system 102. The security monitoring and control system 102 may be implemented by or provided in a product and/or a service offered by Oracle Corporation.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with service provider, where an enterprise account encompasses or aggregates a number of individual user accounts.

In various implementations, the security monitoring and control system 102 analyzes the activity of users using cloud services clouds using machine learning and other algorithms to perform threat detection and to provide recommendations concerning appropriate responses to different categories of threats. The analytics can include determining models of normal and/or abnormal behavior in user activity and detecting patterns of suspicious activity occurring at one cloud services provider or multiple cloud services providers. Some patterns may involve detecting the same action or different actions in the activity logs of multiple services providers, where the actions are associated with a same user account or network address. Analytics may also include providing an alert and recommending remedial measures with the service provider where suspicious activity is detected and/or remedial measures to be taken with service providers other than those showing suspicious activity. In various implementations, processes for detecting and analyzing applications on devices within a network of an organization involve collecting and combining information from various data sources.

In various implementations, the security monitoring and control system 102 can enable tenants of a cloud services provider to view information about use of the provider's services by the user accounts of each tenant. For example, the security monitoring and control system 102 can provide an interface, such as a graphical user interface, and can display user account activity with respect to the services of a cloud services provider. As a further example, the interface can display analytics reports and enable tenants to set security controls for the services and/or for user accounts. In some examples, the security monitoring and control system 102 can provide pre-sets with different levels of security, where selecting a pre-set selects the security configuration for one or more services. Additional features of the security monitoring and control system 102 will be discussed further below.

A system for security monitoring and control, in various implementations, can include multiple components that may be located on a single hardware platform or on multiple hardware platforms that are in communication with each other. Components can include software applications and/or modules that configure a server or other computing device to perform processes for discovery and management as will be discussed further below.

An example system 100 including a security monitoring and control system 102, client devices 106 that can be used to access the security monitoring and control system 102, and services 110 to be monitored is illustrated in FIG. 1. As disclosed herein, a "client" (also disclosed herein as a "client system" or a "client device") may be a device or an application executing on a device. The system 100 includes a number of different types of client devices 106 that each is able to communicate with a network 104. Using the network 104, the client devices 106 can communicate with the security monitoring and control system 102 and present a graphical interface for interacting with the security monitoring and control system 102. The security monitoring and control system 102 can communicate with the providers of the services 110 to retrieve security configurations, application data, and other information, and to set security controls as will be discussed further below.

Figure 2:
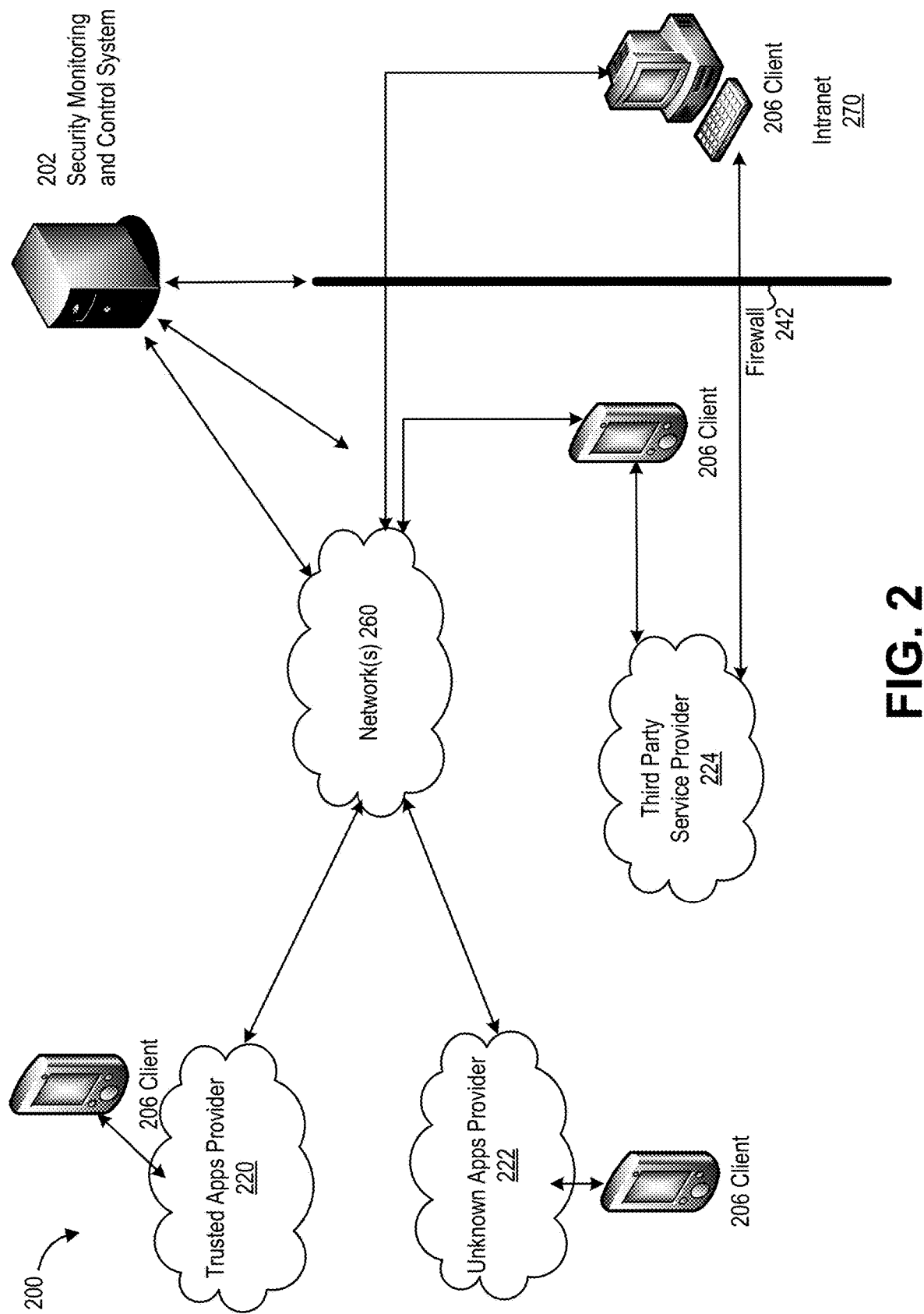
FIG. 2 illustrates an example of a system in which a security monitoring and control system can monitor the security of cloud services for an organization.

FIG. 2 illustrates an example of a system 200 in which a security monitoring and control system 202 can monitor the security of cloud services for an organization. In this example system, the security monitoring and control system 202 can monitor the client devices 206 of an organization when client devices 206 are connected to the private network (e.g., an Intranet 270) of the organization, or are connected to non-private networks 260, such as the Internet. When on the private network of the organization, the client devices 206 may be behind a firewall 242 and/or another security perimeter that separates the private network from other networks. The client devices 206 can include devices owned by the organization and the personal devices owned by individual users.

User accounts of the organization that are designated as administrative accounts can manage the operations conducted by the security monitoring and control system 202 in monitoring security for the organization. The security monitoring and control system 202 can be integrated into the computing environment of the organization, can be external (e.g., outside the firewall 242) of the computing environment of the organization, or both. In some implementations, the security monitoring and control system 202 can provide services as a cloud-based service that are accessible over the network 260.

Each of client devices 206 may be used to access applications that are authorized or unauthorized for use on a device associated with the organization. An authorized application is one that the organization has approved for use. Approval can include, for example, vetting the application to ensure the application is secure, installing and/or maintaining the application, and/or otherwise providing user accounts of the organization with access to the application (as is the case with cloud-based applications). An unauthorized application is one that the organization may not have specifically approved, and that a user is using at the user's own discretion.

Cloud-based applications can be authorized or unauthorized for use within an organization. Cloud-based applications may be provided by different service providers, such as a trusted apps provider 220 and an unknown apps provider 222. A trusted apps provider 220 is one that is known and has been vetted by the organization, and/or that has a well-known reputation. An unknown apps provider 222 is one that may not have been previously certified by the organization for use by the organization's users, and/or is too new to have any sort of reputation.

In some cases, the client devices 206, whether located internal and external to the organization's network, can access cloud services (e.g., as provided by a trusted apps provider 220 or an unknown apps provider 222) through a third-party service provider 224. For example, the client device 206 can first access a service provided by the third-party service provider 224, and through this service, access the services of other cloud services providers. The service of the third-party service provider 224 can be, for example, a portal service that enables users to locate and access the applications and services of other cloud service providers.

In various implementations, the security monitoring and control system 202 can monitor the use of cloud-based applications and services by individual user accounts and/or the user accounts associated with an organization. In some implementations, the security monitoring and control system 202 uses network data, obtained from monitoring the client devices 206 being used to access the cloud-based services. In some implementations, the security monitoring and control system 202 uses activity logs maintained by the service providers, where the activity logs record actions taken as a service of a service provider is used. In some implementations, other data sources, such as third-party feeds, and combinations of data sources can be used to monitor the use of a cloud-based service.

In many cases, an organization provides the users of the organizations with client devices the users can use to access the organization's network and other resources. In some cases, users use personal devices, also referred to herein as "bring your own devices" (BYOD) to access the resources of an organization and/or to access the services of a cloud services provider.

Figure 3:
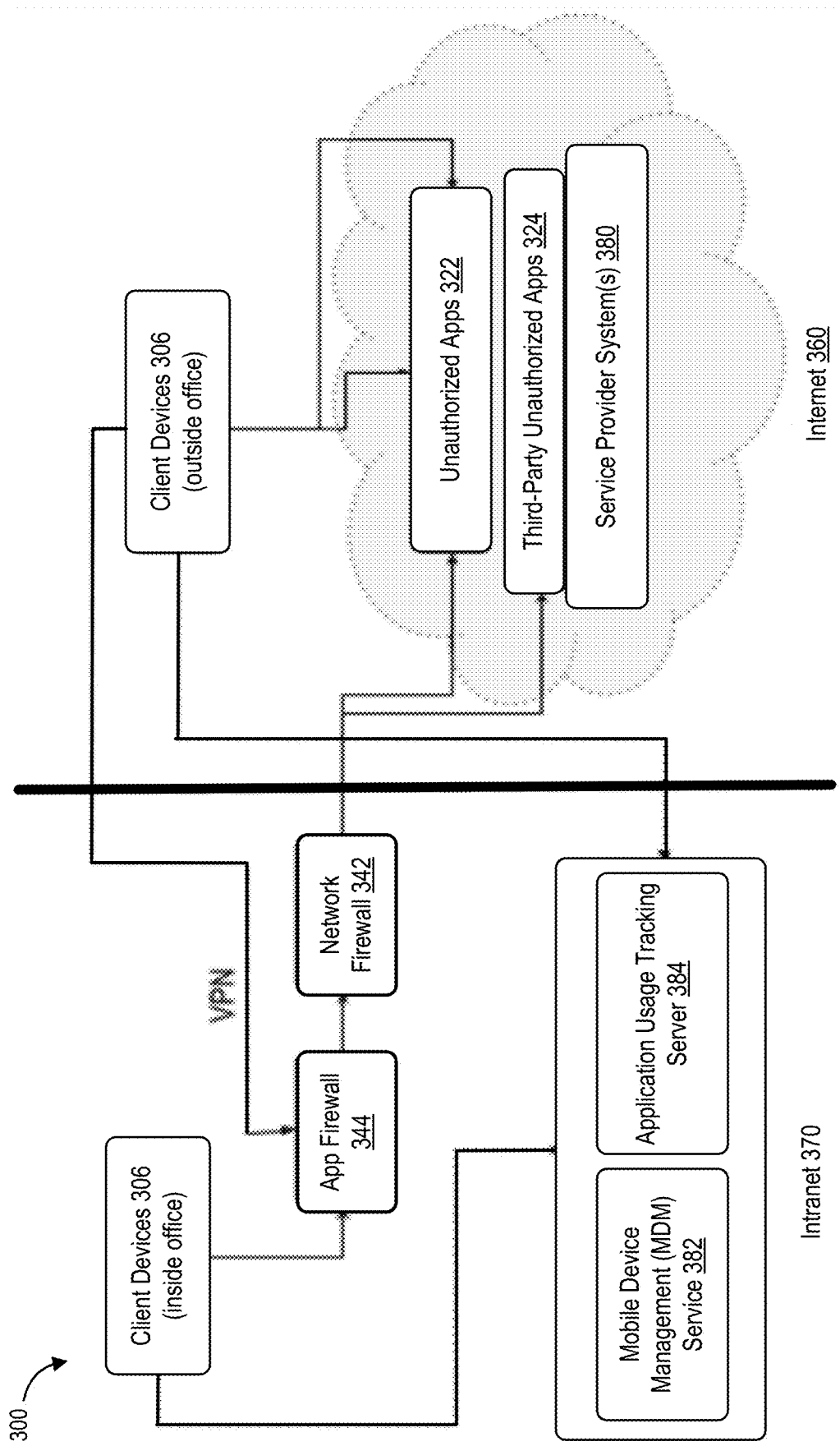
FIG. 3 illustrates an example of a system that includes various client devices that can be used to access applications that are hosted within and outside an organization.

FIG. 3 illustrates an example of a system 300 that includes various client devices 306 that can be used to access applications that are hosted within and outside an organization. The client devices 306 can include personal devices and company-owned desktops, laptops, and other types of devices.

Applications hosted outside the organization (e.g., on the Internet 360) may be provided by a service provider system

380. A service provider system may also be referred to herein as a "provider system." The service provider system 380 may be operated and managed by a service provider. A service provider's applications may include unauthorized applications 322 and third party unauthorized applications 324, among others.

The organization can enable users that are members of the organization to use sanctioned, approved applications. Sanctioned applications can include both internal and external applications. The users can use these applications for daily tasks. For example, the organization's users can use Salesforce for tracking customer activities, Google Apps or Office 365 for collaboration, or Box for sharing files, among other services.

Authorized applications may allow other unsanctioned applications to be launched from within the authorized applications. Applications that can run within or be launched from another application are referred to herein as third-party applications. The third-party applications may operate cooperatively with the application through which the third-party applications run. For example, the underlying application may allow the third-party applications to access data, user account information, or other information that is associated with a user account of the underlying application.

Third-party applications can present a security risk for an organization. In some cases, these applications can access sensitive data without the organization having enabled explicit access. Determining that third-party applications are being accessed from within the organization (e.g., on an Intranet 370) may thus be an important aspect of ensuring the security of the organization.

In various implementations, a security monitoring and control system can discover application usage, including third-party applications that have not been explicitly approved by an organization, but that may be available through approved applications. In various implementations, the security monitoring and control system can collect data from multiple sources, and can correlate and analyze the data to identify possible threats. In some cases, the correlation and analysis can include using threat intelligence information. Collecting data from multiple sources can provide a greater depth of visibility and better compliance coverage compared to conducing discovery operations using only data from network devices.

When an organization's users access unsanctioned applications from an internal network of the organization, data can be collected about the accesses. Such data can include, for example, connectivity-related information such as a destination network address and/or a network address from which the access originated, and other information such as a timestamp for the access. This and other data can be recorded by network systems and devices, such as an application firewall 344 and/or a network firewall 342, as well as routers and other network infrastructure devices. Some application firewalls can also record identity information for a user account that made an access. This information may allow for finding the actual user who is using the unsanctioned application.

In some examples, when an user installs an application on the personal device, such as a smartphone or tablet, then details of the installed application can be discovered by a Mobile Device Management (MDM) service 382. The MDM service 382 may be running on the client device onto which the user installed the application. Similarly, when unsanctioned applications are installed on company-owned devices, installation details can be discovered centrally by a company-owned license management using a centrally managed security management tool (such as, for example, an application usage tracking server 384). Logs from these data sources can enable visibility to the unauthorized or unapproved applications installed on the client devices 306 of an organization.

Figure 4:
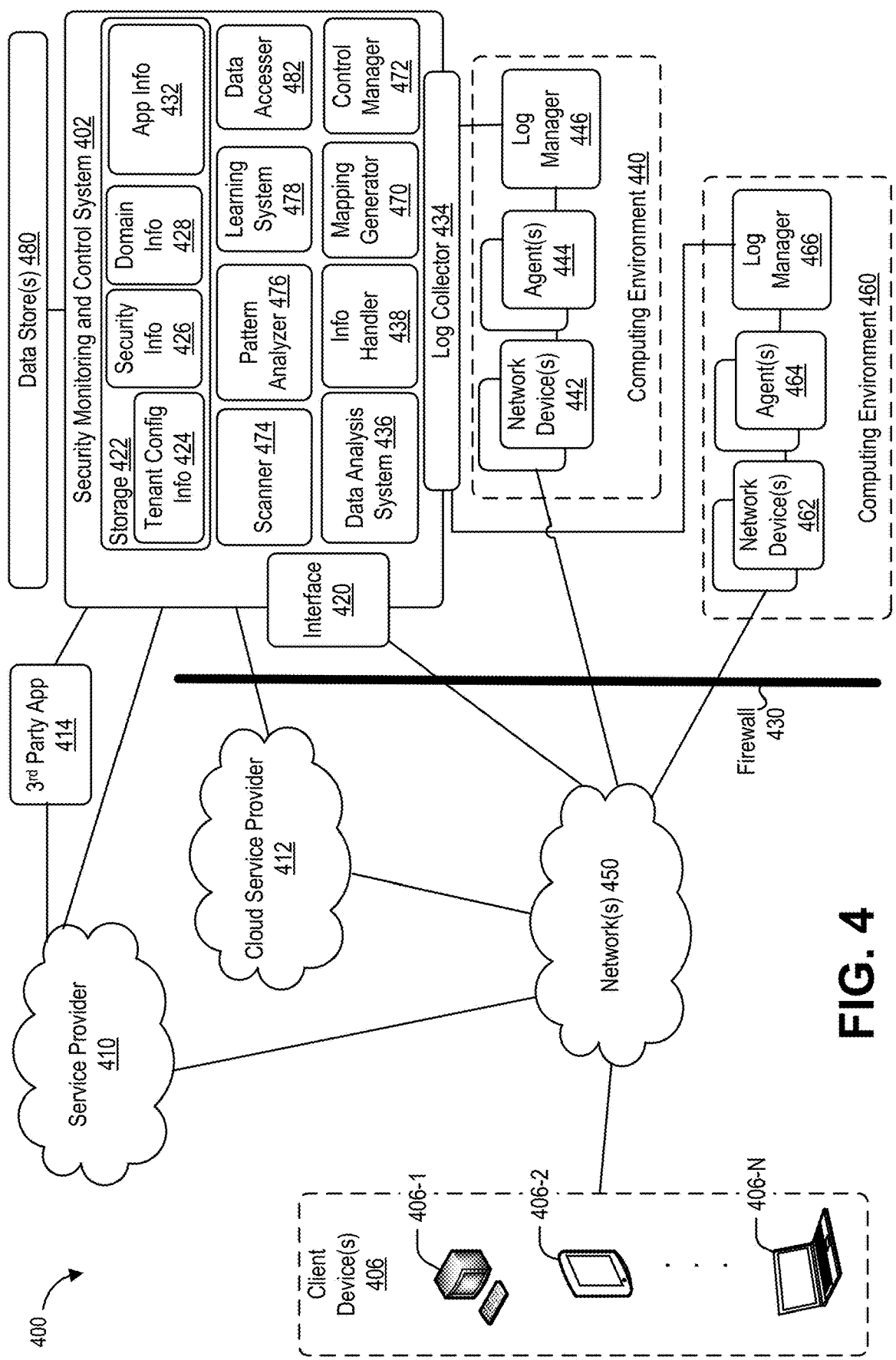
FIG. 4 illustrates an example of a system in which a user can operate a client device to access one or more applications from one or more service providers.

In various implementations, systems, methods, and machine-readable media are disclosed for discovery and management of security and access privileges for users and organizations that use cloud services. FIG. 4 illustrates an example of a system 400 in which a user can operate a client device, such as a client device 406-1, 406-2, . . . 406-N (collectively referred to as client devices 406), to access one or more applications (also referred to herein as "apps") from one or more service providers. For example, the system 400 may include one or more service providers, such as a first service provider 410 and a second service provider 412, both of whose systems are located outside the network of an organization (e.g., outside of the organization's firewall 430). Each service provider may provide one or more service via a network 450 or series of networks, which can include the Internet. The services hosted by the service provides can include, for example, infrastructure, platforms, networks, and applications, among other services. Each service provider may have a service provider system including one or more computer systems. One service provider system may be different from another, meaning that each service provider's system is controlled by different, possibly unrelated entities and/or the systems are not interconnected, other than possibly over the intermediate network 450.

Client devices 406 can include personal devices (e.g., BYOD) and/or devices under the management of an organization. Client devices 406 can access a service of a service provider while on a network of an organization, while on a network 450 external to the computing environment of the organization, or while connected to the network of the organization when on a network 450 external to the organization. In the latter case, the client device may be, for example, at a user's home and connected to a virtual private network (VPN) of the organization.

An application may be operated to access data and/or resources of a computing environment of an organization. For example, a remote desktop application, running on a client device, can provide the client device with access to a desktop that is hosted by and executing on the server located in the server room of the organization. Some client devices 406 may access an application and/or data for an application using a third party application 414 provided by a service provider. Applications may be registered with an organization for use by the users of the organization. Some applications may not be registered, and therefore, may be unauthorized, or unknown to an organization. Each application may enable use of and/or access to resources in a computing environment of an organization.

A security monitoring and control system may be able to discover unregistered and unknown applications and use of these applications from client devices 406 associated with an organization. The client devices 406 may be operated by users or employees of an organization. Some of these users can be administrators, who can use the client devices 406 to use the services provided by the security monitoring and control system 402. The security monitoring and control system 402 can provide services to discover and manage applications. Monitoring of these applications can be per user and/or per tenant.

The resources of an organization can include, without restriction, files, webpages, documents, web content, computing resources (e.g., processing resources, data storage resources, network resources, and other resources), and applications. For example, the system 400 may include resources such as applications and/or content accessible through those applications. A resource may be requested and accessed using an application. For example, an application may request access to a webpage from a resource server based on a Uniform Resource Locator (URL) identifying a requested resource. Resources may be provided by one or more computing systems, such as, for example, a resource server that provides access to one or more resources. Each resource may be associated with one or more attributes (also referred to herein as "resource attributes"). A resource attribute may indicate a type of the resource, usage of the resource, an action on the resource, other information about the resource, or combinations of these and other types of resources.

An organization may have one or more computing environments, such as a first computing environment 440 and a second computing environment 460, as provided by the illustrated example. The computing environments may be a cloud computing environment or an enterprise computing environment. The computing environments may provide a client device of a user of an organization with access to computing resources of the organization. The computing environments may include one or more computers and/or servers (e.g., one or more access manager servers), which may be general purpose computers, specialized server computers (including, for example, desktop servers, UNIX servers, mid-range servers, mainframe computers, rack-mounted servers, etc.), server farms, server clusters, distributed servers, or any other appropriate arrangement and/or combination of computing devices. A computing environment may run an operating system, a variety of additional server applications and/or mid-tier applications, including Hyper-Text Transport Protocol (HTTP) servers, File Transport Service (FTP) servers, Common Gateway Interface (CGI servers, Java servers, database servers, and the like). Exemplary database servers include, without limitation, those commercially available from Oracle, Microsoft, and the like. A computing environment may be implemented using hardware, firmware, software, or combinations thereof.

The computing environments may be implemented with one or more network devices. For example, the first computing environment 440 may be implemented with a first set of network devices 442 and the second computing environment 460 may be implemented with a second set of network devices 462. In this example, the first set of network devices 442 and the second set of network devices 462 may overlap or may be non-overlapping. The network devices may facilitate communication within the computing environment and/or with an external network (e.g., the example network 450) beyond firewall 430. Network devices may include, without restriction, routers, gateways, access points, bridges, or the like. Network data may be gathered at each of the network devices in a computing environment. The data may be gathered in log files.

The computing environments may be implemented as secure environments within an organization. For example, the first computing environment 440 and/or the second computing environment 460 can be behind a firewall 430 and/or other physical or software security infrastructure. In some examples, one or more firewalls may be used to protect a computing environment.

In various implementations, the security monitoring and control system 402 may provide web based client interfaces, dedicated application programs, application program interfaces (APIs), graphical interfaces, communication interfaces, and/or other tools for facilitating communication between the client devices 406 and the security monitoring and control system 402. For example, the security monitoring and control system 402 may include an interface 420 for exposing services of security monitoring and control system 402. In this example, the interface 420 may generate and/or provide an interface, such as a web-based application or an application that can run on the client devices 406, to enable the client devices 406 to access security monitoring and control system 402.

In various implementations, security monitoring and control system 402 may be implemented by a computing system. The computing system may include one or more computers and/or servers (e.g., one or more access manager servers), which may be general purpose computers, specialized server computers (including, by way of example, desktop servers, UNIX servers, mid-range servers, mainframe computers, rack-mounted servers, etc.), server farms, server clusters, distributed servers, or any other appropriate arrangement and/or combination thereof. The security monitoring and control system 402 may run an operating system and/or a variety of additional server applications and/or mid-tier applications, including HTTP servers, FTP servers, CGI servers, Java servers, database servers, and the like. Exemplary database servers include, without limitation, those commercially available from Oracle, Microsoft, and the like. The security monitoring and control system 402 may be implemented using hardware, firmware, software, or combinations thereof.

In various implementations, the security monitoring and control system 402 may include at least one memory, one or more processing units (or processor(s)), and/or storage. The processing unit(s) may be implemented as appropriate in hardware, computer-executable instructions, firmware, or combinations thereof. In some examples, the security monitoring and control system 402 may include several subsystems and/or modules. Each of these subsystems and/or modules in the security monitoring and control system 402 may be implemented in hardware, software (e.g., program code, instructions executable by a processor, etc.) executing on hardware, or combinations thereof. In some examples, the software may be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) may include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code. The computer-readable storage media may include instructions stored thereon, that when executed on a processor, perform the operations described herein.

In various implementations, the security monitoring and control system 402 may also provide services or software applications can include non-virtual and virtual environments. In some examples, these services may be offered to customers as web-based or cloud services or under Software as a Service (SaaS) model. The services offered by the security monitoring and control system 402 may include an application services. Application services may be provided by the security monitoring and control system 402 via a SaaS platform. The SaaS platform may be configured to provide services that fall under the SaaS category. The SaaS platform may manage and control the underlying software and infrastructure for providing the SaaS services. By using the services provided by the SaaS platform, customers can use applications executing in the security monitoring and control system 402, which may be implemented as a cloud infrastructure system. Customers can acquire the application services without the need for customers to purchase separate licenses and support. Various different SaaS services may be provided. Users operating client devices may in turn use one or more applications to interact with the security monitoring and control system 402, and through these applications can use the services provided by subsystems and/or modules of the security monitoring and control system 402.

In various implementations, the security monitoring and control system 402 may also include or be coupled to additional storage. The additional storage may be implemented using any type of persistent storage device, such as a memory storage device or other non-transitory computer readable storage medium. In some examples, local storage may include or implement one or more databases (e.g., a document database, a relational database, or other type of database), one or more file stores, one or more file systems, or combinations thereof. For example, the security monitoring and control system 402 can be coupled to or include storage 422 encompassing one or more data stores. The memory and the additional storage are all examples of computer-readable storage media. For example, computer-readable storage media may include volatile or non-volatile and/or removable or non-removable media implemented in any method or technology for storage of information such as computer-readable instructions, data structures, program modules, or other data.

In the example shown in FIG. 4, the storage 422 may include tenant configuration information 424 ("tenant config info"), which may include configuration information for tenants and tenant accounts, as well as user accounts associated with each tenant account. Such configuration information may include security settings for accessing a provider's services, log settings, and/or access settings (e.g., whitelists and blacklists). A user belonging to a tenant organization may have user accounts with various cloud applications. The tenant configuration information 424 may also have a tenant account with the cloud applications, where the tenant account can exercise management authority over the user accounts of users belonging to the organization. The user accounts of a user can be associated with the tenant account of the organization to which the user belongs. The association of user accounts to tenant accounts may be used in various ways, including to retrieve information about the activity of users associated with the tenant. As will be discussed further below, a tenant account's credentials may be used to log into service provider systems to retrieve data (e.g., audit trail data) concerning user accounts and activity with respect to services that are associated with the tenant account.

The storage 422 may further include user information about each user registered with an organization and/or tenancy of an organization. The storage 422 may also include application information 432 ("app info"), such as events recorded during use of an application and log information gathered from network activity in a computing environment. The application information 432 may include organization information obtained from a data source for an application. The storage 422 may include security information 426 ("security info") about security analysis performed by the security monitoring and control system 402. The security information 426 may include security information obtained from one or more data sources. The storage 422 may include domain information 428 ("domain info") about service providers of applications.

In various implementations, the information in the storage 422 may be maintained and curated by the security monitoring and control system 402 based on user activity and/or user input. For example, storage 422 may include registries such as those disclosed herein.

In various implementations, the security monitoring and control system 402 may be coupled to or in communication with one or more data stores 480. The data stores 480 may be implemented using any type of persistent storage device, such as a memory storage device or other non-transitory computer-readable storage medium. In some examples, local storage may include or implement one or more databases (e.g., a document database, a relational database, or other type of database), one or more file stores, one or more file systems, or combinations thereof. The data stores 480 may be implemented by and/or accessible as a service provided by a service provider system. The data stores 480 may include an interface for requesting data related to an application and/or a provider of an application.

In some implementations, the security monitoring and control system 402 may include a log collector system 434 that performs operations for collecting network data about activity in a computing environment. Network data may be collected from log files obtained from one or more computing environments being monitored. The log collector system 434 may be configured to communicate with one or more modules and/or subsystems implemented in a computing environment, and to use these communications to collect network data. For example, each of the first computing environment 440 and the second computing environment 460 may include a first log manager 446 and a second log manager 466, respectively. Each log manager can collect and/or aggregate data from one or more agents (e.g., a first set of agents 444 in the first computing environment 440 and/or a second set of agents 464 in the second computing environment 460) implemented to collect data about network activity. The data may be collected in the form of log files. Each log manager and/or agent may be implemented on a network device or in communication with a network device. The log collector system 434 may communicate with the log managers and/or agents to gather data about network activity within a respective computing environment.

In various implementations, the log managers and/or agents may be implemented in hardware, software (e.g., program code, instructions executable by a processor, etc.) executing on hardware, or combinations thereof. In some examples, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as RAM) and/or non-volatile (such as ROM, flash memory, etc.). The memory may be implemented using any type of persistent storage device, such as computer-readable storage media. In some examples, computer-readable storage media may be configured to protect a computer from an electronic communication containing malicious code. The computer-readable storage media may include instructions stored thereon, that when executed on a processor, perform the operations described herein.

In various implementations, the log collector system 434 may be configured to communicate with a service provider through an interface provided by the service provider. The log collector system 434 can obtain log files and/or event data from the service provider, where the log files and even data describe usage of services by one or more users. In various implementations, the log collector system 434 may be configured to communicate with a module (e.g., an agent) on a client device and/or a mobile device management service to obtain event information about application usage.

Data about network activity and application usage may be processed by a data analysis system 436 in security monitoring and control system 402. The data analysis system 436 may implement techniques disclosed herein to analyze network data (e.g., recorded in log files) to, for example, identify unique applications that were accessed, and other data points of interest. For example, the data analysis system 436 may perform operations to identify domain information about a domain of a service provider that provides an application. Domain information may be obtained from one or more data sources, such as the domain information 428 in the storage 422. Domain information may be obtained by performing a query of a data source and/or requesting a certificate from a service provider of the application.

In various implementations, the security monitoring and control system 402 may include an information handler system 438 ("info handler") that is configured to obtain information about and/or related to usage of an application. The information handler system 438 may communicate with one or more data stores 480 to obtain information. The information handler system 438 may manage and curate information stored in the storage 422. In some implementations, all or some of the information is stored in the storage 422 may be based on user input and/or curation by a user. Data may be obtained from a user who indicates the users of an application and the access permitted to those users (e.g., roles and privileges). For example, a user can provide a list of users and their privileges when registering an application. In some implementations, the information handler system 438 may periodically update the information.

In various implementations, the security monitoring and control system 402 can include a mapping generator 470. In some examples, the mapping generator 470 can determine a measure of security for an application, a user account, a tenant, and/or a combination of these and/or other aspects related to use of a cloud application. In some examples, the mapping generator 470 can generate data defining a map that relates activity data to a value in one or more subsets or categories of values that provide a coarser representation of the activity data.

In various implementations, a control manager 472 in security monitoring and control system 402 may handle management and control of access to applications in a computing environment. The security monitoring and control system 402 may use one or more policies (e.g., security policies) to control whether or how a computing device can access an application. In various examples, a set of policies may be associated with a particular organization, such that the policies apply to some or all user accounts associated with the organization. A policy may be configured to affect one or more user accounts and/or all user accounts associated with a tenant. In some examples, a policy may indicate remediation actions to be performed, where the remediation action is based on a security analysis of various data collected about an application. Remediation may include, for example, sending a notification, displaying information (e.g., a report), and/or limiting or preventing access to an application. In some examples, the control manager 472 may communicate with a computing environment to configure a network device and/or a firewall to prevent or limit access to an application. Such control may prevent, if not reduce, security risks and/or minimize inefficient or undesirable consumption of computing resources (e.g., bandwidth and memory usage). In some examples, the control manager 472 may send one or more instructions to a computing environment and/or a network device to control access to an application. In some examples, the security monitoring and control system 402 may implement a module (e.g., an agent) on a client device, which is configured to communicate with the security monitoring and control system 402. In these examples, the control manager 472 may send one or more instructions to the agent on a client device to alter functioning of the device, where the alteration may prevent or reduce access to an application.

In various implementations, the security monitoring and control system 402 can include a learning system 478. The learning system 478 can apply various learning algorithms to data collected by the security monitoring and control system 402. The information learned about the data can then be used, for example, by the data analysis system 436 to make determinations about user activities in using services provided by the service provider 410 and/or cloud service provider 412. For example, the learning system 478 can learn patterns of normal or common behaviors of users.

To support the learning system 478, in some implementations, the security monitoring and control system 402 includes a scanner 474 and a pattern analyzer 476. In these implementations, the scanner 474 can, for example, scan data for particular types of information. For example, the scanner 474 can extract the activities of a particular user, group of users, class of users, and/or all users associated with a particular tenant. As another example, the scanner 474 can extract activities relating to use of a particular cloud service or set of services. As another example, the scanner 474 can extract activities relating to a particular service provider. In various implementations, the pattern analyzer can use the data extracted by the scanner to identify patterns in the data. For example, users and/or organizations may use cloud services in repetitive ways or cycles. In these examples, the pattern analyzer 476 can identify repetitive behavior, and identify these patterns of behavior to the learning system 478.

In some examples, a data accesser 482 in security monitoring and control system 402 may communicate with one or more service providers to obtain activity data from those service providers. The activity data may be for a user account, a tenant account, a group account, or another type of account. The activity data may be accessed with regard to a service, a particular type of data (e.g., a data for a particular attribute), one or more users, or combinations thereof. In some examples, the data accesser 482 may process data to identify activity related to one or more criteria, such as one or more services, a particular type of data (e.g., a data for a particular attribute), one or more users, or combinations thereof.

Figure 5:
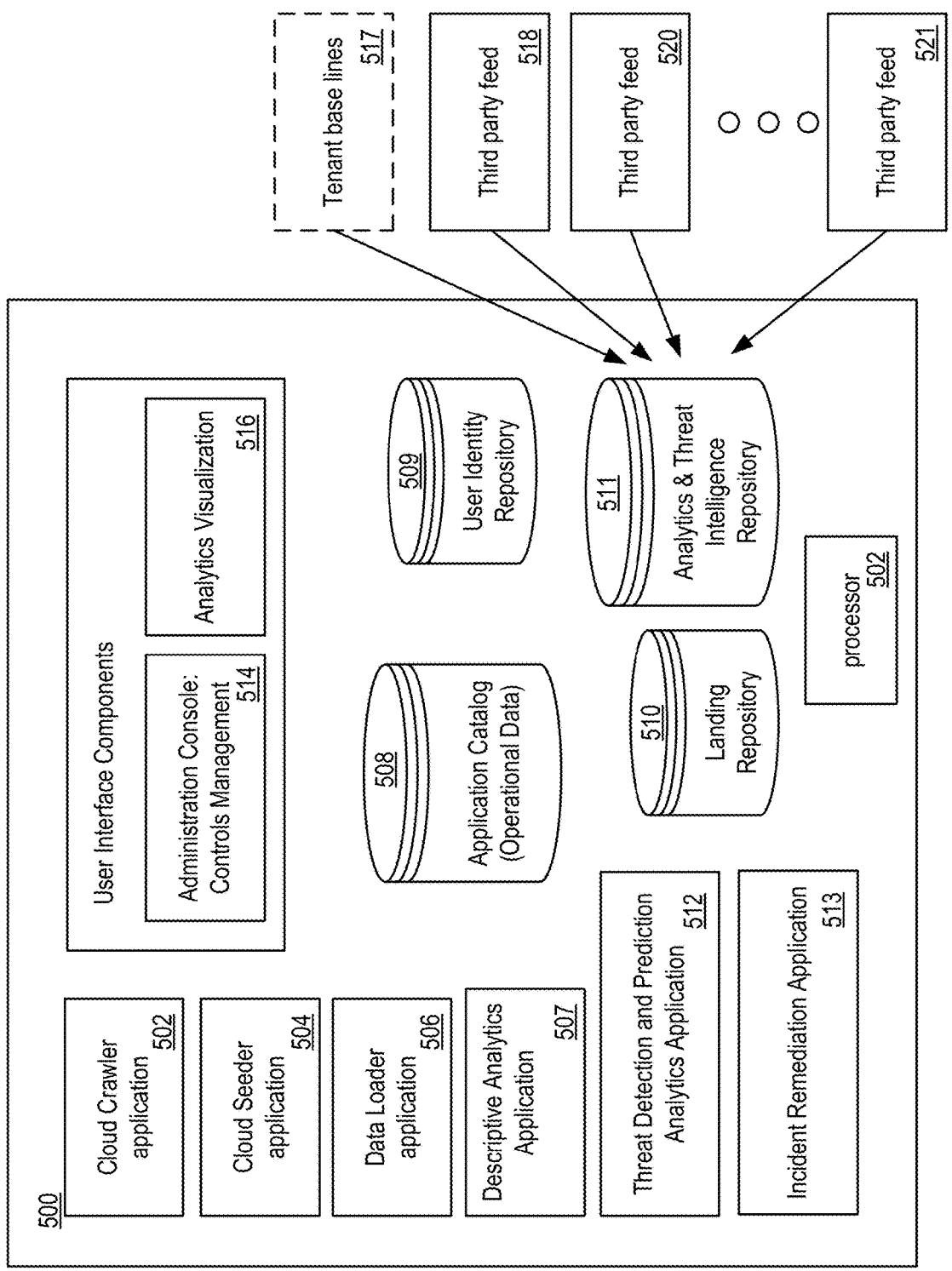
FIG. 5 illustrates an example of a system for network security.

In various implementations, a system for network security can include cloud management applications executing on a hardware platform, user interface components, and data warehouses stored on a hardware platform. FIG. 5 illustrates an example of a system 500 for network security. The system 500 may be implemented in a security monitoring and control system, such as is discussed above. In the illustrated example, cloud management applications in the system 500 can include a cloud crawler application 502, a cloud seeder application 504, and a data loader application 506. As will be discussed in greater detail further below, a cloud crawler application 502 can retrieve information about security controls from cloud providers, a cloud seeder application 504 can modify the security controls of a tenant account with a cloud provider to reflect a desired security posture, and a data loader application 506 can retrieve activity information on a tenant's account with a cloud provider and generates analytics.

In various implementations, data retrieved by the cloud crawler application 502 can be entered into an application catalog database 508 and data retrieved by the data loader application 506 can be entered into a landing repository 510 and/or analytics and threat intelligence repository 511. The data entered into a landing repository 510 may be in different formats and/or have different ranges of values, due, for example, from having been collected from different service providers. In some examples, the data from the data loader application 506 can be reformatted and/or structured before being moved to the analytics and threat intelligence repository 511 so that, for example, the data has a uniform format. The data concerning activity information in the analytics and threat intelligence repository 511 can be used to generate reports that may be presented visually to a system administrator via a user interface and to generate analytics for determining threat levels, detecting specific threats, and predicting potential threats, among other things.

In various implementations, the aggregation of activity information in the analytics and threat intelligence repository 511 concerning access patterns and other event statistics enables the system 500 to establish baselines of behavior. Machine learning techniques can then be applied to detect threats and provide recommendations concerning how to respond to threats. Threat models can be developed to detect threats that are known or unknown or emerging. Threats can also be identified by comparing activity data with external threat intelligence information, such as information provided by third-party providers, as will be discussed further below.

In various implementations, the account or accounts of a particular user in different cloud applications (e.g., different user identities) can be associated together in a user identity repository 509. The user identity repository 509 and/or other memory in the cloud security system can store information concerning tenant accounts and user accounts associated with each tenant account. A user belonging to a tenant organization may have user accounts with various cloud applications. The tenant organization may also have a tenant account with the cloud services provider that exercises management authority over the user accounts associated with the tenant. The association of user accounts to tenant accounts may be used in various ways, such as retrieving information about the user activity of users associated with a tenant. As will be discussed further below, a tenant account's credentials may be used to log into cloud application services to retrieve activity data concerning user accounts that are associated with the tenant account.

In various implementations, the user identity repository 509 can also be used to facilitate tracking of user activity and generation of profiles, where the activity and profiles capture data across multiple cloud applications. In addition, collecting information about user behavior across multiple cloud services enables the system 500 to, when a threat is detected based upon behavior on one or more cloud services, take various actions. For example, the system 500 can preemptively alert a system administrator with respect to threats on other cloud services. Alternatively or additionally, as another example, the system 500 can proactively secure other services on which a user maintains data by applying remedial measures, such as adding additional steps to authentication, changing passwords, blocking a particular IP address or addresses, blocking email messages or senders, or locking accounts, among other things.

In various implementations, the system 500 can include applications or software modules to perform analytics on collection. The applications or software modules may be stored in volatile or non-volatile memory and, when executed, can configure a processor to perform certain functions or processes. These applications can include a threat detection and prediction analytics application 512 and/or descriptive analytics application 507. In some examples, the threat detection and prediction analytics application 512 can generate analytics using machine learning and other algorithms to identify and predict security threats from patterns of activity and behavioral models. In some examples, the descriptive analytics application 507 can generate analytics such as, but not limited to, statistics on users, user activity, and resources. Analytics may be performed using data stored in the analytics and threat intelligence repository 511.

In various implementations, the system 500 can include remediation functions that provide manual and/or automated processes in response to threats. In some examples, analytics can use information received from tenant systems that describes threat intelligence provided by the tenant. These sources, which are referred to in the example system 500 as tenant base lines 517, can include information such as, but not limited to, specific IP addresses to watch or block, email addresses to watch or block, vulnerable browsers or versions thereof, and/or vulnerable mobile devices or versions of mobile hardware or software, among other things. In some examples, analytics can use information received from external third party feeds 518, 520, 521. The information from the third party feeds 518, 52-, 521 can be used to augment the threat intelligence by providing external information about security threats such as, but not limited to, identification of infected node points, malicious activity from a particular source IP address, malware infected email messages, vulnerable web browser versions, and known attacks on clouds, among other things.

In various implementations, an incident remediation application 513 can be used to coordinate and/or perform remediation actions in response to detected threats. In some examples, the incident remediation application 513 may be called when a recommended remediation action is presented and selected in an alert. The incident remediation application 513 may perform the selected remediation action or instruct another application, such as a cloud seeder application 504, to perform the selected remediation action. When the selected remediation action is to be manually performed or is external to the security system 500, the incident remediation application 513 may track the status of the remediation action and whether the remediation action is complete. In some examples, the incident remediation application 513 can be used to save the results of a manual or automated remediation action into memory. In some examples, a selected remediation action is to be performed by a system external to the security system 500, such as by a third-party's or a tenant's incident remediation system. In these examples, the incident remediation application 513 may instruct or invoke the third-party's or tenant's incident remediation system to perform the action, where the incident remediation application 513 may have access to an automated integration process.

In various implementations, the cloud seeder application 504 can be used to implement security policies by setting security controls within a tenant's accounts for various cloud applications. In some examples, the cloud seeder application 504 may set security controls in various conditions such as, but not limited to, part of remediation of a threat or on call by a system user. Examples of security controls and techniques to adjust security control may be implemented using techniques disclosed in U.S. Pat. No. 9,692,789, filed on Oct. 24, 2014 and issued on Jun. 27, 2017, and entitled "SYSTEMS AND METHODS FOR CLOUD SECURITY MONITORING AND THREAT INTELLIGENCE."

In various implementations, user interface components include an administration console 514 an analytics visualization console 516. Using the administration console 514, a user can to set the security controls for one or more cloud applications. The analytics visualization console 516 can be used to view analytics generated by the system. In various examples, data in the data warehouses can be used to generate the information and reports shown using the user interface components. The use of cloud management applications to retrieve security configuration data from cloud applications is discussed below.

In various implementations, a cloud crawler application 502 can retrieve software defined security configuration data from cloud service providers. Software defined security configuration data can describe the configuration of security controls for a particular cloud service. Security controls are mechanisms that restrict access to the application and/or data housed by the cloud service provider. For example, software defined security configuration data can include data describing roles that are defined for users, groups, and grouping of users; encryption keys; tokens; access controls; permissions; configurations; types of authentication policies; mobile access policies; and many other types of security controls.

Figure 6:
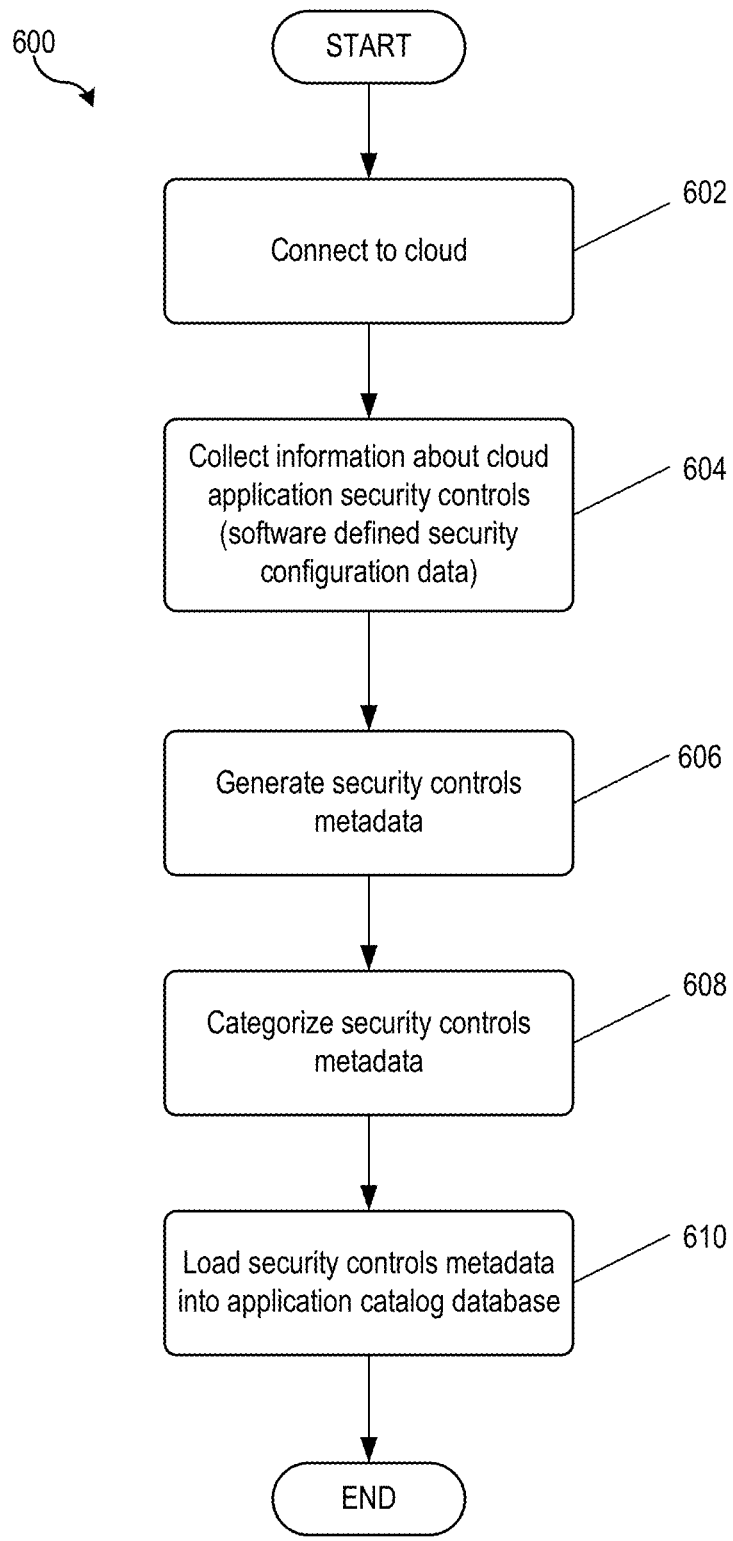
FIG. 6 illustrates an example of a process for retrieving software defined security configuration data from cloud services.

An example of a process 600 for retrieving software defined security configuration data from cloud services is illustrated in FIG. 6. The example process 600 can be implemented by a security monitoring and control system, or a component of such a system.

The process 600 can include a step 602 for connecting to a cloud (e.g., the systems of a cloud services provider). The cloud may require authorization or some other manifestation of consent for access to the system and internal data. Authorization may be provided by a token (such as using the OAuth open standard for authorization) or by credentials (such as a username and password). Various other techniques can be used to authorize access to a cloud provider's system and data. The connection may also include providing a service URL.

The process 600 can further include a step 604 for collecting software defined security configuration data about the cloud application's security controls. The software defined security configuration data can be collected by using an API made available by the cloud application and/or cloud services provider. Examples of APIs and classes of APIs include Representational State Transfer (REST), Java 2 Platform, Enterprise Edition (J2EE), Simple Object Access Protocol (SOAP), and native programmatic methods (such as native application API's for Java), among others. The information could also be requested using other techniques, such as scripting languages (such as Python and PHP), deployment descriptors, log files, database connectivity through Java Database Connectivity (JDBC) or REST, and resident applications (such as cloud beacons). The information that is sent or received can be represented in a variety of formats including, but not limited to, JavaScript Object Notation (JSON), Extensible Markup Language (XML), or (Comma Separated Values (CSV), among other formats.

Table 1 below provides an example of some security controls provided by cloud services providers Box and Amazon Web Services (AWS). Other cloud services providers can have similar security controls or other security controls.

TABLE 1

| Security Controls | Support in Box | Support in Amazon Web Services (AWS) |
|---|---|---|
| Users/Group Management | REST (Representational State Transfer) API | AWS IAM (Identity and Access Management) APIs |
| Credentials and Identifiers | N/A | Secure and monitor Accounts, tokens, keys etc |
| Login/Logout Events | REST API | AWS CloudTrail - Events API and Log files |
| IP address of the clients | REST API | AWS CloudTrail - Events API and Log files |
| Device (iphone, ipad etc) used by the clients | REST API | AWS CloudTrail - Events API and Log files |
| Password Policies | REST API | AWS IAM policies |
| Resource Access Permissions | Resources: Files, Folders Actions: Editing, Preview, upload, collaboration events | Resources: EC2, S3, EBS Actions: Create, Access, Restart, Terminate, etc. IP address based access controls |
| Restrict or limit Mobile access | Limit users from saving content for offline access | AWS IAM policies |
| Roles | BOX has pre-defined admin roles | Roles can be created using pre-defined policies |

Table 2 provides an example of some of the security controls and supported access for cloud services provider Salesforce.com. Other cloud services providers can use similar or other security controls and access controls.

TABLE 2

| Security Controls | Support in Salesforce.com |
|---|---|
| Users/Group Management | SalesForce User/Group/Profiles APIs |
| Credentials and Identifiers | APIs: Setup changes |
| Login/Logout Events | APIs: Audit activity |
| IP address of the clients | APIs: Audit activity |
| Device (iphone, ipad etc) used by the clients | API to manage Setup changes |
| Password Policies | APIs: Setup changes |
| Resource Access Permissions | Salesforce object monitoring using object history |
| Restrict or limit Mobile access | APIs to manage Setup changes |
| Roles | Salesforce Profiles |

The software defined security configuration data received about a cloud application's security controls can be used at step 606 to generate security controls metadata, that is, normalized descriptors for entering the information into a common database. The security controls metadata can be categorized at step 608 (mapped into categories) and indexed. The categorization may comply with a standard specified by a security organization and/or may be certified and/or audited by a third party. In addition, security controls metadata and/or the categorization of metadata may be formulated around the requirements of a particular regulation or standard. For example, regulations and standards such as the Health Insurance Portability and Accountability Act (HIPAA), Sarbanes-Oxley Act, the Federal Risk and Authorization Management Program (FedRAMP), and Payment Card Industry Data Security Standard (PCI DSS) may require reporting and audit trails. Security controls metadata can be formatted in a way to display the types of information required by the regulations and standards and facilitate the generation of reports needed.

The security controls metadata can be entered at step 610 into an application catalog database. In some examples, the application catalog database is an Apache Cassandra database, an open-source NoSQL database management system designed to handle large amounts of data across many commodity servers. In some examples, the application catalog database is implemented using types of databases appropriate to the application. In some examples, a variety of databases can be used to store an application catalog for later retrieval, report generation, and analytics generation.

In various implementations, processors other than the example process 600 of FIG. 6 can be used to retrieve software defined security configuration data and generated security controls metadata. Additionally, various types of controls and mechanisms for retrieving software defined security configuration data may be supported by different cloud service providers. For example, other cloud applications such as Office 365, GitHub, Workday, and various Google applications may be supported using retrieval mechanisms specific to an application. Furthermore, processes for retrieving software defined security configuration data can be automated or manual based on what is supported by a cloud service provider.

In various implementations, a controls management platform can provide a user with a normalized view of controls for multiple cloud applications and/or cloud service providers. The platform can include a user interface that displays a simplified view of controls for different cloud applications and/or services on the same screen. Information provided to the controls management platform can be retrieved from an application catalog database using metadata based schema mapping. The platform can be used to assign consistent access policies across cloud applications. Controls can be displayed and/or set according to specified classifiers, such as, but not limited to, standard, stringent, or custom, among others. In this example, a higher level classification corresponds to more stringent controls. In some examples, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In some examples, the controls management platform can also provide for plug-in interfaces to integrate with SaaS, PaaS, and native applications.

In various implementations, a controls management platform user interface may display security indicators in a library format with risk factors that are color coded (such as red, green, yellow). Other statistics or metrics may be displayed such as, for example, user logins attempts, groups with the most newly added users, deleted files, users with the most deleted files, and/or users downloading the most files, among other metrics. Some types of information may be specific to a particular cloud application provider. For example, for Salesforce.com, the metrics can include the identities of users that are downloading opportunity or budget data, contracts, or contacts. In some examples, a user interface provides a unified view of security controls for a tenant's registered cloud applications. The user interface may display a values set for any or all security controls set for different cloud applications, as well as deviations of the current values from values associated with predetermined policies or configurations.

In various implementations, a cloud data loader application can configure a computing device to collect activity data from a cloud service. The activity data can describe a tenant's activity, security configuration, and/or other related pieces of information.

Figure 7:
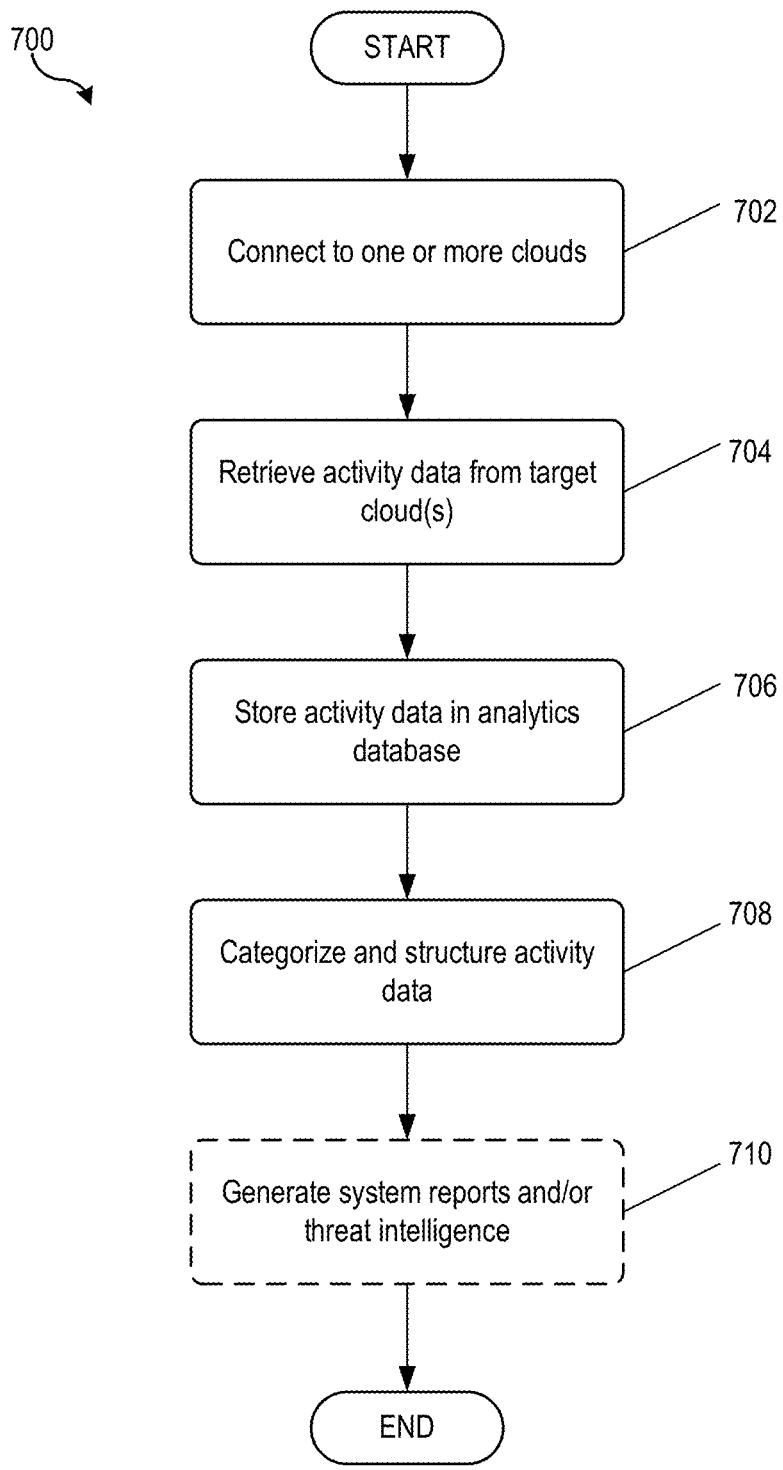
FIG. 7 illustrates an example of a process for collecting activity data from a cloud services provider.

An example of a process 700 for collecting activity data from a cloud service provider is illustrated in FIG. 7. The example process 700 includes a step 702 for connecting to one or more cloud services and a step 704 for collecting activity data from the cloud services. In various examples, the connection is made over an encrypted communication channel. In some examples, the connection must be authenticated by a token or using login credentials, or another authentication method. In some examples, the collection is scheduled to occur periodically (e.g., every 4 hours, every 6 hours, or at some other time interval). In some examples, the schedule for collection is configurable by the tenant. In some examples, data is collected and retrieved in real time as events occur, using a real-time computation system such as, for example, Apache Storm, open source distributed real-time computation system. The system may be configured to designate certain events or activities as high risk events, and these events can be retrieved near real-time, outside of the scheduled retrieval interval.

In various examples, activity data can include various types of information made accessible by a remotely hosted cloud application system to a system external to the cloud application system. In these examples, the external system holds the proper credentials to access the cloud application system. The credentials may be issued by the cloud application system or another authorizing entity. Activity data associated with user accounts can include information relating to the use of, and/or actions taken with, a user account at a cloud application. Activity data can include sources of information such as a user's log(s) and/or audit trail(s). More specific types of activity data can include, for example, login and logout statistics (including attempts and successes), file operations, access metrics, network download/upload metrics, application metrics (e.g., use, operations, functions, etc.), IP addresses used to access the application, devices used to access the application, and/or cloud resources that were accessed (including, but not limited to, files and folders in a file management cloud application [such as Box], employees and contractors in a human resource cloud application [such as Workday], and/or contacts and accounts in a customer relationship management cloud application [such as Salesforce]). Activity data can include the user account or other user identifier for the user associated with the events or statistics. Activity data can include information about system status or activity of a cloud application system such as, but not limited to, server activity, server reboots, security keys used by a server, and system credentials, where this information is visible or accessible to a system using authorized credentials.

In some examples, activity data may also include information about the security configuration of a tenant account, possibly including the security configuration of user accounts associated with the tenant account. The security configuration can include the values to which security controls for a tenant and/or user accounts associated with the tenant are set.

The retrieved activity data can be stored, at step 706, in an analytics and threat intelligence repository database. The analytics and threat intelligence repository database may be any database or data repository with query capability. In some examples, the analytics and threat intelligence repository database is built in a NoSQL based infrastructure such as Apache Cassandra or another distributed data processing system, although any data warehouse infrastructure may be used as appropriate for the application. In some examples, the data is first entered into a landing repository and reformatted and/or structured before being moved to an analytics repository.

In some examples, the activity data may be received in different formats that are used by different cloud applications. For example, the data may be formatted in JSON or other data interchange formats, or may be available as log files or database entries. In some examples, the process 700 includes a step 708 for normalizing the data and reformatting the data into a common format for storage in, and retrieval from, the analytics and threat intelligence repository database. Reformatting the data may include categorizing and structuring the data into the common format. In some examples, the database is adaptive to structural changes and new values, and can run automated processes to check for changed data. In some examples, a cloud crawler application (as discussed above) recognizes differences in the structure or values of the data retrieved, and can apply the changes to the application catalog database and/or the analytics and threat intelligence repository database.

In some examples, system reports may be pre-generated at an optional step 710. The system reports can be generated by jobs (e.g., processes) that are scheduled to run on the data set. Specific processes for using a cloud loader application to collect activity data are discussed above. Any of a variety of processes can be used for collecting activity data.

Data stored in an application catalog database and/or analytics and threat intelligence repository database can be used to generate a variety of reports. Categories of reports can include, for example, authentication and authorization, network and device, systems and change data, resource access and availability, malware activity, and failures and critical errors, among others. Reports can be based on various attributes such as, for example, per application, per user, per secured resource, and per device used for access, among others. Reports may highlight recent changes such as updated features in a cloud application or newly modified policies. Reports may be pre-generated by scheduled jobs (e.g., for performance reasons) or may be requested by a user or administrator.

In some examples, reports include analytics generated on the data. Analytics may use Apache Software Foundation technologies such as Hadoop, Hive, Spark, and Mahout or other features as available in the data storage framework used. In some examples, the R programming language is used to generate analytics. In some examples, the generation of analytics includes the use of machine learning algorithms, proprietary algorithms, and/or external threat intelligence from external commercial sources such as FireEye and Norse or public threat intelligence communities such as Zeus and Tor.

Figure 8:
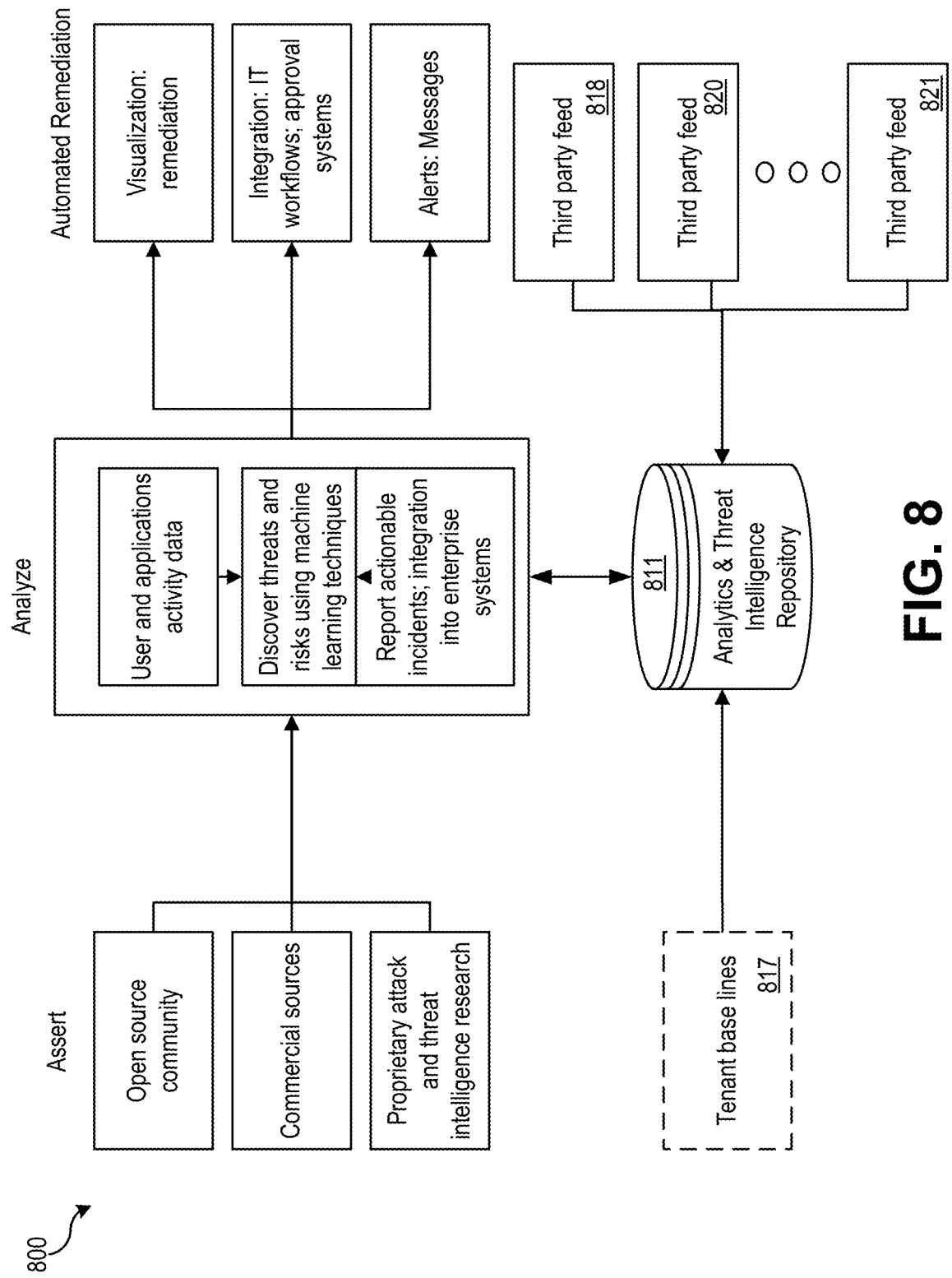
FIG. 8 illustrates an overview of generating analytics using components of a threat intelligence platform.

Analytics may be generated by an analytics process and/or an analytics module referred to as an analytics engine. An overview of generating analytics using components of a threat intelligence platform 800 is illustrated in FIG. 8. The example platform 800 may be implemented in a system that includes a security management and control system, such as is discussed above. In some examples, all or part of platform 800 may be implemented in the security monitoring and control system.

One class of analytics that may be generated is descriptive or statistical analytics. Statistical data can be generated using a pre-defined set of system queries, such as, for example, MapReduce jobs and Spark and Apache Hive queries, among others. Descriptive analytics can be generated either for a single application or across multiple applications using correlation techniques. Examples of reports that can be generated include, for example, login statistics (e.g., users with the most failed logins, IP address-based login history including consideration of IP reputation, geo-location, and other factors), user statistics (e.g., users with the most resources [files, EC2 machines, etc.], entitlements across clouds, number of changed passwords, and so on), activity statistics (e.g., activity of a user across clouds), statistics on key rotation (e.g., whether Secure Shell (SSH) keys have been rotated within the last 30 days, and so on), and resource statistics (e.g., number of folders, files downloaded by users, files downloaded by roaming or mobile users, and so on), among others. Various statistical analysis techniques can be used, such as mean, standard deviation, regression, sample size determination, and hypothesis testing, among others. Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, for example, deviations from base line expectations, rare and infrequent events, and behavior analytics to derive suspicious behavior of a user, among others. Algorithms and profiles can be trained to intelligently predict whether an unusual behavior is a security risk. Third party feeds 818, 820, 821 from providers such as, but not limited to, Max-Mind, FireEye, Qualys, Mandiant, AlienVault, and Norse STIX can be integrated to augment the threat intelligence. These third party feeds 818, 820, 821 can provide external information of and relating to potential security threats such as, for example, IP address reputation, malware, identification of infected node points, vulnerable web browser versions, use of proxy or Virtual Private Network (VPN) server by a user, and known attacks on clouds. In some examples, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file accesses, sales transactions, or instances of virtual machines.

In some examples, various types of algorithms can be particularly useful for analyzing the data. Decision tree, time series, naive Bayes analysis, and techniques used to build user behavior profiles are examples of machine learning techniques that can be used to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity with one cloud application or across multiple cloud applications, possibly over time.

As discussed above, activity data from different cloud applications may be in different formats or with different possible values or ranges of values. Normalizing the data in the processes discussed above may include reformatting the data such that it is comparable, have the same meaning, and/or bear the same significance and relevance between different cloud applications. After normalization, algorithms can aggregate and compare data from different cloud applications in meaningful ways. For example, a series of failed logins with a particular user account with one cloud application may be deemed not to be a threat. However, a series of failed logins with user accounts associated with a user across multiple cloud applications may indicate a concerted effort to crack the user's password and should thus set off an alarm.

Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In some examples, data collected over time is used to build models of normal behavior (e.g., patterns of events and activity) and flag behavior that deviates from normal as abnormal behavior. After one or more flagged events or activities is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over a period of time can be used with machine learning algorithms to generate patterns referred to as user behavior profiles. The activity data can include contextual information such as IP address and geographic location.

Algorithms for association rule learning can be used to generate recommendations. In some examples, profile linking algorithms are used to link activities across multiple cloud applications by finding cross application correlation. A single user can be identified across multiple cloud applications using one or more attributes or identification factors, such as a primary user identifier that is commonly used across the clouds or a single sign-on (SSO) authentication mechanism (e.g., Active Directory, Okta). Correlation of activities across applications can include finding users with a first entitlement in a first cloud application that have a second entitlement in a second cloud application, users logged into two cloud applications simultaneously from different IP addresses, users who have several failed login attempts and then change their password, and common users with numerous failed logins in two cloud applications.

In various implementations, a user identity repository can be used to facilitate user tracking and profiling across multiple cloud applications. A particular user's accounts with different cloud applications may be linked by associating the user identifier associated with the accounts (e.g., jdoe, john.doe, etc.), with a primary (universal) user identifier or SSO mechanism as mentioned above, or using another method. A user identity repository can contain information relating together the accounts of each user associated with a tenant. A user who uses multiple cloud application accounts that are under the control or ownership of a tenant may be referred to as an "enterprise user."

In various implementations, a recommendation engine tracks user activity for anomalous behavior, and to detect attacks and unknown threats. The recommendation engine can track user activity across multiple cloud applications for suspicious events. Events can include pre-defined at-risk operations (e.g., downloading a file containing credit card numbers, copying encryption keys, elevating privileges of a normal user, and so on). An alarm can be sounded with details of the event and recommendations for remediation.

Dynamic policy based alerts can be generated for events pertaining to a specific user. A process can monitor activity data associated with the specific user and generate a customized alert for specific actions taken by the user.

In various implementations, an algorithm can simulate normal user activities using user activity data in the analytics and threat intelligence repository database 811. For example, the analytics and threat intelligence repository 811 can include tenant base lines 817, data received from tenant systems that describe threat intelligence provided by tenants. The simulation can be used to train other machine learning algorithms to learn the normal behavior of a user in the system. In general, a particular security issue may not always repeat, and hence may not be detected by a purely supervised algorithm. However, techniques such as outlier detection can establish a baseline that is useful for detecting anomalous activities. Such anomalous activities along with contextual threat intelligence can provide more accurate prediction of threats with low prediction errors.

In various implementations, analytics can be used to detect security controls drift, which can refer to the changing of one or more security controls in a seemingly arbitrary manner, which can increase security risks. In some examples, a risk event can be generated in response to the change of one or more security controls in one or more cloud applications, as well as actionable intelligence associated with the risk event (also referred to herein as "a security risk," "a risk," "a threat," and "a security threat"). Threats can include activity, events, or security controls that are abnormal or noncompliant with respect to use of an application. As with other types of events, an alert may be sent to a tenant, tenant system, or another monitoring entity. As an example, a tenant's password policy in a cloud application may have been changed to impose fewer requirements (e.g., type and/or number of characters). This may generate a risk event and alert to recommend that the password policy be changed back to the original password policy.

Alerts concerning any of the events discussed above can be shown on a user interface such as a controls management platform discussed further above. An alert can include information about the detected event such as, for example, an event identifier, date, time, risk level, event category, user account and/or security controls associated with the event, cloud application associated with the event, description of the event, remediation type (e.g., manual or automatic), and/or event status (e.g., open, closed). Information in an alert about each risk event can include, for example, an identifier affected cloud application and instance, category, priority, date and time, description, recommended remediation type, and status. Each risk event may also have a user-selectable action, such as editing, deleting, marking status complete, and/or performing a remediation action. Selection of a remediation action may invoke an application such as the incident remediation application and/or cloud seeder application to perform the selected remediation. An alert and/or other information concerning an identified threat can be sent to an entity external to security monitoring and control system.

In some examples, counts of events in different event categories over time can be graphically illustrated in a chart. A user interface may display a chart of events. The chart may display a count of events by date in each of the color coded categories such as activities at an unusual time, after-hours downloads, failed logins, etc. The visual representation (e.g., a line) of an event category can be toggled on and off In some examples, threats can also be displayed in a summary view.

In various implementations, specific techniques such as those discussed below may be used to detect and/or address different threat scenarios. Detection may be performed by a threat detection and prediction analytics application, such as is described above, or another application using information from an analytics and threat intelligence repository, another internal data source, or other external data feed.

One example of a threat scenario is IP hopping. In an IP (Internet Protocol) hopping scenario, an attacker may use one or more proxy servers to hide a true location or machine identity before mounting an attack. Detection of this type of scenario can involve geographic resolution (e.g., identifying or looking up a geographic location associated with an IP address) of each IP connection used to connect to a cloud application. Detection can further include detecting anomalous characteristics in the spatial data, and predicting a threat from this information. Metrics used for detection can include, for example, a count of the number of unique IP addresses used by a user per day and/or a velocity that can refer to the time difference between the use of different IP addresses and the/or duration that each IP address used.

Another example of a threat scenario is an unusual geolocation scenario. An unusual geolocation scenario may refer to activities being originated in locations that are unexpected or outside of an established pattern. This scenario may include activities such as, but not limited to, successful logins or file upload/download from unusual geolocations.

Another example of a threat scenario is a brute force attack. A brute force attack scenario may refer to an attacker's attempts to try many passwords in order to discover a correct password and compromise a user account. Detection may involve evaluating the velocity of failed login attempts and patterns in event activities to predict a brute force attack. Moreover, brute force attacks may have different speeds, such as a slow attack or fast attack. Metrics for detection may include, but are not limited to, an unusually high number of login failures for existing valid accounts and/or an unusually high number of login attempts with invalid or terminal/suspended usernames.

Another example of a threat scenario is an insider threat. Insider threats can refer to enterprise security breaches due to a disgruntled internal employee, or an employee performing unauthorized actions before having permissions/credentials/access revoked. Detection processes may track a user's normal behavior and generate alerts when events or activities associated with the user's account(s) deviate from the norm. Metrics can include, for example, an usually high use of corporate resources such as a high number of downloads and/or an employee with a low rating downloading or sharing an unusually high number of files/folders, deleting code from a source code control system, or downloading, deleting, or modifying customer information, among other things.

Another example of a threat scenario is application misuse. Application misuse is a scenario that may include events associated with a terminated or suspending employee (e.g., an expired or revoked user account, cryptographic keys such as SSH key, etc.) or a malware-infected device performing an unusual number of file downloads/uploads using valid credentials, but an unusual geolocation or IP address, for example.

Application context can refer to using contextual data to improve security threat predictions. Sample contextual data can include, for example, travel location and itinerary from travel applications or email, employee status from healthcare management (HCM) systems, sensitive financial time period from a Salesforce application, and/or sensitive emails from email servers.

While specific threat scenarios and types of information that can be used to discern these scenarios are discussed above, one skilled in the art would recognize that threat detection and prediction may utilize any of a variety of information and formulas.

Prediction may be performed using a threat detection and prediction analytics application, as discussed above, or another application using information from an analytics and threat intelligence repository, other internal data source, or other external data feed. Cloud applications can store activity logs associated with a tenant's account as users associated with the tenant use the cloud applications. User activities may include events such as, for example, logging in to the cloud application, performing contacts management, uploading or downloading documents, etc. Such event activities can be logged with event details such as, for example, a user name, resource on which the user performed some action, event time, network IP address, etc. In some examples, activity data may be retrieved by a cloud data loader application as discussed further above. Information concerning activities may be ingested as raw data. In some examples, raw data is ingested by a batch profiling process.

With batch profiling, activity data is collected and statistics on various user behavioral activities are calculated. In some examples, a batch profiling process is run at regular intervals to update statistics. In some examples, the batch profiling process is run every 24 hours. In some examples, the batch profiling process is run once a day, but at a time that is variable. In some examples, batch profiling processes may be run at least once per day or skipping days or with any of a number of other variations as appropriate to the particular application.

Raw data may include information such as, for example, a successful login count, a failed login count, a count of unique IP addresses used to connect to the cloud application, and other information. Various statistics may be calculated on the raw data such as average or standard deviation.

In some examples, calculated statistics are stored in non-volatile storage.

Profiles can be designed to cover different time periods. In some examples, profiles use a fixed moving window covering a time period measured in weeks. In some examples, one or more "emerging profile" can be generations, which capture events that are relatively recent, such as within the last week or within a week prior to a target date. In some examples, a "stable profile" can be generated, which includes events within the last four (or eight) weeks or within four (or eight) weeks prior to a target date. In various examples, other profiles or profile types can be generated.

In some examples, fixed moving windows can be non-overlapping. That is, a window that goes further back in time can exclude events in a window that is more recent in time. For example, an eight week profile does not include events in a four week profile or one week profile and similarly the four week profile does not include events within the one week profile. Daily (or periodic) aggregation processes may be run intraday or interday.

Table 3 below shows example calculated statistics for some user activities. The example user activities include an average login count for a four week window profile ("avglogcntday4wk"), an average login IP address count for a four week window profile ("avglogipcntday42k"), a standard deviation of login count for a one week window profile ("stdlogcntday1wk"), and a standard deviation of login IP address count for a one week window profile ("stdlogipcntday1wk"). Similar and other statistics can be calculated, depending on the available data and/or the threat being predicted.

TABLE 3

| User ID | avglogcntday_4wk | avglogipcntday_4wk | stdlogcntday_1wk | stdlogipcntday_1wk |
|---------|------------------|--------------------|--------------------|--------------------|
| User 1  | 5                | 4                  | 3                  | 2                  |
| User 2  | 6                | 2                  | 2                  | 1                  |
| User 3  | 4                | 3                  | 2                  | 2                  |
| User 4  | 4                | 4                  | 2                  | 1                  |
| User 5  | 5                | 5                  | 1                  | 1                  |

Statistics such as those illustrated above can be combined into a feature vector. Feature vectors may include, for example, a count of a number of logins, a count of a number of distinct IP addresses used for logging in, a maximum distance between any two IP addresses used to log in within a 24 hour time period, a count of a number of distinct browsers used in connections to the cloud application within a 24 hour time period, and/or other measures. Feature vectors may be aggregated per cloud application and/or per user per cloud application.

Table 4 below shows example daily aggregation matrix vectors. The first column provides example application providers, the second column illustrates vector dimensions that may be supported by the providers, and the third column illustrates values that can be assigned to each dimension.

TABLE 4

| Application | Dimension | Description |
|-------------|-----------|-------------|
| Amazon, Salesforce, Box | Login | (# of count, Avg, Stddev, Max) |
| Amazon, Salesforce, Box | Failed Login | (# of count, Avg, Stddev, Max) |
| Amazon, Salesforce, Box | Login IP | (# of count, Avg, Stddev, Max) |
| Amazon, Salesforce, Box | Failed Login IP | (# of count, Avg, Stddev, Max) |
| Box | Download | (# of count, Avg, Stddev, Max) |
| Box | Download IP | (# of count, Avg, Stddev, Max) |
| Salesforce | Browsers | (# of count, Avg, Stddev, Max) |
| Salesforce | Mass Delete, Mass Transfer, Data Export | (# of count, Avg, Stddev, Max) |
| Salesforce | Certificate and Key Management | (# of count, Avg, Stddev, Max) |
| Salesforce | Network Access and IP Whitelist Changes | (# of count, Avg, Stddev, Max) |
| Salesforce | Manage User Changes | (# of count, Avg, Stddev, Max) |
| Salesforce | Platforms | (# of count, Avg, Stddev, Max) |
| Salesforce | Password Policy Changes | (# of count, Avg, Stddev, Max) |
| Salesforce | Shared Setting Changes | (# of count, Avg, Stddev, Max) |
| Amazon | EC2 Instance Changes | (# of count, Avg, Stddev, Max) |
| Amazon | Security Group Changes | (# of count, Avg, Stddev, Max) |
| Amazon | SSH Key Pair Changes | (# of count, Avg, Stddev, Max) |

TABLE 4-continued

| Application | Dimension | Description |
|---|---|---|
| Amazon | Network ACL Changes | (# of count, Avg, Stddev, Max) |
| Amazon | VPN Connection Changes | (# of count, Avg, Stddev, Max) |
| Amazon | SAML Changes | (# of count, Avg, Stddev, Max) |
| Amazon | VPC Changes | (# of count, Avg, Stddev, Max) |
| Amazon | IAM Access Key Changes | (# of count, Avg, Stddev, Max) |

Table 5 below lists example values for several possible daily aggregation matrix vectors. The example vectors illustrated here include a count of logins per day for one day ("logcntday_1dy"), a count of failed logins per day for one day ("logfailcntday_1dy"), a count per day of IP addresses from which failed logins occurred over one day ("logfailipdisday_1dy"), and a count per day of IP addresses used to log in over one day ("logipdisday_1dy").

TABLE 5

| User ID | logcntday_1dy | logfailcntday_1dy | logfailipdisday_1dy | logipdisday_1dy |
|---|---|---|---|---|
| User1 | 5 | 4 | 3 | 2 |
| User2 | 6 | 2 | 2 | 1 |
| User3 | 4 | 3 | 2 | 2 |
| User4 | 4 | 4 | 2 | 1 |
| User5 | 5 | 5 | 1 | 1 |

Activity data, generated statistics, feature vectors, and other information such as those discussed above may be used in behavior analytics to determine the likelihood of various threats. While specific algorithms are discussed below, one skilled in the art will recognize that the algorithms may be modified and/or use similar different pieces of information to achieve the same or similar results.

Algorithm 1 is one example of an algorithm that can be used to determine login IP address variations. Z-scores can be calculated for a login IP address feature vector over different time periods. The example that follows uses 1 week, 4 weeks, and 8 weeks as examples of time different time periods, resulting in three Z-scores:

$$L1\ ZScore = \frac{\text{Login IP past 24 hrs} - 1\ \text{wk Avg Login IP}}{1\ \text{Wk Stddev Login IP}}$$

$$L2\ ZScore = \frac{\text{Login IP past 24 hrs} - 4\ \text{wk Avg Login IP}}{4\ \text{Wk Stddev Login IP}}$$

$$L3\ ZScore = \frac{\text{Login IP past 24 hrs} - 8\ \text{wk Avg Login IP}}{8\ \text{Wk Stddev Login IP}}$$

The Z-scores may be combined with weights (w1 . . . w3) assigned to each score, as follows:

$$L\ \text{Combined} = (w1 \times L1ZScore) + (w2 \times L2ZScore) + (w3 \times L3ZScore)$$

In some examples, the sum of the weights is 1. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weight scan be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

Algorithm 2 is an example of an algorithm that can be used to detect failed login IP address variations. Z-Scores may be calculated for a login IP address feature vector over different time periods, here illustrated as 1 week, 4 week, and 8 weeks, as an example:

$$L1\ ZScore = \frac{\text{Failed Login IP past 24 hrs} - 1\ \text{wk Avg Failed Login IP}}{1\ \text{Wk Stddev Failed Login IP}}$$

$$L2\ ZScore = \frac{\text{Failed Login IP past 24 hrs} - 4\ \text{wk Avg Failed Login IP}}{4\ \text{Wk Stddev Failed Login IP}}$$

$$L3\ ZScore = \frac{\text{Failed Login IP past 24 hrs} - 8\ \text{wk Avg Failed Login IP}}{8\ \text{Wk Stddev Failed Login IP}}$$

The Z-scores for the failed login IP addresses may be combined with weights (w1 . . . w3) assigned to each score, as follows:

$$L\ \text{Combined} = (w1 \times L1ZScore) + (w2 \times L2ZScore) + (w3 \times L3ZScore)$$

In various examples, the sum of the weights is 1. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weights can be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weights can be set to w1=0.2, w2=0.3, w3=0.5. An anomaly condition in the variation in login IP addresses may be defined as L_Combined>T where T is a threshold. The threshold can be determined from previous data and/or can be modified over time.

In various examples, anomalous activity that is detected for a user of one cloud application can be used by an analytics application, such as a descriptive analytics application or threat detection and prediction analytics application or another application, to calculate or re-calculate the likelihood of a threat in other cloud applications. In this way, new events in another cloud applications may be screened proactively to detect and/or predict threats in the other cloud application. Multiple data points across different cloud applications may be correlated to increase the accuracy of a threat score.

Algorithm 3 provides an example of an algorithm that can be used for analytics of multiple application behavior. In algorithm 3, user IP addresses associated with various cloud application activities (such as logging in) are resolved to geolocation coordinates IP1 (Latitude 1, Longitude 1), IP2 (Latitude 2, Longitude 2), IP3 (Latitude 3, Longitude 3), etc. If a user has different usernames with different cloud applications, the various usernames associated with that user can be mapped to a unique user specific identity that identifies the user across the applications. The distance between any two IP addresses used for logins (e.g., login attempts, successful logins, and/or failed logins) with any of a number of cloud applications (e.g., Amazon Web Services, Box, Salesforce, etc.) can be calculated using any of a variety of distance measurements and/or formulas. In some examples, the distance d is calculated using the Haversine Distance formula, as follows:

$$\text{Diff}_{Long} = \text{Longitude2} - \text{Longitude1}$$

$$\text{Diff}_{Latitude} = \text{Latitude2} - \text{Latitude1}$$

$$a = \left(\sin\left(\frac{\text{Diff}_{Latitude}}{2}\right)\right)^2 + \left(\cos(\text{Latitude1}) \times \cos(\text{Latitude2}) \times \left(\sin\left(\frac{\text{Diff}_{Long}}{2}\right)\right)\right)^2$$

$$c = 2 \times \text{atan2}(\sqrt{a}, \sqrt{1-a})$$

$$d = R \times c$$

In the equation for d, R is the radius of the Earth.

Z-Scores can be calculated to determine deviation of user behavior over different time periods using maximum distances as calculated above. As an example, time periods of 1 week, 4 weeks, and 8 weeks are shown:

$$L1 \text{ ZScore} = \frac{\text{Max dist IP Login past 24 hrs} - 1 \text{ wk Avg (Max dist IP Login per day)}}{1 \text{ Wk Stddev (Max dist between IP Login IP per day)}}$$

$$L2 \text{ ZScore} = \frac{\text{Max dist IP Login past 24 hrs} - 4 \text{ wk Avg (Max dist IP Login per day)}}{4 \text{ Wk Stddev (Max dist between IP Login IP per day)}}$$

$$L3 \text{ ZScore} = \frac{\text{Max dist IP Login past 24 hrs} - 8 \text{ wk Avg (Max dist IP Login per day)}}{8 \text{ Wk Stddev (Max dist between IP Login IP per day)}}$$

The Z-scores may be combined with weights (w1 ... w3) assigned to each score, as follows:

$$L \text{ Combined} = (w1 \times L1 Z\text{Score}) + (w2 \times L2 Z\text{Score}) + (w3 \times L3 Z\text{Score})$$

In various examples, the sum of the weights is 1. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weight scan be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

Algorithm 4 provides an example of an algorithm for determining variations in the browser or operating system (OS) used when a cloud application is accessed. Z-Scores may be calculated using a feature vector that represents a count of the number of different browsers or operating systems used when accessing a cloud application, where the accesses occurred over various time periods. Periods of 1 week, 4 weeks, and 8 weeks are used below, as an example:

$$L1 \text{ ZScore} = \frac{\{\text{Broswer, OS}\}\text{counts past 24 hrs} - 1 \text{ Wk Avg}(\{\text{Browser, OS}\}\text{counts per day})}{1 \text{ Wk Stddev}(\{\text{Browser, OS}\}\text{counts per day})}$$

$$L2 \text{ ZScore} = \frac{\{\text{Broswer, OS}\}\text{counts past 24 hrs} - 4 \text{ Wk Avg}(\{\text{Browser, OS}\}\text{counts per day})}{4 \text{ Wk Stddev}(\{\text{Browser, OS}\}\text{counts per day})}$$

$$L3 \text{ ZScore} = \frac{\{\text{Broswer, OS}\}\text{counts past 24 hrs} - 8 \text{ Wk Avg}(\{\text{Browser, OS}\}\text{counts per day})}{8 \text{ Wk Stddev}(\{\text{Browser, OS}\}\text{counts per day})}$$

The Z-scores may be combined with weights (w1 ... w3) assigned to each score, as follows:

$$L \text{ Combined} = (w1 \times L1 Z\text{Score}) + (w2 \times L2 Z\text{Score}) + (w3 \times L3 Z\text{Score})$$

In various examples, the sum of the weights is 1. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weight scan be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

Algorithm 5 provides an example of an algorithm for determining variations in the number of downloads from a cloud application. Z-Scores may be calculated using a feature vector representing a count of the number of downloads for a user account over various time periods, such as 1 week, 4 weeks, and 8 weeks, as provided in the following example:

$$L1 \text{ ZScore} = \frac{\text{Download counts past 24 hrs} - 1 \text{ Wk Avg (Download ounts per day)}}{1 \text{ Wk Stddev (Download counts per day)}}$$

$$L2\ ZScore = \frac{\text{Download counts past 24 hrs} - }{4\ \text{Wk Avg (Download ounts per day)}}{4\ \text{Wk Stddev (Download counts per day)}}$$

$$L3\ ZScore = \frac{\text{Download counts past 24 hrs} - }{8\ \text{Wk Avg (Download ounts per day)}}{8\ \text{Wk Stddev (Download counts per day)}}$$

The Z-scores may be combined with weights (w1 ... w3) assigned to each score, as follows:

$$L\ \text{Combined} = (w1 \times L1ZScore) + (w2 \times L2ZScore) + (w3 \times L3ZScore)$$

In various examples, the sum of the weights is 1. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weights can be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

In various implementations, identified threats can be addressed using a variety of techniques. Remediation of threats may be automated or manual, and/or may solicit user or administrator involvement.

An example process for remediating threats is described. This process can be implemented by a security monitoring and control system, as s described above.

The process includes identifying a threat. Threats may be identified using processes such as the analytics and security intelligence processes discussed further above. Threats can include activity, events, or security controls that are abnormal or noncompliant. An alert is presented regarding the identified threat. In various examples, an alert may be visual and may appear in a user console such as a controls management platform discussed above. In some examples, an alert is communicated over a network such as by email, short message service (SMS) or text messaging, or web-based user console. Alerts may be communicated as secure messages (e.g., over a secure communication channel or requiring a key or login credentials to view). An alert may contain information concerning recommended or available remediation action(s), such as implementing stronger security controls, and request a selection of which remediation action(s) to pursue.

In various examples, a system for cloud security can interface with third party incident management automation systems such as, for example, ServiceNow or IBM QRadar, among others. External systems may have an API for these types of interactions. An alert and/or other information concerning an identified threat can be sent, for remediation and/or tracking, to an entity external to the cloud security system such as a tenant's internal IT (information technology) workflow management system or third party incident management automation system. The external system may return a status (e.g., complete or not complete) to the cloud security system. In this way, remediation may be delegated to an external system with the results reported back to the cloud security system to "close the loop." For example, if a password reset is desired for a user account, the cloud security system can send an alert or message to a tenant's internal IT system managing the user account. An administrator or system may complete the password reset operation and report the status as completed back to the cloud security system. Remediation action(s) to address a threat may be performed automatically, if a response to such threats is predetermined, or may be instructed by a user selecting a remediation option from the alert that was presented.

The process can further include performing one or more remediation actions. Any of a variety of security measures may be taken to address an identified threat such as, for example, deactivating an account, resetting a password, or setting stronger security controls, among others. In various examples, the cloud security system performs remedial actions by carrying out recommended measures directly and automatically, with use of any agent or proxy, for example.

In some examples, remedies may be performed "offline" or outside of the visibility of the cloud security monitoring and control system. For example, an alert can notify an administrator, who then makes changes to an external system in which the monitoring and control system does not have visibility. In such cases, an actionable incident can be opened in the monitoring and control system as an open item that can be later set to closed when the changes are completed. Remediation may also include utilizing an incident remediation application to coordinate and/or perform remediation actions and/or a cloud seeder application or process to set security controls as discussed further below.

Specific processes for identification and remediation are discussed above. Any of a variety of processes for identifying and remediating threats can be used. Remediation may include setting the security controls of a tenant's cloud application account.

In various implementations, a cloud seeder application can configure a computing device to provision a cloud application for a tenant with the tenant's desired security posture or security policy. The security posture/policy may include setting security controls to particular values that are associated with a particular level of security. The security posture/policy may be implemented with respect to controls that are specific to one user, or controls that apply to a group of users or all users. The seeder application may be used to coordinate consistent access policies across cloud applications. In some examples, security controls can be coordinated across several accounts that a tenant has among different cloud providers. For example, different levels of security may be defined such that when a higher or lower level of security is selected, the security controls for a tenant's accounts with different cloud services are all set to reflect the higher or lower level of security. In this way, a unified policy and security controls configuration can be enforced. The values for various security controls at different levels of security can be defined by input on a user interface, such as a controls management platform discussed above, and the values associated with the security controls at each level of security stored in a database. A user interface can be provided to show security controls for a tenant's account with a cloud application and the assignment of security control values at a security level. As an example, security controls at a Stringent level of security include password requirements for a user account such as ten minimum characters, two numbers, one special character, one uppercase letter, no reuse of the last ten passwords, etc.

A cloud seeder process can be invoked by various applications or by various processes including, for example, a scheduler, an incident management system, and/or upon application registration. For example, a cloud seeder process may be initiated by a tenant request, in response to a detected threat, upon a predetermined schedule, or for another reason.

A process for provisioning a cloud application is disclosed. In various implementations, the process includes collecting registration information from a tenant when registration information has not been previously obtained. Registration information can include, for example, authorization to connect to a cloud provider using a tenant's account. Authorization may be provided by a token (such as using the OAuth open standard for authorization) or by credentials (such as a user name and password). In some examples, the authorization (via token, credentials, or otherwise) is only provided with respect to the minimum permissions or privileges necessary to configure the relevant security controls. For example, permissions may be granted only to edit user accounts associated with a particular tenant's account and not to access other portions of the cloud service.

In some examples, authorization to modify a tenant's account is embodied by a secure token or credentials provided by the tenant. The secure token or credentials can be encrypted at rest using encryption keys per any of a variety of encryption standards and can be stored in a hardware security module (HSM) with access strictly audited. Access to the HSM and encryption keys can be regulated by secure software and only trusted code has access to encrypted keys. Transport level access also involves secure communication and any of a variety of encryption techniques. One skilled in the art will recognize that there are various other techniques that can be utilized in authorizing access to a cloud provider's system and data and securing registration information.

The process can further include receiving the designation of a security policy. A security policy may be selected or chosen in any of a variety of ways. Selection may be made by a user from a user interface or automatically by a threat or incident management process in response to a detected threat. A security policy may associate a desired level of security that includes a number of security features with the security controls available in a cloud application to implement that desired level of security. The associations may be stored in a database or other repository and retrieved when the security policy is selected.

The process can further include identifying security controls pertinent to the designated security policy. Available security controls may be discovered via processes such as with a cloud crawler application and/or read from an application catalog database, as discussed above. For example, setting a security policy concerning password strength may involve the security controls for password requirements with each cloud application (e.g., number and type of characters).

Using the registration information, the process can include connecting to the cloud provider. The process can include reading the security controls associated with the tenant's account and setting the security controls to the desired configuration. For example, a policy concerning password strength may set security controls governing the number and type of characters required in a password to require at least eight characters using symbols, numbers, and upper and lower case characters.

The processes described can be used to implement any number of security policies/postures at different levels of security. For example, a security policy at a high level of security may require that user passwords be "strong," meaning, for example, that the password must include a variety of characters such as upper and lower case, numbers, and/or symbols. Similarly, security policies at different levels of security may set a session inactivity timer at higher or lower periods of time, such that, when the inactivity timer expires, the user's session is automatically ended, for example. In some examples, a process to enact a security policy can identify the relevant security controls in the tenant's accounts with cloud applications to modify and set the controls at the desired values. In some examples, software defined security configuration data and/or security controls metadata, discussed above, can be used to identify the relevant security controls.

As discussed further above, several techniques can be used to remotely retrieve event data from a cloud provider. In various implementations, a cloud beacon can be embedded in a cloud service provider to monitor activity and capture application activity in real-time. In some examples, a cloud beacon can be a Java agent configured and co-located in the running application. In some examples, a cloud beacon is a Python program. One skilled in the art will recognize that a cloud beacon can be implemented in any language suitable for the computing environment. In some examples, the cloud beacon can capture events and activity for one or more tenants using the services of the cloud application. Data captured can include user logins, tokens, session attributes, user roles, groups, data filtering, and SQL queries, among other things, as well as contextual threat intelligence information such as an IP address reputation, user's geographic location, and other information. A cloud beacon can be configured to monitor designated top security vulnerabilities and security configuration controls, as well as to capture user activity audit log files for detecting abnormal activities. The collected data can be entered into an analytics and threat intelligence repository database using processes similar to those used by a cloud data loader described above. In various examples, a cloud beacon can independently send an alarm based on predetermined events and/or thresholds (as opposed to the alarm being triggered by analysis of data once entered into an analytics repository). Information from a cloud beacon can be returned on a scheduled basis and/or in near real-time as collection, events, and/or alerts occur.

In various implementations, a cloud-to-cloud threat warning system can provide communications between cloud applications. For example, one cloud application can proactively warn another cloud application of a potential threat. In some examples, multiple cloud applications can be related to the same business process. In these examples, when a threat is identified in a first cloud (e.g., a query from a blocked IP address), a cloud security monitoring and control system can automatically notify a second cloud application that is part of the business process. The notification can include a request or recommendation for a higher level of security controls, such as elevated authentication or one-time-password (OTP) validation, in the business process. In some examples, the cloud security system can originate and/or coordinate the distribution of notifications and/or alerts to clouds.

Figure 9:
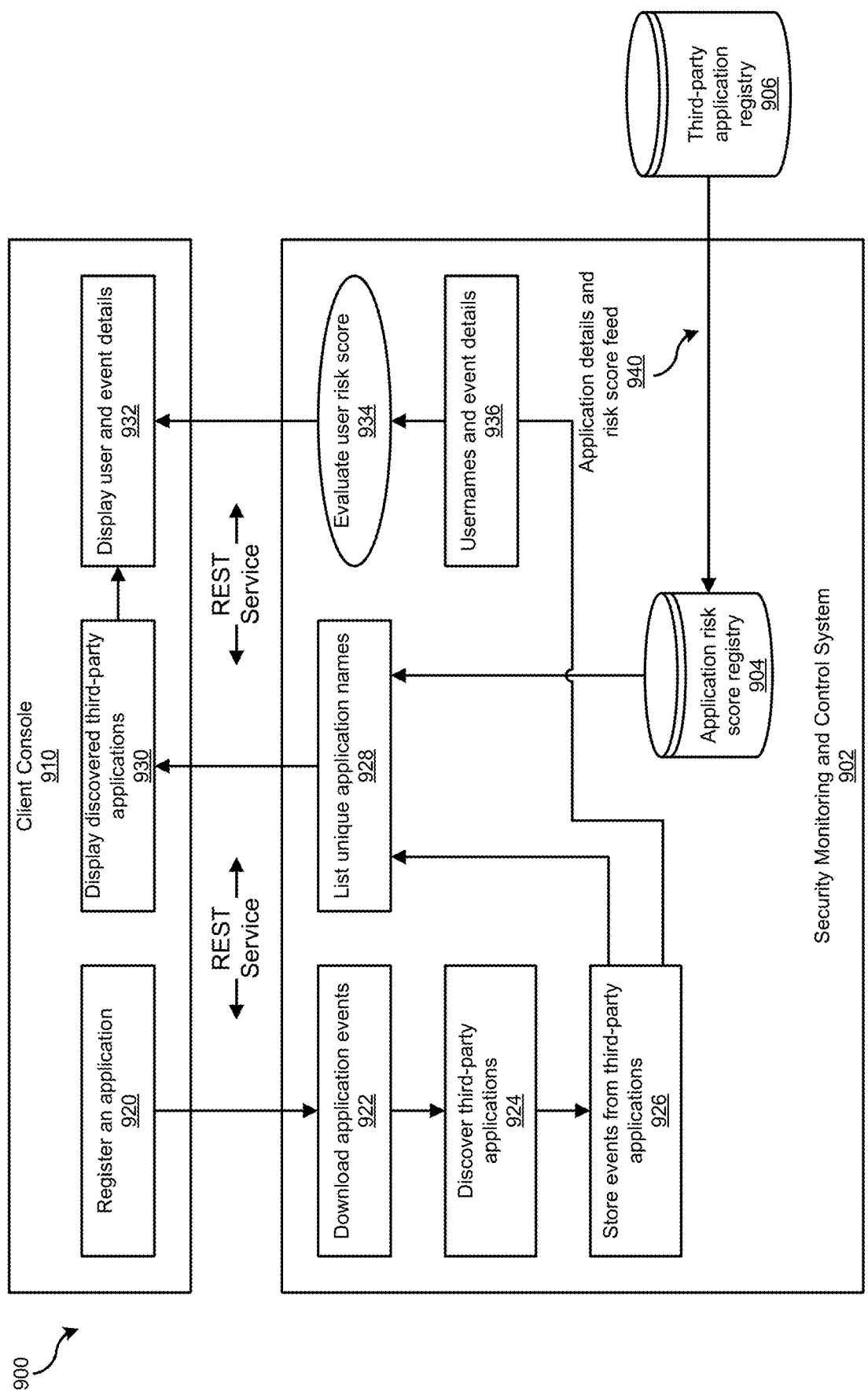
FIG. 9 illustrates an example of a processes for discovering and managing security for applications.

FIG. 9 illustrates an example of a processes 900 for discovering and managing security for applications. The example process 900 can include discovering third-party applications and/or displaying information about third-party applications in a graphical interface. The information displayed can include a measure of security for applications (including third-party applications) and/or a measure of security for users of the applications.

In various implementations, the example process 900 illustrated in FIG. 9 includes application discovery and analysis of application risk and user risk associated with a user's use of an application. In various implementations, a security monitoring and control system 902 can perform processing to discover application usage. The security monitoring and control system 902 can further determine a measure of security for discovered applications and users of those applications.

The process 900 can be executed for applications that have been authorized. An application can be authorized, for example, by the application being registered with the security monitoring and control system 902. At step 920, a user operating a client device can register an application by providing information about the application. The user can use a client console 910 to enter this information. The client console 910 can be a graphical user interface of an application provided by the security monitoring and control system 902. Alternatively or additionally, the client console 910 can be an interface provided through another application, such as a web browser. The client console 910 may communicate with security monitoring and control system 902 using an interface or a service (e.g., a REST service), over a communication medium, such as a network.

At step 922, the process 900 includes downloading application events from a service provider system, where the service provider hosts the application that was registered at step 920. The applications events may be provided in the form of data records for applications that have been accessed. The data records can include, for example, actions performed in using the application.

At step 924, the process 900 includes using the application events downloaded at step 922 to discover applications that have been accessed. The discovered applications can include un-registered applications. Alternatively or additionally, the discovered applications can include third-party applications that have been used to access another application or data associated with another application, where the other applications may be either registered or unregistered. Discovering applications can include searching the application events for incidents of applications being invoked, called, referenced, or accessed in some other way.

At step 926, the process 900 includes storing events associated with third-party applications, and related information, in a repository. Event information can include, for example, a time stamp indicated when the event occurred, user information (e.g., a username, email address, or other identifier) for the user who caused the event, information about the application, a sanctioned application instance name, network information (e.g., an IP address, domain name, subnet identifier, or other information about the network location from which the event was triggered) or geolocation (e.g., a geographic location from which the event was triggered), among other things.

At step 928, the process 900 can include determining information about applications, including third-party applications, that were discovered at step 924. For example, the application events downloaded at step 922 can be used to determine information that identifies each application, such as, for example, an application name, an application instance name, an API or library associated with an application or application's interface, and so on. The identification information for the applications can be used, at step 928, to generate a list of unique application names. The list of unique application names and any information determined about each application can be sent to the client console 910, and be displayed, at step 930, for example in a graphical interface.

Using the information about the discovered applications, in various implementations, the security monitoring and control system 902 computes an application risk score for each application. In some examples, an application risk score registry 904 may be maintained from which an application risk score may be obtained. The registry may be maintained and automatically updated, for example when application events are downloaded at step 922, when applications are discovered at step 924, and/or when application event are stored at step 926.

In some implementations, the application risk score can be computed using an application details and risk score feed 940 obtained from a third-party source, such as a third-party application registry 906. In these implementations, application details may include vendor information about a provider of an application or about a vendor that provides a third-party application. Vendor information may include, for example, a vendor name, a vendor logo, a vendor domain, a vendor description, a vendor category (e.g., business), and/or a security indicator (e.g., a score or a link to access security score evaluation supporting data). The application risk score can also be sent to client console 910 for display, at step 930, in a graphical interface.

At step 936, the process 900 further includes obtaining user information about users identified in the applications events as users who accessed applications associated with the events. Users can be identified, for example, from usernames, handles, identification numbers, or other information that may be associated with one or more events. At step 934, the process 900 includes computing and evaluating a user risk score. In some examples, the user risk score may be computed using information obtained from a data source that maintains information about application usage for users. In some examples, reputation data obtained from external data sources can be used to determine the user risk score. Examples of techniques for computing a user risk score are provided elsewhere herein. Information about users, event details associated with a user, and the user risk score can be sent to the client console 910, for display, at step 932, for example in a graphical interface.

In various implementations, display of discovered applications (including third-party applications), at step 930, or display of user and event details, at step 932, are optional. In these implementations, the risk score computation associated with steps 930 and 932 may also be optional.

Figure 10:
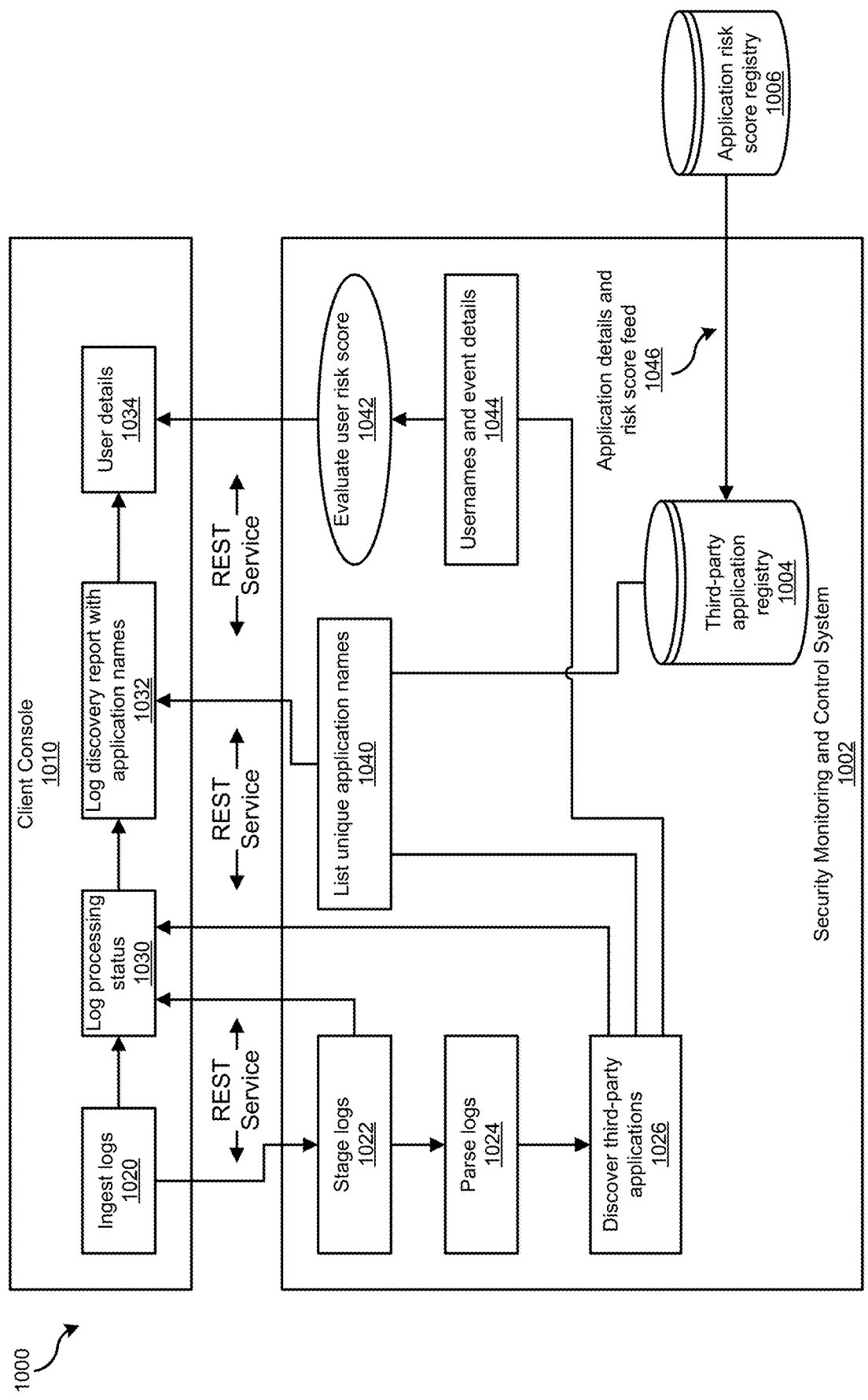
FIG. 10 illustrates an example of a process for discovering applications and analyzing risks associated with an application and/or risks associated with users using the application.

FIG. 10 illustrates an example of a process 1000 for discovering applications and analyzing risks associated with an application and/or risks associated with users using the application. In various implementations, the process 1000 can discover applications by analyzing log file data. Log files can be obtained from, for example, agents that can collect and log information such as actions taken with respect to applications and/or network activity. Log files can alternatively or additionally be obtained from cloud service providers.

At step 1020, a user operating a client device can provide information identifying log files. For example, the user can provide a source where log files can be found and/or information required to access the log files (e.g. authentication information that may be required to access the files, or other information for accessing the log files). At step 1020, the log files can be ingested, meaning the log files can be read, copied, or otherwise obtained from a source location.

The user can use a client console 1010 to enter log file information. The client console 1010 can be a graphical user interface of an application provided by the security monitoring and control system 1002. Alternatively or additionally, the client console 1010 can be an interface provided through another application, such as a web browser. The client console 1010 may communicate with security monitoring and control system 1002 using an interface or a service (e.g., a REST service), over a communication medium, such as a network.

Using the log files and data contained therein, in various implementations, the security monitoring and control system 1002 can discover applications that were used. The security monitoring and control system 1002 can further determine a measure of security for the discovered applications, and possibly also for the users of the applications. These operations can be conducted using the steps that follow.

At step 1022, the process 1000 includes obtaining the log files through a staging process. Staging can include storing and/or sorting the log files in preparation for analysis. In some implementations, staging can further include reducing the size of the log files be removing routine entries in the log files and/or entries that may not be needed to discover applications (e.g., entries that do not contain information about applications). In various examples, a current status of the staging process can be displayed, at step 1030, in the client console 1010, to inform a user of the current progress of the process 1000.

At step 1024, the process 1000 includes parsing or otherwise processing the log files to identify events, such as actions taken while using an application and/or network activity. Parsing the log files can include, for example, reading individual events from the log file and breaking each event down into constituent parts. In some cases, the log files may need to be decompressed, decrypted, and/or decoded before being read.

At step 1026, the process 1000 can include analyzing the events parsed from the log files and identifying (e.g., discovering) applications that were accessed. The applications can be registered or unregistered, and/or can include third-party applications. Third-party applications are applications used to access other applications, where the other applications may be registered or unregistered. The third-party applications themselves may be registered or unregistered. Examples of third-party applications include portals, launching platforms, and application aggregators, among other examples. In some examples, a current status of the analysis performed at step 1026 can be displayed in the client console 1010, at step 1030.

At step 1040, the process 1000 includes using the log files to determine information that identifies each accessed application. This information can include, for example, an application name, an application instance name, a code identifying an application, API calls to a specific application, and other information that can be used to identify an application. This information can be used, at step 1040, to generate a list of unique application names.

At step 1040, the process 1000 can also include identifying events associated with each application, and details about each event. Event detail can include, for example, a time stamp indicating when the even occurred, a third-party application name, network information such as an IP address, a geolocation, user information (e.g., a username or email address) for a user who triggered the event, and/or an address of a device from which the application was accessed (e.g., a Media Access Control (MAC) address).

Step 1040 can also include determining a risk score for the applications that were discovered. The risk score can be computed, for example, using a third-party application registry 1004 maintained by the security monitoring and control system 1002. The third-party application registry 1004 can include, for example, reputation data for third-party applications, risk scores for third-party applications, reputation and/or risk scores for third-party application vendors, and/or information about third-party application vendors, such as a vendor name, a vendor logo, a vendor domain, a vendor description, a vendor category (e.g., business), and/or a security indicator (e.g., a score or link to access security score evaluation supporting data). In various examples, the third-party application registry 1004 can include data about applications that serve as a portal for accessing other applications (e.g., applications through which other applications are accessed) and/or any other applications that were identified as accessed at step 1026.

In some implementations, the risk score can also be computed using an application detail and risk score feed 1046 from third-party application risk score registry 1006 maintained by an external source. The third-party application risk score registry 1006 can provide, for example, a risk score for a third-party application (e.g., an application through which other applications are accessed) and/or any other applications that were identified as accessed at step 1026.

In various implementations, the process 1000 can include displaying, at step 1032, a discovery report, which contains the names of applications that were discovered, possibly with the risk score computed for each discovered application. The report can be displayed in the client console 1010, for example in a graphical user interface.

At step 1044, the process 1000 can include obtaining user information about users identified from the log files as users that access or otherwise used applications also identified in the log files. The information about the users can include, for example, user names or other identification information and/or a listing of events triggered by a user, among other things. The listing of events can include details, such as time stamps for when the events occurred, IP addresses associated with the events, applications accessed by a user, geolocation data for the users, and other information.

At step 1042, the process 1000 includes determining and evaluating a user risk score for users identified at step 1044. In various implementations, the user risk score can be computed using the user information and/or event details determined at step 1044. In some examples, the user risk score can be computed for each application accessed by the user. In some examples, the user risk score can also include information about a user obtained from external sources.

In various implementations, the process 1000 can include, at step 1034, displaying user details in the client console 1010. The user details can include a listing of each unique user identified at step 1044, optionally with event details associated with each user. The user details can be displayed, for example, in a graphical user interface.

In various implementations, displaying of the discovery report, at step 1032, or displaying of the user details, at step 1034, may be optional. In these implementations, determination of the discovered applications or determination of the users that access the applications may also be optional.

Figure 11:
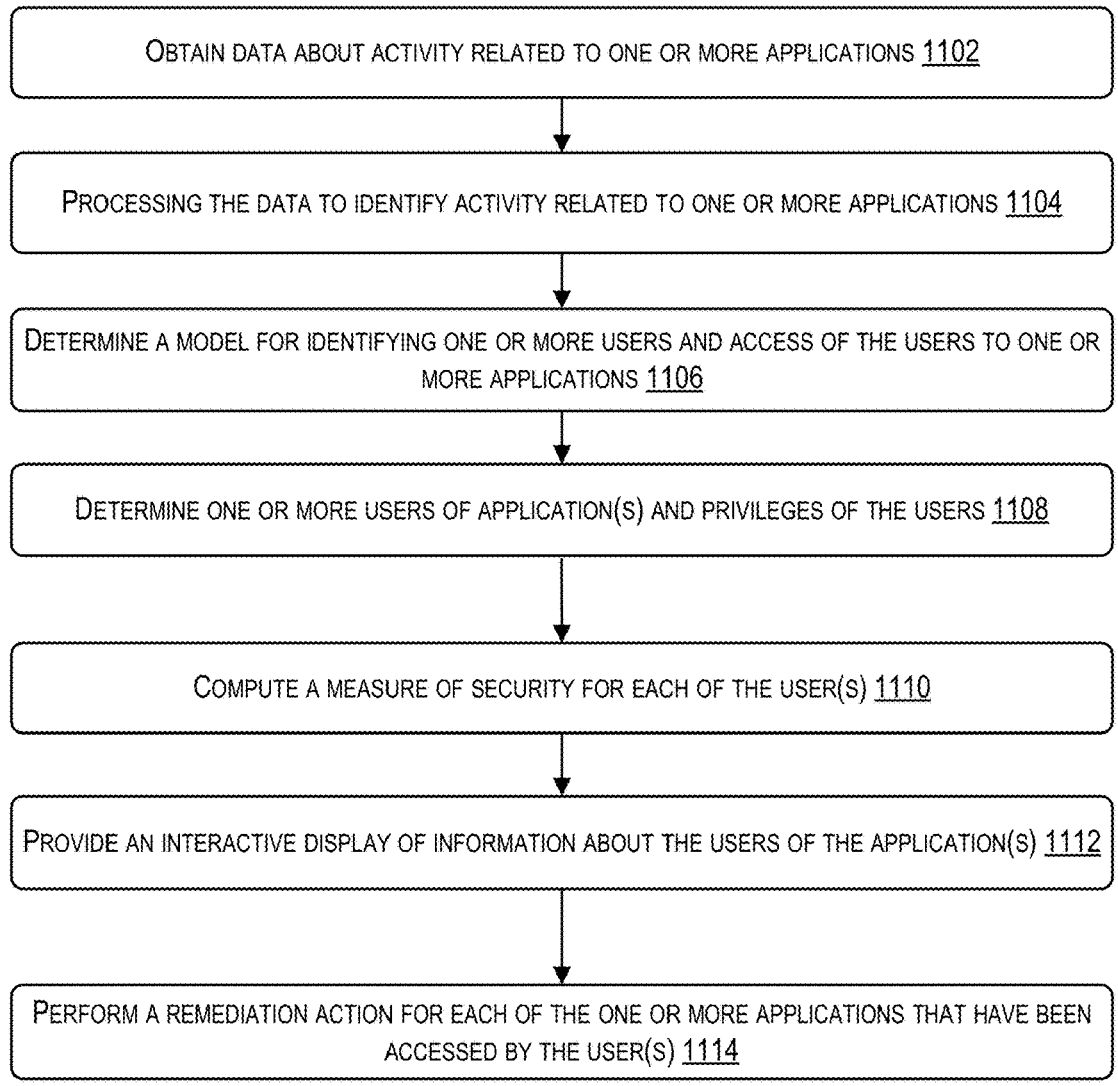
FIG. 11 illustrates an example of a process for discovering users of applications and privileges associated with these users.

FIG. 11 illustrates an example of a process 1100 for discovering users of applications and privileges associated with these users. In various examples, one or more features of the process 1100 can be performed by a security monitoring and control system, such as is discussed above.

Organizations may be challenged with determining users that have access to an application as well as the privileges of those users with respect to the application. The difficulty becomes greater for an organization managing many applications across different service providers. One or more approaches may be implemented for detecting users with one or more privileges to access an application provided by a service provider.

At step 1102, the process 1100 may include obtaining data about activity, also referred to herein at "activity data," of one or more applications. Activity data may include structured data, unstructured data, or a combination thereof. Activity data may include data related to an application including network activity and usage of the application. Activity data may be obtained for one or more users. Techniques may include determining activity data for a service provider with respect to use of an application. Activity data, such as audit trail data, may include user actions that occurred during use of an application. The activity data may indicate actions performed, users that performed the action, one or more objects impacted by the action(s), contextual data such as timestamp, and/or network location from where user performed the action, among other things.

Activity data may be aggregated from one or more service providers with respect to applications accessed by users. Activity data may be obtained using techniques for monitoring network activity, including those discussed with reference to FIG. 10. Data about network activity may be obtained by monitoring and/or obtaining data (e.g., log data or record data) from network devices. For an organization to monitor application usage, an organization may monitor internal, or protected networks of the organization (e.g., an Intranet) for network activity. Network activity may be monitored by obtaining information from network resources (e.g., a network device) of network traffic within and external to the network of the organization. In some examples, data may be obtained from a data source and/or via an interface facilitated by input from a user.

In some examples, data about activity of application usage is determined by communicating with a service provider to obtain data (e.g., audit trail data or log data) concerning one or more accounts (e.g., user accounts or tenant accounts) and activity with respect to services that are associated with those accounts. A service may include providing an application. Obtaining data may include using credential information for an account to access the account at the service provider to retrieve the data. Data may be aggregated from multiple service providers to determine application usage for a particular user or tenant. Each service provider may be different in implementation including an interface. Data may be shared between applications, and applications may be shared with a group (e.g., a tenant or an organization).

The following examples illustrate activity data that may be used to determine users of an application. As further described below, the data may be processed to determine users that have accessed a particular application. The following is a first example of activity data (e.g., an audit log record) that can be obtained from a service provider.

```
"entries": [
    {
        "source": {
            "type": "user",
            "id": "222853877",
```

```
            "name": "Sandra Lee",
            "login": "sandra@company.com"
        },
        "created_by": {
            "type": "user",
            "id": "222853866",
            "name": "Mike Smith",
            "login": "mike@company.com"
        },
        "created_at": "2016-12-02T011:41:31-08:00",
        "event_id": "b9a2393a-20cf-4307-90f5-004110dec233",
        "event_type": "ADD_LOGIN_ACTIVITY_DEVICE",
        "ip_address": "140.54.34.21",
        "type": "event",
        "session_id": null,
        "additional_details": null
    }
```

The following is a second example of activity data (e.g., a shared file audit log record) that can be obtained from a service provider.

```
"entries": [
    {
        "type": "event",
        "source": {
            "parent": {
                "type": "folder",
                "id": "0",
                "name": "All Files"
            },
            "item_name": "financial2017Q1.doc",
            "item_type": "file",
            "item_id": "159004949136"
        },
        "additional_details": {
            "service_name": "File Sharing App"
        },
        "event_type": "SHARE",
        "ip_address": "140.191.225.186",
        "event_id": "234d2f55-99d0-4737-9c3b-1a5256fe7c67",
        "created_at": "2016-12-12T20:28:02-07:00",
        "created_by": {
            "type": "user",
            "id": "238746411",
            "name": "John Smith",
            "login": "john@company.com"
        }
    }
```

The following is a third example of activity data (e.g., an audit record) that can be obtained from a service provider.

```
{
    "Records": [
        {
            "eventVersion": "1.03",
            "userIdentity": {
                "type": "IAMUser",
                "principalId": "111122225533",
                "arn": "arn:aws:iam::111122223333:user/john",
                "accountId": "111122223335",
                "accessKeyId": "AKIAIOSFODNN7JOHN",
                "userName": "john"
            },
            "eventTime": "2016-12-26T20:46:31Z",
            "eventSource": "s3.amazonaws.com",
            "eventName": "PutBucket",
            "awsRegion": "us-west-2",
            "sourceIPAddress": "127.0.0.1",
            "userAgent": "[ ]",
            "requestParameters": {
                "bucketName": "myprodbucket"
            },
```

-continued

```
    "responseElements": null,
    "requestID": "47B8E8D397DCE7D6",
    "eventID": "cdc4b7ed-e171-4cef-975a-ad829d4123c7",
    "eventType": "AwsApiCall",
    "recipientAccountId": "111122223344"
}
```

The following is a fourth example of activity data (e.g., an audit record) that can be obtained from a service provider. 79a59df900b949e55d96a1e698fbacedfd6e09d98eacf8d-5218e7cd47efcde myprodbucket [06/Feb/202017:00:01:57+0000] 192.0.2.3 Mary DD6CC733AMARY REST.GET.OBJECT s3-dg.pdf "GET/mybucket/financia12016Q4.pdf HTTP/1.1" 200-4406583 4175428 "-" "S3Console/0.4"-

A service provider may provide an interface (e.g., a programming interface) that can facilitate access to data about application usage. An interface can provide data with respect to a particular account. In some examples, the interface may provider a list of users. The list may include the privileges and/or roles configured for those users.

In some examples, the process 1100 includes step 1104 for processing the activity data to identify activity related to one or more applications. The activity may include actions performed on one or more applications and/or information about users that performed those actions. The activity data may include information (e.g., a label) to indicate the user that performed an action for an application. The activity can further include the privileges and/or roles of the user with respect to the action. The information may be provided by a user of the application or an administrator of the security system. Processing the activity data may include parsing the activity data to identify the information contained in the activity data. The activity data may be parsed to identify users and the action(s) the users have performed in using one or more applications. In some examples, a big data processing system is implemented to handle large volumes of activity data. Activity data may be parsed based on a model or a template that defines the format of the activity data obtained for a particular service provider. The activity data may be processed to identify actions performed by users with respect to each unique application.

In some examples, an approach for determining users and actions taken by the users includes supervised learning techniques. Supervised learning may be implemented based on activity data identified with respect to actions performed on applications by users and their roles or privileges. As such, the activity data may be processed to determine a format for preparing a classification model with respect to actions related to an application and the privileges of the users that can perform those actions.

In some examples, an approach for determining users and actions taken by the users includes supervised learning techniques. Activity data may be processed to determine activity for applications including, without limitation, a type of action, the number of occurrences of an action, a user that performed the action, other information about accessing or operating an application, or combinations thereof. The actions may be assessed as a combination and/or based on the success or failure of the actions. Actions may be identified based on a type (e.g., create, share, delete, or etc.), a resource accessed, logins performed, a login geolocation, and/or compute instances, among other things. Activity may be identified with respect to a schedule. Statistical information may be determined for the activity including aggregation of activity for an application on a schedule (e.g., daily, weekly, or monthly). The data may be parsed to identify activity with respect to applications, users, and/or other attributes about an application. For example, a security system can parse audit trail logs for a registered application and prepare daily, weekly, historical user action counts to build feature set. User action counts may include, for example, user create/delete, file create/share/delete, etc. These feature sets can then be used to build clusters and users are grouped based on the clusters the users belong to. Table 6 below includes examples of daily actions performed by multiple users. The examples actions include file sharing and create user actions in a file sharing application. Processing of the data may be used to determine actions for an application.

TABLE 6

| User | File Share Event # | Create User Event # |
| --- | --- | --- |
| John | 3 | 0 |
| Mary | 6 | 0 |
| Bill | 2 | 0 |
| Kumar | 4 | 0 |
| Chi | 0 | 0 |
| Jose | 11 | 0 |
| Colin | 9 | 0 |
| Sean | 20 | 1 |
| Mike | 19 | 1 |
| Steve | 17 | 1 |
| Alexi | 18 | 3 |
| Samantha | 20 | 3 |
| Josh | 16 | 2 |
| Jenny | 21 | 2 |

In some examples, the process 1100 includes a step 1106 for determining a model for identifying the accesses made by these users to one or more applications. The model may be implemented as one or more data structures. The model may be determined based on the data. Access may be defined based on one or more privileges. The privileges may be defined based on one or more roles for accessing resources, such as, applications.

One approach for determining users and accesses made by the users to applications is to generate a model based on the data processed, where the model can be used to identify activity related to one or more applications. In some examples, a classification model is generated based on actions performed for an application. The model may be a catalog of actions that map actions to roles and privileges associated with the roles. The actions and related information may be determined based on the processing of the activity data. The classification model may be based on information about those actions such as the privileges of the users that performed those actions and the type of actions performed. The classification model may be trained on new or old activity data. The classification model may be trained based on one or more learning techniques including neural network and random forest. Learning techniques may be implemented using one or more programing packages. The model may be used to classify actions and determine associated users including their privileges.

In some examples, unsupervised learning is implemented to determine a model for cluster analysis. For example, activity data is processed to determine actions for applications such as historical user action counts for users. Feature sets of activity data can be determined, based on processing the activity data, to build a data structure (e.g., a model). For example, the feature sets are subsequently used to build clusters using unsupervised cluster algorithms such as K-means. Clusters may be analyzed to generate a model for users with respect to actions performed for applications. In some examples, the model is updated with feedback from one or more users to improve accuracy of the model. Based on the processing, a model may be determined by looking at the user name and associated privileged actions for applications. If two users belong to a cluster and one is a privileged user, then the other user is most likely a privileged user.

At step 1108 of the process 1100, users and privileges associated with the users are determined. A first approach for identifying users and privileges is obtaining, from an organization, information about the users that are granted privileges by the organization to access one or more applications. In some examples, a user of a security system can provide, via an interface, users and privileges with respect to applications. For example, when a customer registers an application with a service provider, the customer can also provide a list of users who have administrative privileges.

In some examples, users and privileges associated with the users can be determined based on the model determined for identifying one or more users and access of the users to one or more applications. A classification model for supervised learning may be used to determine classifications of actions with respect to privileges of users. The model may be used to look up users and their privileges with respect to any application for which activity data is obtained.

In some examples, users and privileges can be determined based on unsupervised learning. For example, a user name and associated privileges for an application may be looked up using a model that is based on clustering. For example, if two users belong to a cluster and one is a privileged user, then the other user is most likely a privileged user. Customers then can review the outcome of the result and provide feedback, which helps the model to predict the privileged users with better accuracy.

At step 1110 of the process 1100, a measure of security of each of the users is determined with respect to an application. A measure of security of a user (also referred to herein as a "user risk score") may provide an indication as the risk or threats to security a user may pose to an organization. As discussed above, a user may pose a security threat to an organization's network based on use of an application in an unauthorized or unsecure manner. Such use may expose a private network and/or data of an organization to risk. In some instances, an application may pose a threat to an organization based on inefficient or improper use of an organization's resources, such as a corporate network and/or computing resources. A user risk score may provide a measure that indicates the severity of security threats related to a user in the organization. A user risk score may be generated continuously by profiling the user actions for applications.

In some examples, at step 1112 of the process 1100, a display may be provided to display information about each of the users that accessed an application. The information may indicate actions that have been performed for an application and privileges and/or roles for the user to access the application. In some examples, the information may include the measure of security of a user for the application. The display may be a graphical interface that is provided in an application or a web browser. The display may be interactive to monitor and manage security of users. The display may be generated by a security monitoring and control system. Providing the display may include causing the display to be rendered at a client. Upon generation, the display may be sent to a client to be rendered. In some examples, a display may be provided as a report in a message sent to a client. The report may be a notification about security related to an application and/or a user with respect to access for the application.

At step 1114 of the process 1100, one or more remediation actions may be performed for each of the one or more accessed applications. A remediation action is an action performed on a remedial or corrective basis to address a security problem (e.g., a security risk or a threat) posed by an application or a user with respect to the application. Examples of remediation action, include, for example, sending a notification message about security of a user accessing an application, displaying information about security of an application, adjusting operation and/or access of an application (e.g., restrictive adjustment of access).

As an example, controlling access to an application may include blocking or preventing a user or group of users from accessing the application. Limiting, blocking or preventing access to an application may be achieved in many ways. One or more instructions can be sent or configured to adjust access for an application. For example, one or more instructions can be configured on a network in an organization such that any request for an application can be denied or the request can be prevented from being communicated outside the organization so as to effectively deny or block access. One or more instructions can be configured to deny certain types of requests for an application. A user can be prompted at an interface to provide information to configure access to an application so that it is limited according to a policy.

In another example, an action may be either placing information about the application on a whitelist or blacklist to permit or deny, respectively, access to the application. In some examples, a remediation action may not be performed for each application based on assessing the application according to a policy. A remediation action may be performed for a user with respect to one or more applications.

A remediation action for an application may be performed based on the measure of security of the application or a measure of security of a user. Remediation actions may be automatic, manual, soliciting user or administrator involvement, or a combination thereof. Actions may be configured based on input from a user (e.g., an analyst). A remediation action may be performed based on one or more policies. A policy may be configurable by a user and/or adapted based on feedback for security, such as techniques disclosed herein. For example, a remediation action may be performed based on a measure of security of an application satisfying a threshold for risk (e.g., a high risk). In some examples, a remediation action may be performed based on security information for one or more features of an application. The measure of security may be computed based on those features. As such, a remediation action may be based on the measure of security for those features for which a measure of security is computed.

In some examples, a remediation action may be performed based on a security policy. The security policy may define one or more remediation actions to perform based on a measure of security and/or security information. A security policy may be applied based on a measure of security and/or any information (e.g., organization information or security information) as disclosed herein. Operations may be performed to assess a security risk or threat. The security risk or threat can be based on a measure of security and/or security information (e.g., one or more security indicators). A policy may define one or more criteria, such as a threshold (e.g., a security threshold or risk threshold) that defines when a remediation action is to be taken. The criteria may be defined by one or more values according to a scale of a measure of security or a scale set by a provider of a security indicator. For example, applying a security policy may include determining whether the measure of security satisfies a risk threshold for the application. The measure of security may be compared to one or more values in a policy to assess the severity of a security risk. The values may be defined based on one or more security indicators. The values may be defined based on one or more security indicators such that the measure of security is compared to a threshold that is defined based on the security indicators used to compute the measure of security. Security indicators obtained in security information may also be compared to further assess a security risk.

In some examples, a remediation action may be to configure one or more aspects of a computing environment to prevent an application from being accessed within the computing environment. One or more instructions may be sent to a computer system and/or a network device of the computing environment of an organization to specify what application is to be blocked and for whom the application is to be blocked or limited. Access to an application may be configured by a policy or other configurable information that can control access in a computing environment. In some examples, an instruction can be sent to an agent on a client device operated by a user. The agent may be instructed to change operation to prevent access to particular applications and/or change operation of an application in particular environments where the client device is used. Remediation action may be to prevent access to an application by multiple users. In some examples, a remediation action may include sending one or more instructions to a service provider system. For example, an instruction can be sent to a service provider system to adjust one or more security controls and/or settings for accessing an application. A servicer provider system may provider an interface to access security controls and/or settings. A remediation action may include using the interface (e.g., by making a call) to adjust a security control and/or setting for an application.

Remediation actions may include alerting users. An alert may be sent to a device of an administrator or other user about a security risk and/or a change in access to an application. In some examples, a remediation action for an application includes causing a graphical interface to prompt the user to adjust a configuration operation of the application.

As discussed above, in various implementations, a security monitoring and control system can identify user activity with respect to a cloud-based service, where the activity may pose a threat to an organization. One technique for identifying such user activity is use of pattern recognition to identify anomalous user behavior. Users of an organization may use a cloud service in a systematic fashion. For example, users may use a sales tracking application more towards the end of a month or end of a quarter, and less at the beginning of the month or quarter. As another example, users may check email in the morning and evening, and not during the middle of the day. In various implementations, a security monitoring and control system can learn patterns of user behavior, and use the learned pattern to analyze user activity data in real time. When the security monitoring and control system finds patterns that do not correspond to any of the learned patterns, the system can signal an alert or take another action.

Figure 12:
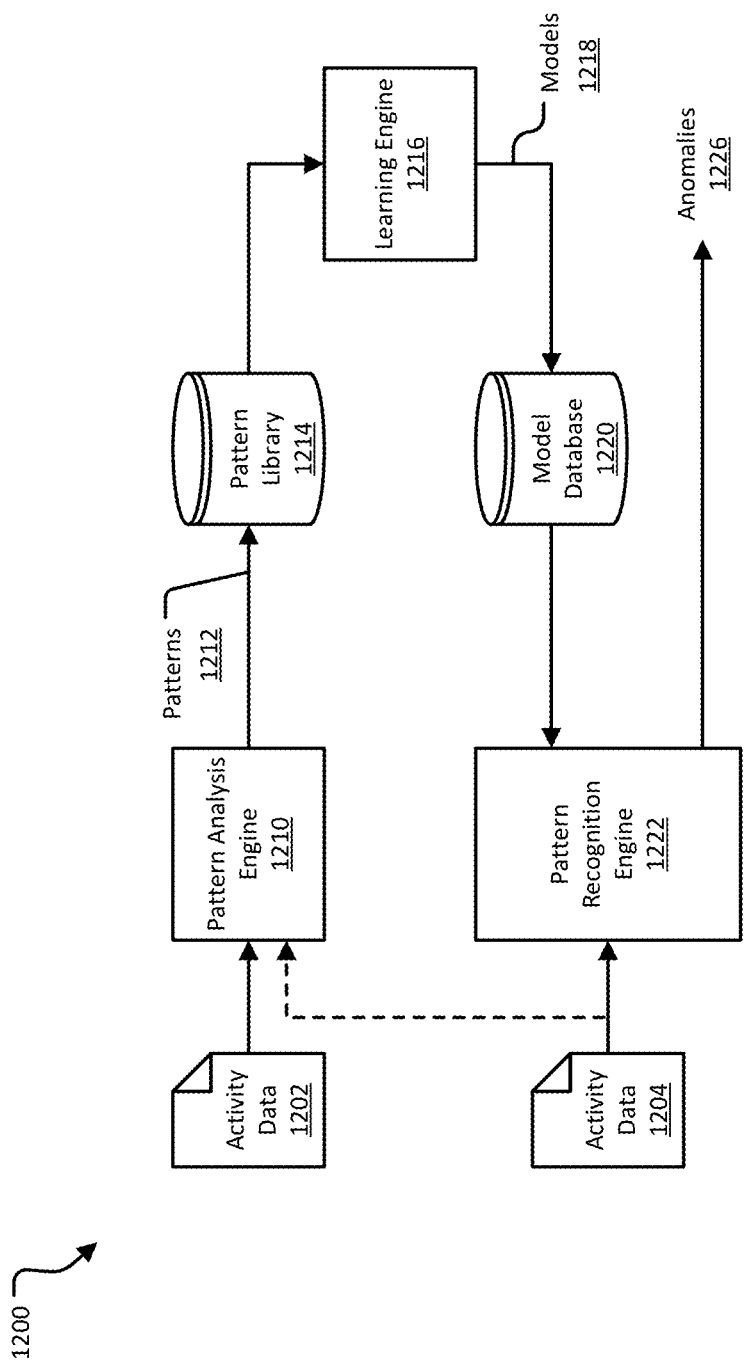
FIG. 12 illustrates an example of a pattern recognition and learning system.

FIG. 12 illustrates an example of a pattern recognition and learning system 1200. In various implementations, the example pattern recognition and learning system 1200 can recognize patterns 1212 in activity data 1202 received from a cloud services provider. The pattern recognition and learning system 1200 can learn the patterns 1212, and develop models 1218 that can be used to identify anomalies 1226 in additional activity data 1204. In various implementations, the pattern recognition and learning system 1200 can include a pattern analysis engine 1210, a learning engine 1216, and a pattern recognition engine 1222. The pattern recognition and learning system 1200 can further include a pattern library 1214 in which patterns 1212 can be stored, and a model database 1220 that can be applied using various pattern recognition techniques. In various implementations, the pattern recognition and learning system 1200 can be a component of a security monitoring and control system, such as is discussed above.

In various implementations, the pattern recognition and learning system 1200 is provided with activity data 1202, which can include user activity captured from a network and/or data recorded by, and obtained from, a cloud services provider. The activity data 1202 can be for one or more users and/or one or more cloud services. The activity data 1202 can include, for example, actions taken with respect to a cloud service (e.g., a user login, a file read from or written to, data created, etc.), a resource that was affected (e.g., user accounts created or deleted, storage space size increased or decreased, service started or stopped, virtual or physical devices stopped, started, or rebooted, etc.), a user ID or other identifier for a user that performed the action, and/or a time stamp for the time at which the action was performed, among other things. In some implementations, a data accesser, such as is discussed above, can be used to obtain the activity data 1202.

In various implementations, activity data 1202 produced by the actual users of an organization can be used. To find anomalous behavior among users of an organization, the pattern recognition and learning system 1200 can learn the behavior of these users from the users' past behavior. Thus, for example, activity data 1202 from the past week, month, year, or another time period can be provided to the pattern recognition and learning system 1200, where the activity data 1202 is for one or more of the organization's users. In this example, the activity data 1202 can capture typical or routine behavior of the organization's users.

In various implementations, the activity data 1202 is provided to a pattern analysis engine 1210, which is also referred to herein as a pattern analyzer. In various implementations, the pattern analysis engine 1210 can identify patterns 1212 in the activity data 1202 by scanning the activity data 1202. The patterns 1212 can be for one user, a group of users, and/or a type of user. The patterns 1212 can be for one action taken with respect to one application, for a set of actions taken with respect to the application, and/or for actions taken with respect to multiple applications. The patterns 1212 can include unique patterns, a patterns of patterns, and/or precursor patterns. Operation of the pattern analysis engine 1210 is discussed further below.

In various implementations, the patterns 1212 can be stored in a pattern library 1214. In the pattern library 1214, a pattern can be associated with, for example, a point in time or time frame in which the pattern occurs, a user or group of users who performed the actions that resulted in the pattern, and/or an application or set of applications to which the actions were applied, among other things. In some implementations, a pattern can also be associated with other patterns. For example, a pattern can be part of a set of patterns that occur on a regular basis. As another example, one pattern can be a precursor to second pattern, where occurrence of the first pattern may be an indicator that the second pattern is expected to occur.

In various implementations, the learning engine 1216, which is also referred to herein as a learning system, can user various machine learning techniques to learn users' behavior from the patterns 1212 in the pattern library 1214. For example, the learning engine 1216 can input the patterns 1212 into a machine learning algorithm, such as a neural network, a decision tree, a clustering engine, a Bayesian network, or another machine learning algorithm. In this and other examples, the machine learning algorithm can produce models that describes the patterns 1212. For example, in the case of a neural network, the model can include weights established when the neural network uses the patterns 1212 as training data. As another example, in the case of a decision tree, the model can include the structure of the tree, types for each node in the tree, and/or a test to performed at each node. In various implementations, the learning engine 1216 can produce a model for one user, a group of users, one action that can be performed with respect to an application, multiple actions that can be performed for one application, use of one application by any number of users, actions initiated from a particular device, or some other combination of users, actions, applications, and devices. The models 1218 can be stored in a model database 1220.

In some implementations, the learning engine 1216 can apply the patterns 1212 to more than one machine learning algorithm, to produce multiple models 1218. The multiple models 1218 enable multiple corresponding recognition techniques to be used by the pattern recognition engine 1222, and a more comprehensive decision to be made as to whether a pattern is present in input activity data 1204, as discussed further below. For example, the learning engine 1216 can apply an ensemble learning technique, such as boosting, bootstrap aggregating, ensemble averaging, and/or a mixture of experts technique to combine the capabilities of different machine learning algorithms.

In various implementations, the pattern recognition engine 1222 can apply the models 1218 in the model database 1220 to additional activity data 1204, and determine whether the additional activity data 1204 includes anomalies 1226. The additional activity data 1204 can be recent or new data, such as, for example, data for the most recent day, week, month, quarter, or some other time period. In various implementations, the pattern recognition engine 1222 can use the models 1218 to recognize patterns in the additional activity data 1204. For example, when a model includes learned weights for a neural network, the pattern recognition engine 1222 can input the activity data 1204 into the neural network to determine whether the activity data 1204 includes a previously identified patterns 1212. As another example, when the models 1218 include a decision tree model, the pattern recognition engine 1222 can input the activity data 1204 into the decision tree to see if the activity data 1204 does or does not include identified pattern 1212. In some implementations, the additional activity data 1204 can also be input into the pattern analysis engine 1210 to learn additional patterns and/or to reinforce previously identified patterns.

In these and other examples, when the pattern recognition engine 1222 encounters a patterns in the activity data 1204 that does not correspond to a previously identified pattern, the pattern recognition engine 1222 can identify the unrecognized pattern as an anomaly. Identification of an anomaly can include outputting the unrecognized pattern, possibly along with a user or users that performed the actions that produced the pattern, a device or devices from which the actions were initiated, an application and/or resource affected by the actions, a time period when the unrecognized pattern occurred, and/or other information about the unrecognized pattern. In some implementations, the pattern recognition engine 1222 can also output a risk score, indicating a degree of risk associated with the unrecognized pattern. The risk score can indicate, for example, a likelihood (e.g., a percentage) that the activity described by the unrecognized pattern poses a risk to an organization and/or the organization's assets. In some implementations, the risk score can be computed by another component of a security monitoring and control system, such as are discussed above.

In some implementations, the pattern recognition engine 1222 can apply more than one recognition algorithm to the additional activity data 1204. For example, the pattern recognition engine 1222 can apply a neural network, a decision tree, an inductive logic program, a support vector machine, a representation learning engine, or another pattern recognition algorithm. In these and other examples, the pattern recognition engine 1222 can use the results of multiple recognition algorithms to determine whether a pattern found in the activity data 1204 is unknown. For example, the pattern recognition engine 1222 can apply an ensemble learning technique, such as boosting, bootstrap aggregating, ensemble averaging, and/or a mixture of experts technique to combine the results of different pattern recognition algorithms. As another example, the pattern recognition engine 1222 can take an average of scores produced by each of the pattern recognition algorithms, and make a decision based on the average. As another example, the pattern recognition engine 1222 can accept the majority opinion, meaning that, for example, when more of the pattern recognition algorithms output that a pattern is unrecognized, and fewer output that the pattern is recognized, the pattern recognition engine 1222 will decide that the pattern is unrecognized. In other examples, other consensus determination methods can be used.

In some implementations, the multiple pattern recognition algorithms can be given different weights. For example, algorithms that have been determined to have a high degree of accuracy can be given more weight than algorithms that tend to be less accurate. As another example, algorithms that are more accurate for certain situations (e.g., certain applications, groups of users, user actions, time frames, etc.) may be given more weight when the activity data 1204 corresponds to these situations. In these and other examples, the pattern recognition engine 1222 can apply the weights when examining the output of each pattern recognition algorithm. For example, the probability that a pattern is known or unknown can be increased or decreased by the weight assigned to the algorithm that produced the probability. As another example, the final determination about whether a pattern is recognized or not recognized can be a weighted sum of the results produced by the pattern recognition algorithms.

In some implementations, the pattern recognition engine 1222 can additionally implement a veto strategy. In these implementations, some of the multiple pattern recognition algorithms can veto the decision of the majority. For example, when the majority of the algorithms determine that a pattern in the activity data 1204 is known, but an algorithm that has been assigned veto power identifies the pattern as unknown, the pattern recognition engine 1222 will determine that the pattern is unknown. In various implementations, some pattern recognition algorithms may be more accurate, and thus can be assigned the ability to veto the majority. These algorithms may always be more accurate, or may be more accurate in certain situations. Given these algorithms the ability to veto the majority can enable the pattern recognition engine 1222 to produce more accurate results.

Figure 13:
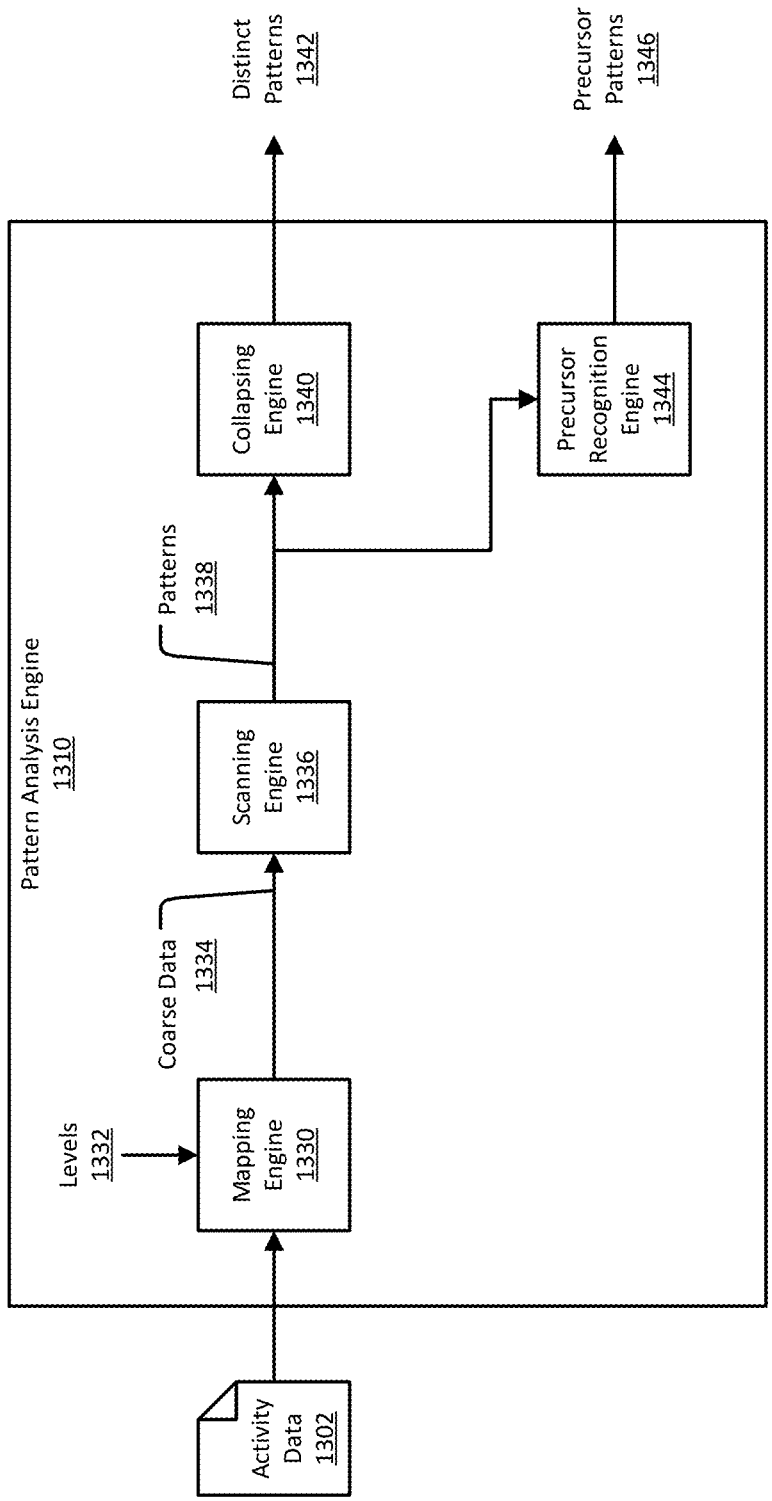
FIG. 13 illustrates in greater detail an example of a pattern analysis engine.

FIG. 13 illustrates in greater detail an example of a pattern analysis engine 1310. As discussed above, the pattern analysis engine 1310 can receive as input activity data 1302, and can output distinct patterns 1342 recognized in the activity data 1302. In the illustrated example, the pattern analysis engine 1310 can also output precursor patterns 1346, which can be used to recognize particular patterns. The example pattern analysis engine 1310 can be part of a pattern recognition and learning system, such as is discussed above. In the illustrated example, the pattern analysis engine 1310 includes a mapping engine 1330, a scanning engine 1336, a collapsing engine 1340, and a precursor recognition engine 1344.

The mapping engine 1330 can map the activity data 1302 to a coarser representation, using one or more levels 1332. As discussed further below, the activity data 1302 can be represented as actions occurring over a span of time. For example, the activity data 1302 can include user logins into an application, which can be sorted according to the time at which each login occurred. In this and other examples, the occurrences of user logins can be reduced to a time frame of interest, such as logins per hour or logins per day. The time frame of interest can depend on, for example, the particular action performed, the application on which the action was performed, the resource affected by the action, the cloud service provider that hosts the application, or the organization with which the user who performed the action is associated, or other factors. In some examples, the activity data 1302 is provided with occurrences of actions summarized for a time frame.

Because the activity data 1302 can include every occurrence of an action, the activity data 1302 can include occurrences that may not be statistically significant or may represent statistically small variations from a norm. Thus, in various implementations, the mapping engine 1330 can normalize the activity data 1302 to using one or more levels 1332. The levels 1332 can indicate thresholds of interest. For example, for a particular set of data, occurrences of an action between 0 and the 5th percentile of occurrences, and occurrences above the 5th percentile may be statistically interesting. In this example, when the number of occurrences of an action within a certain period of time is zero or non-existent, the number of occurrences can be normalized to zero; when the number of occurrences are between 0 and the 5th percentile of occurrences, the number of occurrences can be normalized to 5; and when the number of occurrences are greater than the 5th percentile, the number of occurrences can be normalized to 10. In these and other examples, "noise" in the activity data 1302, such as small or statistically insignificant variations can be normalized into the coarse data 1334.

In various implementations, the levels 1332 can be based on the contents activity data 1302. For example, different levels can be used for different applications, different actions that can be taken with respect to an application, different devices used to initiate actions, different users or groups of users, different time frames, different service providers, and/or different organizations. In some examples, only one level can be used, while in yet other examples more than two levels can be used, where the number of levels can be dependent on the data being analyzed.

The coarse data 1334 can be input into the scanning engine 1336. In various implementations, the scanning engine 1336 can scan the coarse data 1334 to find statistically active areas. For example, in some implementations, the scanning engine 1336 can apply a moving window of time to the coarse data 1334 and compute a variance over data within the window. For example, for a time series X={X1, X2, X3, . . . }, the scanning engine 1336 can generate a new series for the variance of a window of three elements, producing the series {Var(X1, X2, X3), Var(X2, X3, X4), Var(X5, X6, X7), . . . }. In this example, "X" represents a count of occurrences of an action or set of actions. Variance is a proxy for a variation from a mean. Computing a variance can enable significant or active events to be detected in a data asset. For example, the scanning engine 1336 can then apply a peak detection algorithm to the variance series to identify peaks of activity. The scanning engine 1336 can then use the location in time of the peaks of activity to identify patterns 1338 in the coarse data 1334. In various implementations, the size of the window can depend on the data being analyzed, including the action or actions represented by the data, the application and/or resource affected by the actions, the service provider that hosts the application, the device or devices used to initiate the actions, the network or geographic location of the devices, the user or users who performed the actions, and/or the organization with which the users are associated, among other factors.

In various implementations, the patterns 1338 represent actions that occurred over short periods of time, such as a few hours, a day, a few days, a week, or some other period of time. For example, one pattern can represent a number of file downloads per day over the course of one week. The patterns 1338 can individually and/or collectively represent routine use of an application, which can include repetitive behavior, recurring events, trends, and other behaviors.

In various implementations, the collapsing engine 1340 can identify and collapse repetitive or recurring patterns to identify distinct patterns 1342. Reducing the patterns 1338 to remove repetitive patterns can reduce the effort needed to learn the patterns. To identify similar patterns, the collapsing engine 1340 can, for example, identify patterns that have a Levenshtein distance of one or less, and combine these patterns together. In other examples, the collapsing engine 1340 can use another method for identifying similarity between patterns. Combining patterns can include, for example, determining an average value for each data point, and using the average value in the combined pattern. In other examples, a minimum, maximum, median, or other combined value can be used. In some examples, a combined pattern can be tagged with a number of instances of the pattern in the coarse data 1334.

The relationship between individual patterns may also be important. For example, one pattern may often be followed by a second. As another example, a set of distinct patterns may often occur together. To record the relationship between the extracted patterns 1338, the precursor recognition engine 1344 can analyze the patterns 1338 for these relationships. For example, the precursor recognition engine 1344 can treat the patterns 1338 as a linear time series, and conduct a linear analysis to identify recurring patterns-of-patterns. For example, given the series of patterns {A, B, C, E, F, G, X, Y, Z, A, B, C, . . . }, the precursor recognition engine 1344 can search for each occurrence of the pattern labeled "A" and see if this pattern is followed by the same sequence of patterns. In other examples, other techniques can be used to identify patterns among a series of patterns. The precursor recognition engine 1344 can output the patterns-of-patterns, referred to herein as precursor patterns 1346.

In some cases, the activity data 1302 can include anomalies, or actions that are not routine for an organization's users. In various implementations, the pattern analysis engine 1310, for example in the collapsing engine 1340 or the precursor recognition engine 1344, can include outlier detection, to identify patterns that may be anomalous, and not part of the regular activity of an organization's users. Outlier detection techniques include, for example, k-nearest neighbor techniques, local outlier factor techniques, cluster analysis, feature bagging, and score normalization, among others. In some examples, outlier patterns are not included in the output distinct patterns 1342 output by the pattern analysis engine 1310. In some examples, outlier patterns are stored and tagged for later analysis, to determine whether the outlier patterns represent actions that should be treated as a threat. In some examples, outlier patterns are stored in the pattern library, and may be checked against additional activity data to determine if the outlier patterns are infrequent patterns of routine behavior, rather than anomalies.

Figure 14:
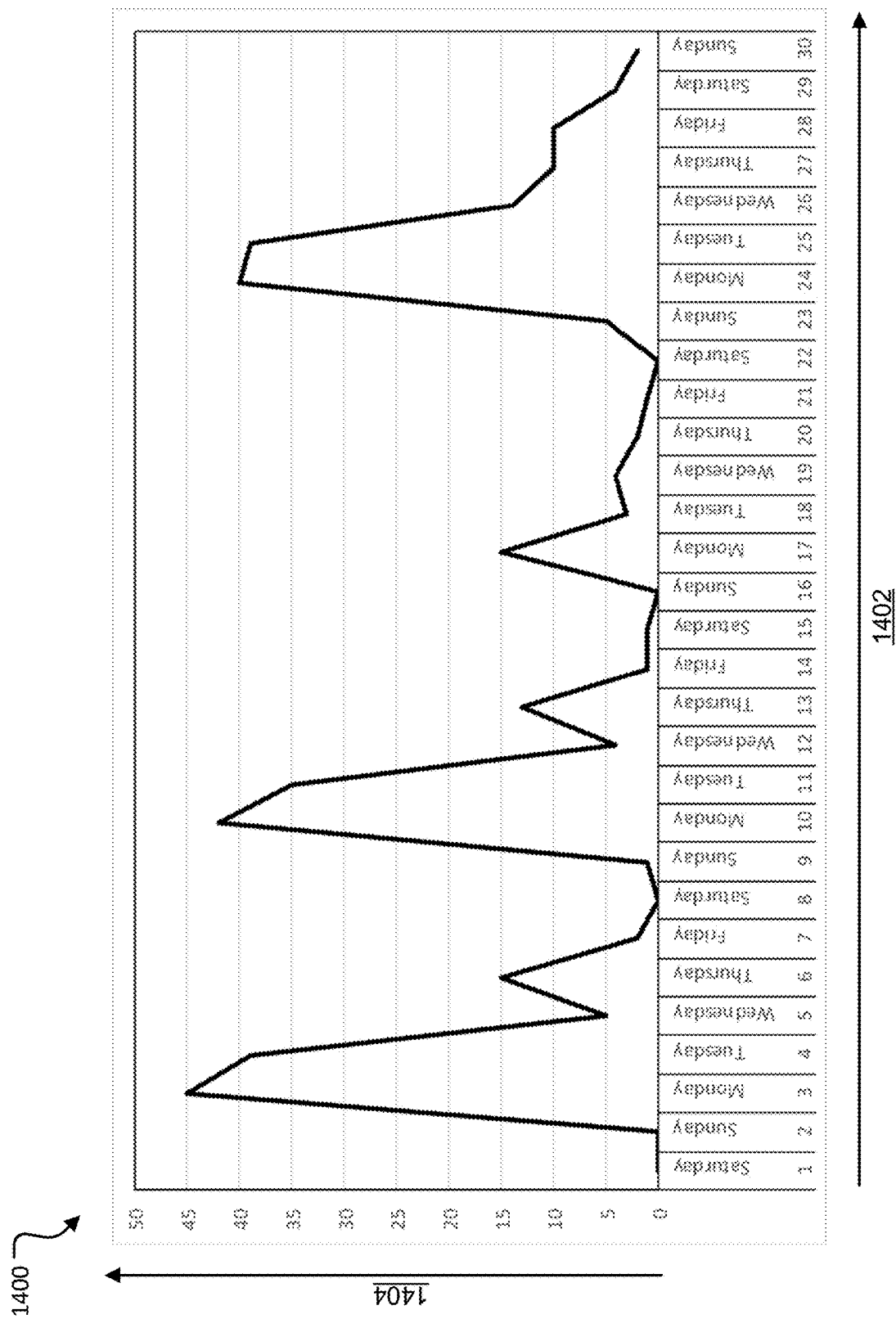
FIG. 14 illustrates an example of activity data, charted on a graph to provide a visualization of the data.

FIG. 14 illustrates an example of activity data, charted on a graph 1400 to provide a visualization of the data. In this example, the horizontal axis 1402 of the graph 1400 illustrates time, and the vertical axis 1404 illustrates occurrences. The graph 1400 covers a 30-day period, with days of the week marked for reference, with occurrences per day plotted.

The activity data illustrated in the graph 1400 can include one action taken with respect to one application or cloud resource. For example, the graph 1400 can illustrate the number of successful logins to a cloud resource initiated per day. In this example, the logins may have been executed by one user, a group of users, and/or a type of user. Alternatively, the activity data can include a set of actions taken with respect to an application or resource. For example, the graph 1400 can illustrate a number of occurrences of a user uploading and sharing a file per day. In some examples, the graph 1400 can illustrate actions taken with respect to multiple applications, such as a set of applications hosted by one cloud service provider. In some examples, the graph 1400 can illustrate actions take across cloud services providers, such as a file upload occurring with one service provider and a sharing of the file through another cloud service provider.

In the example of FIG. 14, patterns of behavior are apparent in the plot. For example, there is a high frequency of activity towards the beginning of each week, with less activity occurring later in the week. As a further example, there is more activity towards the end of the 30-day period. A regularity or routineness of these patterns could possibly be confirmed if more data were available.

Because the graph 1400 illustrates all the actions recorded in a set of activity data, the graph includes many small variations of behavior that may not be statistically significant. For example, it may be more important that the most activity occurred on Mondays and Tuesdays, and less important that less activity occurred on Tuesday than on Monday. As another example, it may be more important that some activity occurred on Wednesday and Thursday, and not that more activity occurred on Thursday.

Figure 15:
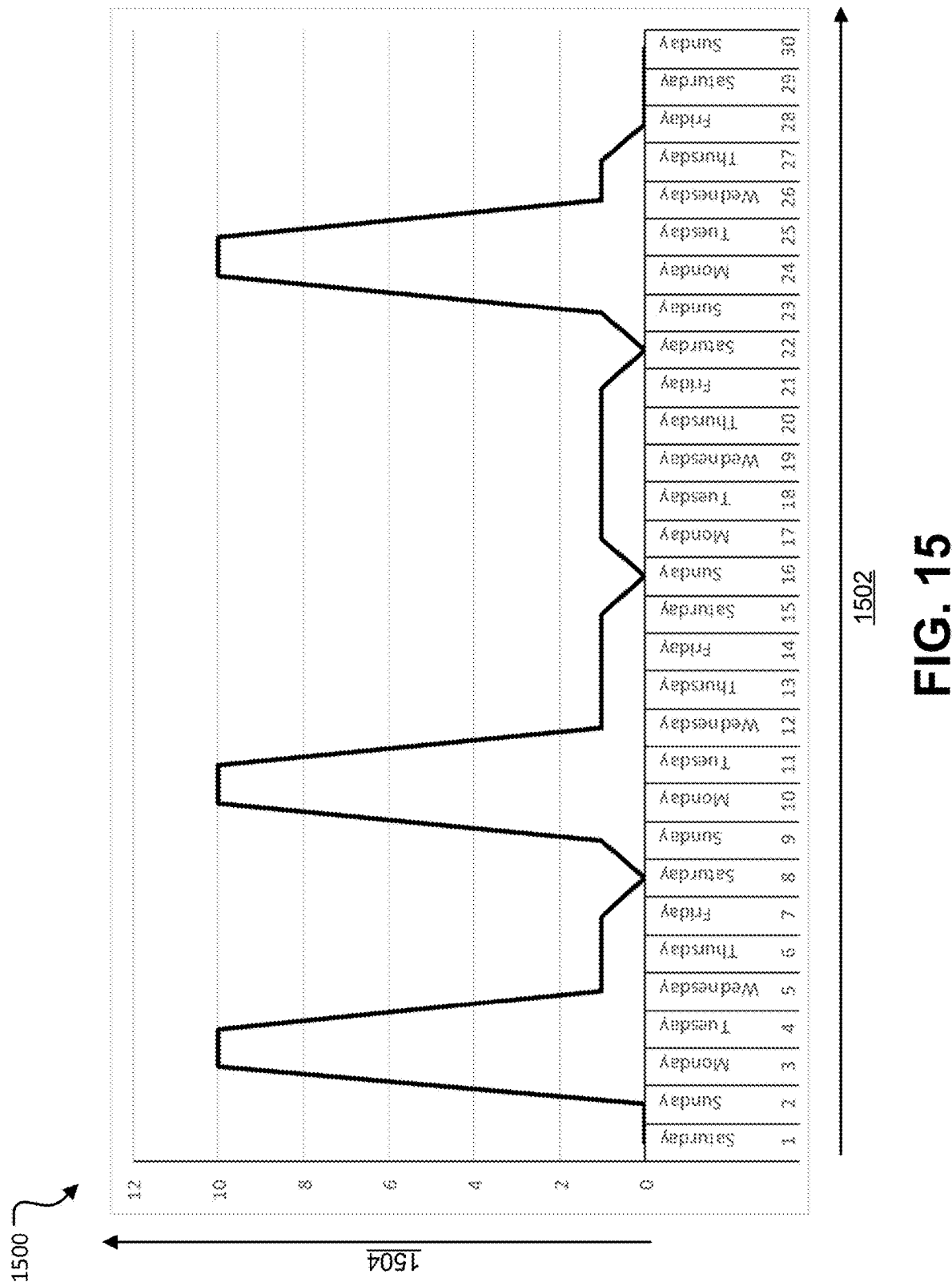
FIG. 15 illustrates an example of a coarse data representation for the data plotted in FIG. 14.

For these and other reasons, a pattern recognition and learning system may normalize the activity data into a coarser representation. FIG. 15 illustrates an example of a coarse data representation for the data plotted in FIG. 14. In the graph 1500 of FIG. 15, the horizontal axis 1502 illustrates time, with days of the week marked for reference, and the vertical axis 1504 illustrates normalized occurrences. The graph 1500 covers the same 30-day period illustrated in FIG. 14. In various implementations, the data illustrated in the graph 1500 of FIG. 15 can be computed, for example, by a mapping engine of a pattern recognition and learning system.

In the graph 1500 of FIG. 15, the activity data has been normalized according to the following formula:

$$y = \begin{cases} 0, & x = 0 \\ 1, & 0 < x < 15 \\ 10, & x \geq 15 \end{cases}$$

In this example, two levels have been used as normalization thresholds, "0" for all number of occurrences that are equal to 0, and "15" for all non-zero occurrences that are less than 15 and greater than or equal to 15. These levels can have been chosen based on the activity data. For example, in the activity data plotted in FIG. 14, most of the occurrences per day are below 15, with some counts over 15 occurring. Also in this example, counts of 0 may be significant, so have been preserved in the normalized data. In other examples, fewer or more levels can be used, as needed to obtain a useful generalization of activity data. For example, for the activity data plotting in FIG. 14, levels of 0, 5, and 15 could alternatively have been used, to capture spikes of activity occurring on days 6, 13, and 17.

Figure 16A:
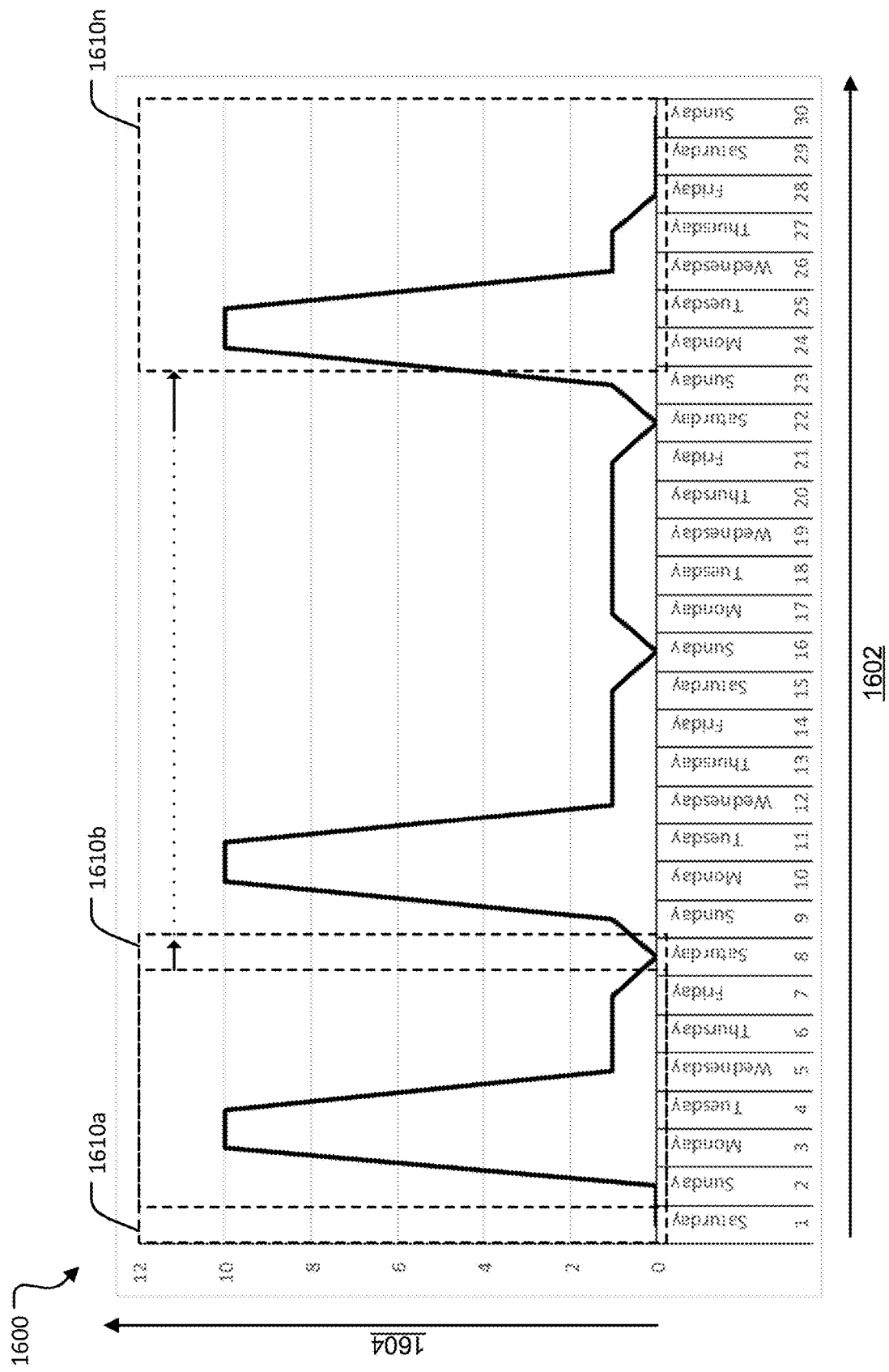
FIG. 16A illustrates an example of a technique for identifying patterns in the coarse data.

The coarse data plotted in FIG. 15 includes the patterns of activity in the original activity data, but without small variations that may not be significant. Patterns can be extracted from the coarse data, where each pattern captures activity over a smaller range of time. FIG. 16A illustrates an example of a technique for identifying patterns in the coarse data. The graph 1600 of FIG. 16A illustrates the coarse data illustrated in FIG. 15. In FIG. 16A, the horizontal axis 1602 illustrates time (a 30-day period) and the vertical axis 1604 illustrates a normalized number of occurrences.

In the example of FIG. 16A, a sliding window of time is used to identify patterns in the coarse data. A first window 1610a is illustrated overlaying the graph 1600, where the first window 1610a includes the first seven days of the graph 1600 (days 1 through 7). The pattern recognition and learning system, for example using a scanning engine, can compute a variance for the values within the first window 1610a. This first variance value can be stored in a vector of variance values. A second window 1610b is also illustrated, where the second window 1610b is shifted over by one day, and thus covers days 2 through 8. A variance can also be computed for the values in the second window 1610b. This second variance value can also be added to a vector of variance values. The window of seven days can continue to be shifted by one day, and for each shift a variance value can be computed. A final window 1610n for this data set is illustrated, and includes the last seven day (days 24 through 30). In this example, the vector of variance values will include 24 values.

The size of the window used in the technique illustrated in FIG. 16A can be selected based on the data being analyzed. For example, the activity data normalized and plotted in the graph 1600 may be for an application that is used primarily during the business hours of an organization, with users of the organization occasionally remotely using the application on the weekends. Thus, in this example, a seven-day window was selected to correspond to a window of time that may include typical activity for the users of the organization. In other examples, the window of time may be selected according to the granularity desired for the determined patterns. For example, when the activity data covers a whole year or multiple years of activity, a seven-day window may still be used, in order to obtain patterns that can capture activity over the course of days. Alternatively or additionally, in this example a two week or one-month window can be used, to obtain patterns that span multiple weeks.

In various implementations, the vector of variance values can be input into a peak detection algorithm, to detect peaks on the coarse data. Any standard peak detection method can be used. Peaks in the coarse data can be used as focus points for finding patterns in the coarse data. In some examples, troughs between the peaks can be used to separate individual patterns. Alternatively or additionally, in some examples, individual patterns may be separated by a midpoint between peaks. Alternatively or additionally, another criteria can be used to separate individual patterns, such as a requirement that each pattern include a minimum and/or maximum number of data points before and/or after the peak.

Figure 16B:
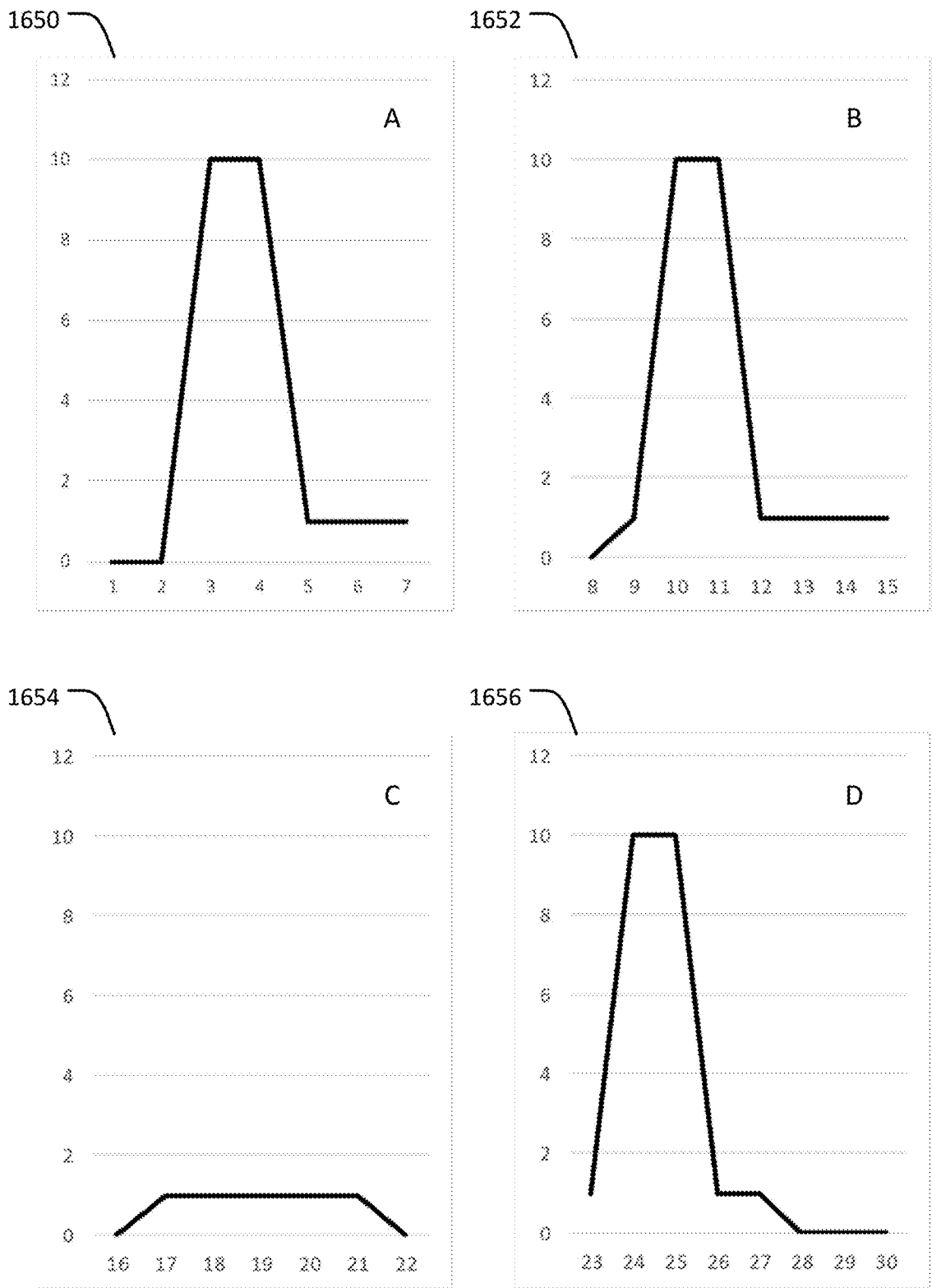
FIG. 16B illustrates four patterns that were extracted from the coarse data graphed in FIG. 16A.

FIG. 16B illustrates four patterns that were extracted from the coarse data graphed in FIG. 16A. The first pattern 1650 in FIG. 16B, which has been given the label "A," is focused around a peak occurring between days 3 and 4. The second pattern 1652, which has been labeled "B," starts at a trough occurring on day 8 and is focused on a peak occurring on days 10 and 11. A third pattern 1654, labeled "C," is focused on a small peak occurring over days 17 through 21, and starts and stops at troughs found at days 16 and 22. The fourth pattern 1656, labeled "D," is focused around a peak occurring over days 24 and 25. In other examples, the start and stop points of these example patterns may vary slightly, and/or may overlap. For example, the minimum occurring on day 8 can be assigned to the first pattern 1650 instead of the second pattern 1652, or can be assigned to both patterns.

The patterns illustrated in FIG. 16B illustrate an example of all the patterns extracted from a set of activity data. As discussed above, each individual pattern can be learned using a machine learning algorithm or multiple machine learning algorithms. Models developed by learning the individual patterns can then be used to identify occurrences of similar patterns in new activity data.

Figure 17:
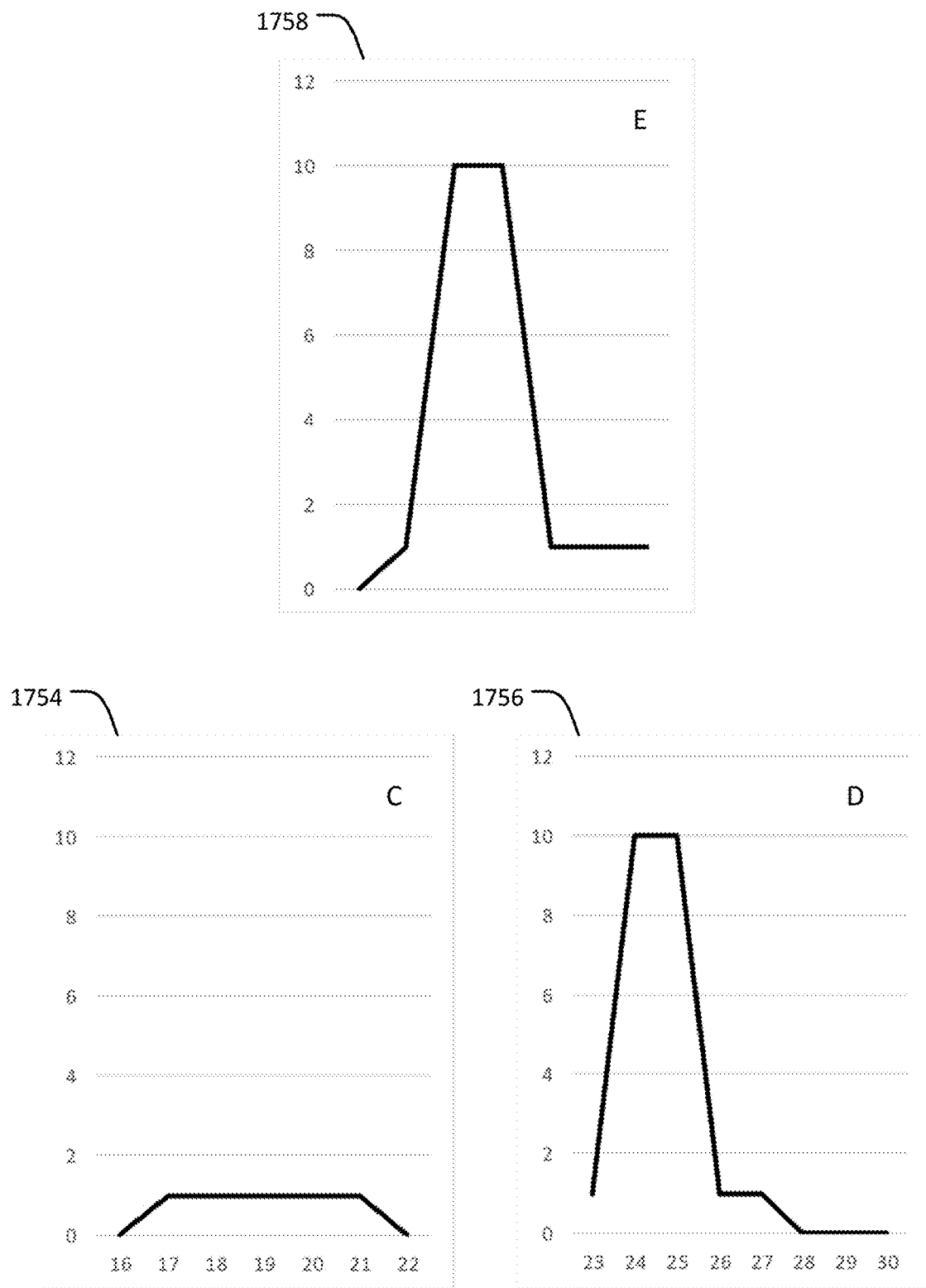
FIG. 17 illustrates an example of distinct patterns determined from the patterns illustrated in FIG. 16B.

In some cases, similar patterns may be extracted from a set of activity data. For example, pattern "A" illustrated in FIG. 16B is fairly similar to pattern "B," including spanning the same number of days, having a peak at two and three days from the start of the pattern, and leveling off over the last two or three days of the pattern. For learning the individual patterns, similar patterns may not provide any additional information. Thus, in some implementations, similar patterns may be combined or removed from the detected patterns. FIG. 17 illustrates an example of distinct patterns determined from the patterns illustrated in FIG. 16B. In FIG. 17, a first pattern 1758, labeled "E," is combined from patterns "A" and "B" in FIG. 16B. A second pattern 1754 and a third pattern 1756 in FIG. 17 are the same as patterns "C" and "D," respectively, in FIG. 16B, since no other patterns that are similar to patterns "C" and "D" occurred. In some implementations, the pattern recognition and learning system can include a collapsing engine that can identify statistically similar patterns. In some implementations, the collapsing engine can combine similar patterns. Combining patterns can include, for example, averaging each of the data points in the similar patterns, or taking a maximum, minimum, or median value among the data points provided by similar patterns.

Though similar patterns may not be helpful in learning unique patterns, these patterns may useful in identifying patterns-of-patterns or precursor patterns. For example, activity data covering a year of activity or multiple years of activity may indicate that pattern "E" of FIG. 17 often occurs twice at the beginning of each month. Thus, in this example, the pattern recognition and learning system, for example using a precursor engine, can determine a precursor pattern (E, E) that may occur at the start of each month. As another example, the activity data may indicate that two occurrences of pattern "E" are often followed by pattern "C." In this example, a precursor pattern (E, E, C) may be identified. As another example, the activity data may indicate that the pattern (E, E, C, D) occurs almost every month. In these and other examples, these patterns-of-patterns can also be learned, or can be learned in combination with the distinct patterns.

Figure 18:
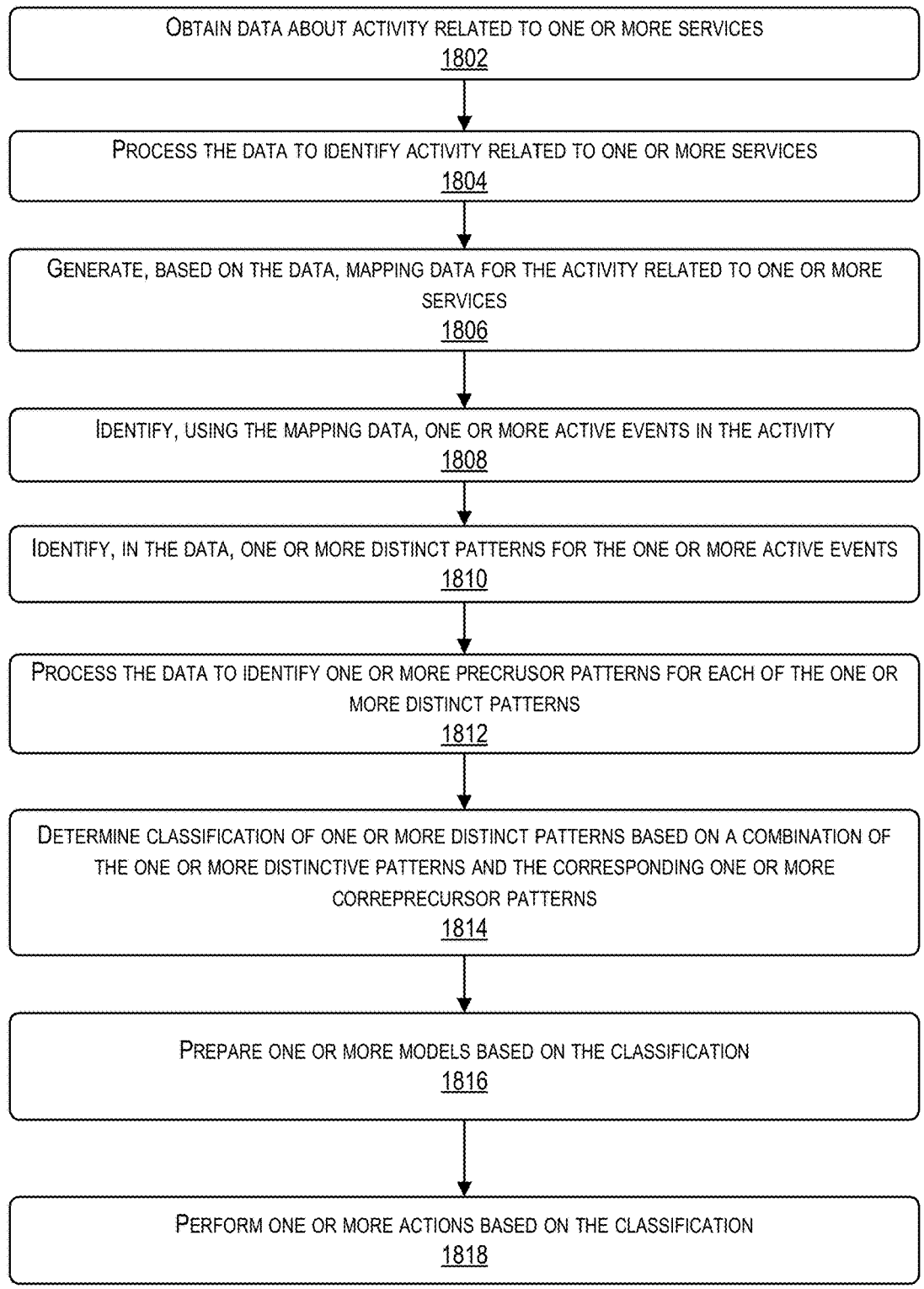
FIG. 18 illustrates an example of a process for identifying and learning patterns in usage of services provided by one or more service providers.

FIG. 18 illustrates an example of a process 1800 for identifying and learning patterns in usage of services provided by one or more service providers. The process 1800 may include one or more blocks, such as the blocks shown in FIG. 18. In some examples, one or more features of the process 1800 can be performed by a security monitoring and control system, such as is discussed above. The sequence of blocks illustrated in FIG. 18 may be adjusted in order and with lesser blocks or repetition of some blocks. Techniques disclosed with reference to the process 1800 may be implemented with regard to discerning patterns based on assessing multiple different attributes, a single attribute for multiple services from the same or different service providers, multiple users or accounts, or combinations thereof. Patterns with respect to multiple different attributes may processed in the manner disclosed for a single attribute and the patterns may be discerned based on the patterns individually or a combination over a time period.

At step 1802, data about activity, also referred to herein at "activity data," may be obtained for one or more services. Activity data may be obtained from one or more service providers. Activity data may be referred to herein as time series data, which is data that is bound by a time (or time series). Services may include applications and/or features related to those applications. Activity data may include structured data, unstructured data, semi-structured, or a combination thereof. For example, activity data may include data related to an application, including network activity and/or data recording usage of the application. Activity data may be obtained for one or more users, for one or more applications, and/or for one or more service providers.

Techniques may include determining activity data for a service provider with respect to use of a service. Activity data, such as audit trail data, may include user actions for use of an application. The activity data may indicate actions performed, users that performed the action, one or more objects impacted by the action(s), contextual data such as timestamp, network location from where user performed the action, and so on. In some examples, activity data about activity and/or events (also referred to herein "event action" or "action event") such as for accessing a service may be received as time series data. Examples of activity or events include, without limitation, operations (e.g., copy, upload, download, share, or delete) for accessing a resource (e.g., a file), events for accessing an application (e.g., number of failed login attempts or number of successful logins), events related to sharing data, a measure of communication (e.g., communication within a group), events for settings related to a service, and operations for changing privileges of users. The activity data may include time series data including a value for one or more attributes related to activity or events for accessing a service. For example, a value of an attribute in activity data may indicate a measure representing the attribute for an activity or event. The time series data may include one or more signals, each signal representing time series data for a particular attribute over a time period. An attribute may be defined for an activity or an event which defines an aspect of the activity.

Activity data may be aggregated from one or more service providers with respect to applications accessed by users. Data about network activity may be obtained by monitoring and/or obtaining data (e.g., log data or record data) from network devices. For an organization to monitor application usage, an organization may monitor its internal, or protected network (e.g., Intranet) for network activity. Network activity may be monitored by obtaining information from network resources (e.g., a network device) of network traffic within and external to the network of the organization. In some examples, data may be obtained from a data source and/or via an interface facilitated by input from a user.

In some examples, data about activity of application usage is determined by communicating with a service provider to obtain data (e.g., audit trail data or log data) concerning one or more accounts (e.g., user accounts or tenant accounts) and activity with respect to services that are associated with those accounts. The data may be in raw or semi-structured form of time series with respect to attributes related to activity and/or events for accessing services. A service may include providing an application. Obtaining data may include using credential information for an account to access the account at the service provider to retrieve the data. Data may be aggregated from multiple service providers to determine application usage for a particular user or tenant. Each service provider may be different in implementation including an interface. Data may be shared between applications, and applications may be shared with a group (e.g., a tenant or an organization).

At step 1804, activity data may be processed to identify activity related to one or more services. The activity may include actions performed on one or more services and/or information about users that performed those actions. Processing the activity data may include parsing the activity data to identify the information, about the users and the action(s) the users performed on one or more applications. In some examples, a big data processing system is implemented to handle large volumes of activity data. Activity data may be parsed based on a model or a template that defines the format of the activity data obtained for a particular service provider. The activity data may be processed to identify actions performed by users with respect to each unique application. In some examples, activity data may be processed to determine activity for applications including, without limitation, a type of action, the number of occurrences of an action, a user that performed the action, other information about accessing or operating an application, or combinations thereof. Actions may be identified based on their type (e.g., create, share, delete, or etc.), logins, login geolocation, and compute instances. In some examples, time series data may be identified in activity data per user or a group of users for analysis.

At step 1806, mapping data may be generated for the activity related to one or more services. Mapping data may be based on the activity data with respect to conversion of the value of one or more attributes in the activity data. The activity may be mapped with respect to one or more users for a service. Usage patterns may be assessed on the data processed to identify the activity.

When the data is represented as time series data for one or more attributes, mapping data may be generated for the data with respect to each attribute. The data represented as time series may include a value for an attribute over a time period in the time series. The exact numerical values for an attribute may have lesser significance as users tend to have different levels of work habits, or have different roles, or may behave differently during different times of the year. The time series data for any attribute may provide a fine grain representation of an activity related to a service such that identifying a pattern in time series data may be difficult to accomplish. Because the time series data may be too granular to analyze, mapping data may provide a broader or coarser representation of the data for analyzing patterns. To implement techniques disclosed herein for identifying and monitoring patterns in activity data, the data may be mapped to a coarser representation of the data, such as broader categories of values that an attribute for an activity falls into. Activity defined by one or more attributes may fall into subsets (or categories) defined by one or more values that have meaning related to an activity. Over a time period, assigning the values for an attribute to one of the categories may filter, or provide a mapping that is a coarser representation of those values for the time period. Each subset for an attribute may be defined by an upper bound threshold value (e.g., a threshold for a highest value) for the attribute, a lower bound threshold (e.g., a threshold for a lowest value) for the attribute, or a combination thereof. The subsets may be selected based on known patterns or activity associated with malicious and non-malicious use of a service. The subsets for mapping may be defined based on, without limitation, a user, a group of users, a service, or a provider. The thresholds for each subset may be defined based on previous patterns or behavior with respect to an activity or use of a service by a user in an organization.

The values of an attribute in time series data may be mapped to a value based on a subset in which the value falls. As explained above, each subset may be defined by a threshold (e.g., upper and lower thresholds). For example, if a value of an attribute is missing or 0, then the value is mapped to a 0, if a value of an attribute is greater than 0 (e.g., lower bound threshold and less than a threshold value (e.g., an upper bound threshold defined as a threshold percentile of all possible values), then the value is mapped to 1, else, the value is mapped to a 10.

At step 1808, one or more active events are identified in the activity data using the mapping data. Using the mapping data, the value for an attribute may be assessed for the activity data over a window of time (e.g., time period) that is shifted for time intervals in the time series of the activity data to determine variance. The time period of the window and the time interval for which the window of time is shifted may vary with respect to the attribute being assessed. For example, the time period of a window and the time interval to shift a window may be selected based on seasonal activity for use of a service with respect to the attribute being assessed. The time interval may be adjusted based on a level of precision to detect peak values as discussed below. For each window of time, the values for the attribute in the mapping data corresponding to the time series for the activity data corresponding to that window is assessed. Based on the values in the mapping data for each window, the variance for the window may computed for the attribute.

The time series data for an activity or event related to a service may present a lot of noise for identifying significant events. The mapping data, alone, may be useful to determine significant events based on identifying values corresponding to data within particular subsets. Some analytical systems may analyze activity data to determine an average value for the attribute over any given time period. An average value of any given window of values for an attribute may not be indicative of a significant event related to a service. Therefore, computing a variance of values in a window of time shifted across a time period may be useful for detecting a peak or a specific value (e.g., a high value) that is indicative of a significant event for a service based on the attribute.

In some examples, step 1808 can include scanning for occurrences of statistically significant values in a time series of activity data. The activity data may be assessed using the mapping data for a moving window of time with respect to a time series of the activity data. For example, variance can be computed for each window of time, and the variance values can be used to identify peaks of activity.

At step 1808, the variance computed for an attribute for windows during a time period may be assessed to determine one or more high values (e.g., peak values) in the variances for a time period. Each of the peaks, or a combination of the peaks, may correspond to a noteworthy, or "active" event. One or more algorithms may be implemented to determine the peak values in a time period based on the variances computed during that time period. The algorithm(s) may include one or more peak detection algorithms. The algorithm(s) may be implemented using one or more programming libraries. The programming libraries may be implemented using Python. The programming libraries may include a callable interface of functions to determine peak values in a set of values, which are variance values computed for time series data. In one example, a programming library such as PeakUtils library based on Python language is implemented to determine a peak value in a set of variance values computed at step 1808. The library may include a programming interface to utilize functions for peak detection.

The peak values may be identified in a time period based on the windowed variance values. One or more data structures (e.g., an indexed array) may be implemented to store the values in each window and the variances computed for each window of time. The data structure(s) may be used to detect the peaks in the variances. In some examples, at step 1808 a peak value is detected that represents a peak of the variances. The peaks may be used to detect patterns of values for an attribute in the time series data. The peak may be identified by indices (e.g., a pair of indices) in the time services where the peak value occurs in the variances. The indices may include a lower bound index corresponding to a time in the time series data where the peak begins and an upper bound index corresponding to a time in the time services data where the peak ends. Based on the identified peak, using the indices for the peak, the data corresponding to the peak in the time series is identified and extracted from the activity data. The identified peaks may be useful for identifying anomalous patterns using techniques discussed below. The variance values may often relate to routine or common patterns for usage of a service. In order to find distinct patterns, techniques disclosed below, such as in step 1810, may factor (e.g., collapse) similar or frequently occurring patterns.

At step 1810, in the data obtained about activity, one or more distinct patterns (also referenced herein as "signatures" or "fingerprints") are identified for the active event(s) that are discovered using the mapping data. Step 1810 may include generating a library of patterns identified in the activity data based on the variance values for the attribute determined based on the activity data. Each pattern may be identified based on one or more variance values. Each pattern may be defined by activity data for one or more time periods, each time period corresponding to a window of time for the variance value based on which the pattern is identified. Each variance value for a window of time considered for the activity data may be a pattern, or multiple variance values as a combination, may be a pattern. A pattern may be based on the individual values (e.g., X1, X2, and X3) for an attribute in the window of time considered for a variance value. One or more patterns may be grouped together as a pattern based on a measure (e.g., an edit distance) less than a threshold. An edit distance may be determined using a technique such as a Levenshtein edit distance algorithm, which can be based on a distance (e.g., a distance of 1 or less) to identify distinctive patterns. For example, patterns may be combined based on the variance values having an edit distance less than a threshold (e.g., 1).

At step 1812, the activity data may be processed to identify one or more precursor patterns (also referred to herein as "precursor signatures" or "precursor fingerprints") for each of the one or more distinct patterns identified at step 1810. Taking a single pattern that is distinctive, the patterns leading up to the distinctive pattern may be identified, each being stored individually and in combination with respect to the distinctive pattern. Precursor patterns are simply patterns that lead up to the aforementioned collection of pattern(s). For e.g. if X={ . . . X8, X9, X10, . . . } is a 3 element pattern of interest (e.g., a distinctive pattern), then a couple of precursor patterns would be pattern 1 {X6, X7, X8, X9} and pattern 2 {X5, X6, X7, X8}. Precursor patterns are of interest because they provide an early annunciation of an upcoming pre-detected patterns (e.g., active patterns) that relate to a significant, or active event. One or more data stores may be implemented as libraries to store the data for the patterns including precursor patterns. The libraries may be implemented to store the distinctive patterns, and the precursor patterns, for classification using one or more learning techniques.

At step 1814, one or more classifications are determined for a collection of patterns including the one or more distinctive patterns and the one or more precursor patterns corresponding to each of the one or more distinctive patterns. One or more algorithms are used to classify the patterns. Examples of algorithms include one or more classifier algorithms. In some examples, multiple algorithms (e.g., an ensemble of algorithms) may be implemented to classify the patterns in the collection. Multiple algorithms may be applied to provide an improved, reliable assessment of patterns.

Each of the algorithms may be based on one or more models of patterns including distinctive patterns and precursor patterns. Precursor patterns may be used for identification detection of patterns early and patterns leading up to a distinctive pattern or a collection of patterns. Each of the models may be based on one or more supervised learning techniques, one or more unsupervised learning techniques, or a combination thereof. For example, one or more models of patterns may be trained based on one or more deep learning techniques. As another example, one or more models may be trained based on random forest learning techniques. In some examples, one learning technique is a deep learning implemented using one or more programming libraries for deep learning. The programming library(s) may be implemented in Python. For example, Keras deep programming library implemented in Python is used to train a model for classification of patterns. Keras implements one or more high-level neural networks. The programming library may provide a callable programming interface (e.g., an application programming interface (API)). A programming library, such as Keras, may be configured to be implemented with other programming libraries or interfaces, such as a library for machine learning (e.g., TensorFlow), a deep-learning toolkit that implements neural networks (e.g., Microsoft® Cognitive Toolkit), or Theano (e.g., a Python library). The algorithms may be distinct from each other to determine a best assessment of the patterns. The library of patterns (e.g., past behavior) may be used to train the models using the various learning techniques. Classification of patterns may be determined based on one or more trained models. The number of models generated may be based on a factor of the number of algorithms implemented for patterns with respect to attributes related to usage of or access to services provided by a service provider.

Implementation of each of the algorithms may produce a result that indicates whether a pattern (e.g., a distinctive pattern) and its precursor patterns are normal such that the combination of the patterns has been learnt through classification. The result may be represented as a value defined by a scale (e.g., 0 to 1) that indicates a degree or measure of a match of the combination of patterns with any of the patterns in the libraries.

Based on the results from implementation of each of the algorithms, a determination can be made whether to classify a distinctive pattern and its corresponding precursor patterns as known or previously learned. In other words, a classification as to whether a collection of patterns is known or unknown (e.g., new) is based on the result. The result may be assessed for classification based on a threshold. Current solutions may determine a classification based on an average of results for applying multiple algorithms. Such classifications may not be accurate or may result in false positives for identifying known patterns. In some examples, a classification strategy applies multiple algorithms using multiple models. One strategy is a veto strategy such that if at least one algorithm classifies a distinctive pattern and its corresponding precursor pattern as normal or learned if at least one algorithm classifies the combination of patterns as known. In some examples, the veto strategy may be implemented based on at least multiple (e.g., 2, 3, 4, or more) algorithms determining that the combination of patterns, including a distinctive pattern and its corresponding precursor pattern, is known. The veto strategy and/or application of multiple algorithms may be adjusted based on the service and/or attribute(s) considered. One or more weights may be applied to each result based on the technique implemented for the classification, including the algorithm and the learning techniques applied to the model. The veto strategy may be implemented based on determining a combination results of each of the results factoring weights applied to some or all results. When the total result includes or represents a value that satisfies a threshold, the collection of patterns may be identified as known. For example, when the value representing a result of a classification from each of multiple classifications (some of which may be weighted) are added up, the sum may be compared to a threshold (e.g., a value of 1) to determine how close the classifications are collectively weighted to indicate the existence of a known pattern. Some algorithms may be weighted differently based on quality of previous results and/or the attribute considered for usage of a service.

At step 1816, one or more models may be prepared (e.g., generated or updated) based on the classification. For example, a model is updated for a learning technique (e.g., deep learning) based on the classification determined for a pattern. Step 1816 may be performed as part of a process for preparing one or more models to be trained for classifying patterns.

The process 1800 may be implemented for multiple instances to process new activity data to either build one or more models and/or classify patterns identified in the data. Some of the blocks in process 1800 may not be implemented for subsequent activity data once a model is prepared. In addition to classifying a pattern, one or more models may be prepared at step 1816 to improve training of models.

At step 1818, one or more actions may be performed based on the classification at step 1814. Actions may include notifying one or more users at clients, providing a graphical interface as disclosed herein, adjusting operation of the process 1800 for building models and/or classification of patterns, and/or adjusting or providing options to adjust one or more security controls/settings for the service (s) provided by one or more service providers from which activity data was obtained.

Figure 19:
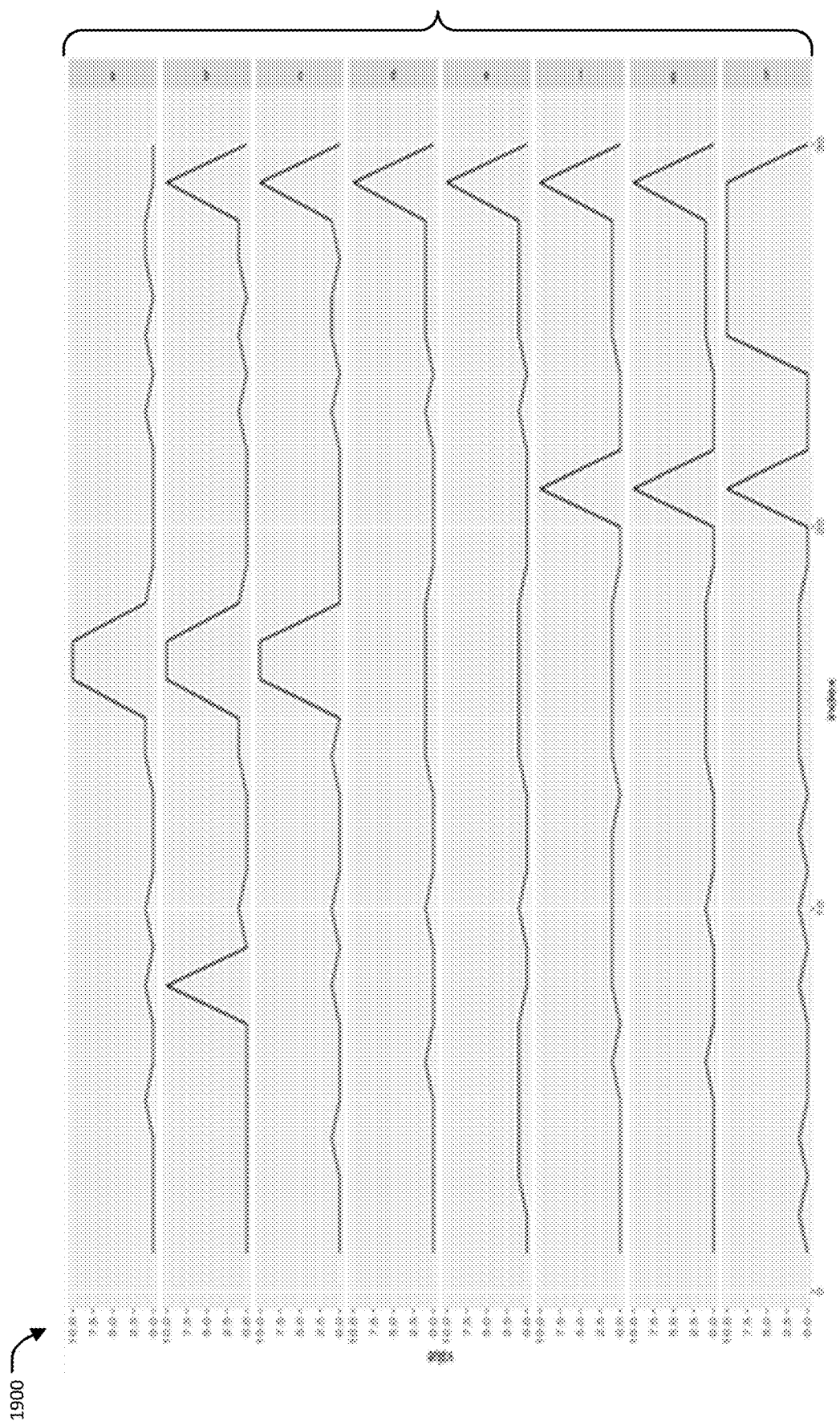
FIG. 19 illustrates graphs of examples of activity data for a set of users.

FIG. 19 illustrates graphs of example of activity data 1900 for a set of eight users 1902. In this example, the activity data 1900 records occurrences of an action taken by each of the users 1902 over the same period of time. The action can be, for example, logins to a cloud service, file uploads, emails sent, or another action. In some examples, the activity data 1900 can represent routine usage of the application by these eight users 1902. The activity data 1900 can thus be input into a pattern recognition and learning system to identify patterns that can be used to identify anomalous behavior.

Figure 20:
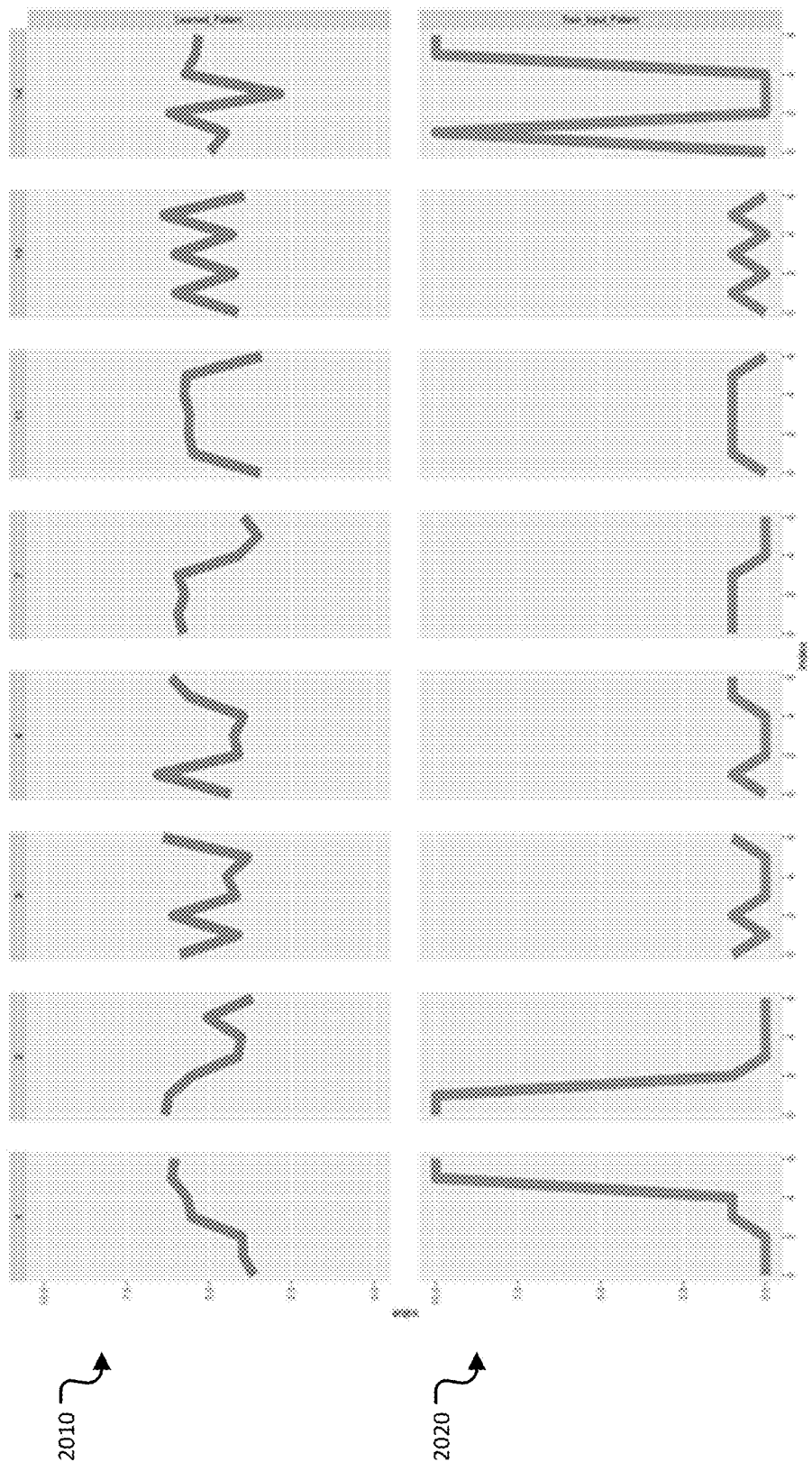
FIG. 20 illustrates examples of patterns extracted in an unsupervised manner from the activity data illustrated in FIG. 19, and learned representations or models generated from the extracted patterns.

FIG. 20 illustrates examples of patterns 2020 extracted in an unsupervised manner from the activity data illustrated in FIG. 19, and learned representations or models 2010 generated from the extracted patterns 2020. The patterns 2020 illustrated in FIG. 20 include distinct patterns extracted from the activity data. As illustrated by FIG. 20, the models 2010 learned from the patterns 2020 closely follow the patterns 2020. This illustrates that unsupervised learning can be effective in identifying distinct patterns of activity.

In some examples, a security monitoring and control system can provide interfaces, such as graphical interfaces, for monitoring patterns in usage of services in a computing environment. Each of the graphical interfaces, such as a graphical user interface (GUI), may be displayed as a client with access to services provided by the security monitoring and control system discussed above. The graphical interfaces may be displayed as part of an access portal, such as a website or in an application. Any of the graphical interfaces may be configured with respect to one or more users (e.g., a group of users), one or more services, one or more service providers, one or more attributes related to usage of a service, or combinations thereof.

In some examples, a graphical interface may be generated to display the example graphs illustrated in FIG. 19. A graph or other type of chart may be shown to display patterns with regard to an attribute related to usage of a service. In some examples, a graphical interface can alternatively or additionally be generated to display the example patterns and models illustrated in FIG. 20.

In some examples, a graphical interface may be generated to display elements that are interactive to enable configuration of one or more parameters to configure the process of FIG. 18 including a time period of a window, attributes to monitor, and features of learning techniques including how classification is determined for particular attributes.

In some examples, a graphical interface may be generated to display notifications about patterns that are classified, and whether a pattern has been detected based on classified patterns. Notifications may be with respect to the occurrence of a precursor pattern before any distinctive pattern or collection of patterns are detected. Notifications may include alerts based on a severity of a pattern, which may be based on a frequency of occurrence.

In some examples, a graphical interface may be generated to display changes or options for changes to one or more settings/controls for one or more service providers based on detected patterns. The graphical interface may present options for adjusting security controls based on the occurrence or non-occurrence of patterns. One or more policies may be considered to assess pattern occurrence for recommending and/or automatically changing security controls or settings.

Figure 21:
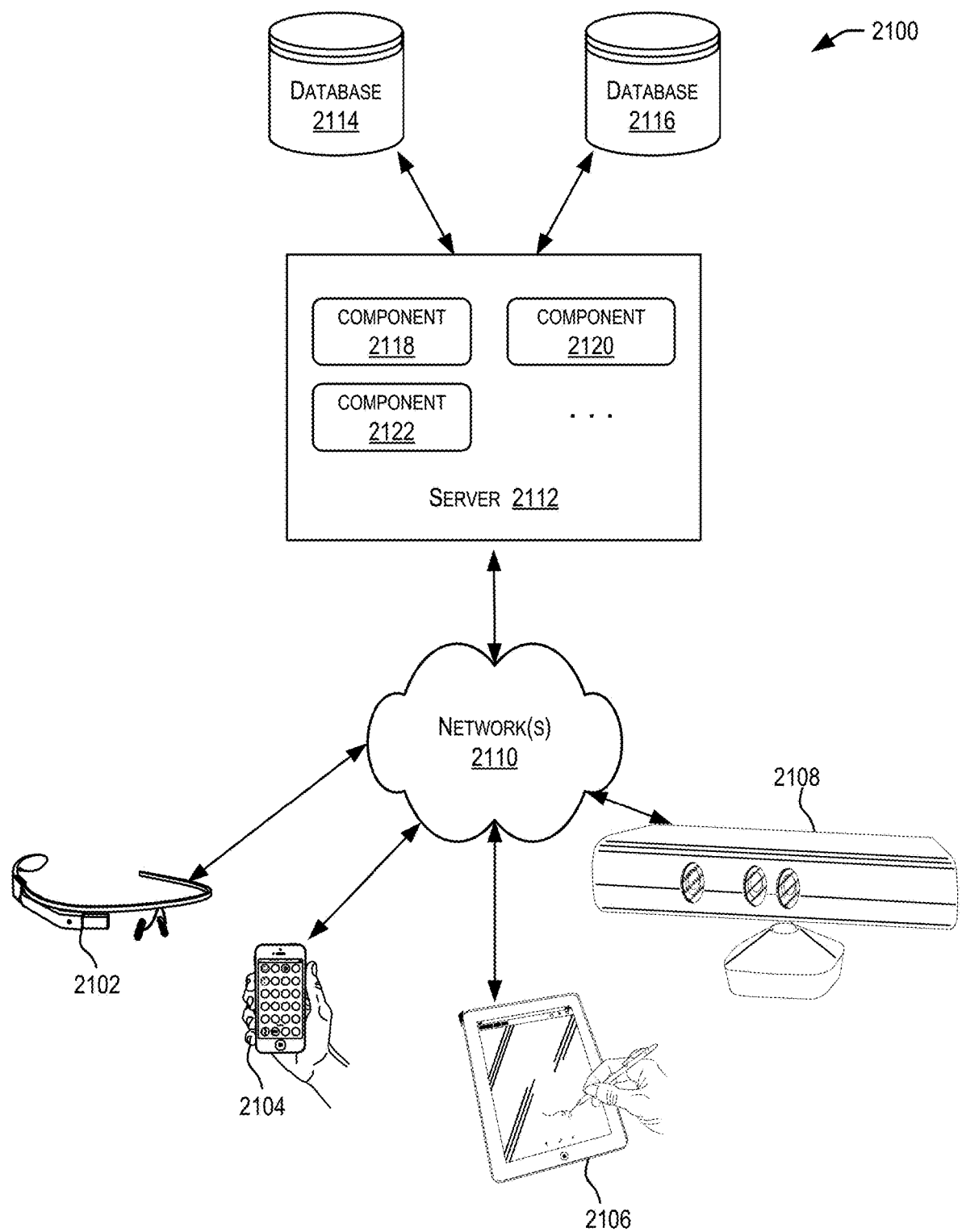
FIG. 21 depicts a simplified diagram of a distributed system in which the various examples discussed herein can be implemented.

FIG. 21 depicts a simplified diagram of a distributed system 2100 in which the various examples discussed above can be implemented. In the illustrated example, the distributed system 2100 includes one or more client computing devices 2102, 2104, 2106, 2108, which are configured to execute and operate a client application such as a web browser, proprietary client (e.g., Oracle Forms), or the like over one or more network(s) 2110. A server 2112 may be communicatively coupled with remote of the client computing devices 2102, 2104, 2106, 2108 via the network 2110.

In various examples, the server 2112 may be adapted to run one or more services or software applications. In some examples, the server 2112 may also provide other services or software application, and can include non-virtual and virtual environments. In some examples, these services may be offered as web-based or cloud services or under a Software as a Service (SaaS) model to the users of the client computing devices 2102, 2104, 2106, 2108. Users operating the client computing devices 2102, 2104, 2106, 2108 may in turn use one or more client applications to interact with the server 2112 to use the services provided by these components.

In the configuration depicted in FIG. 21, software components 2118, 2120, 2122 of the system 2100 are shown as being implemented on the server 2112. In other examples, one or more of the components of the system 2100 and/or the services provided by these components may also be implemented by one or more of the client computing devices 2102, 2104, 2106, 2108. Users operating the client computing devices may then use one or more client applications to use the services provided by these components. These components may be implemented in hardware, firmware, software, or combinations thereof. It should be appreciated that various different system configurations are possible, which may be different from the example distributed system 2100. The example shown in FIG. 21 is thus one example of a distributed system for implementing any system and is not intended to be limiting.

The client computing devices 2102, 2104, 2106, 2108 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2110.

Although the distributed system 2100 illustrated in FIG. 21 is shown with four client computing devices, any number of client computing devices may be supported. Other devices, such as devices with sensors, etc., may interact with the server 2112.

Network(s) 2110 in the distributed system 2100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 2110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 2112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 2112 can include one or more virtual machines running virtual operating systems, or other computing architectures involving virtualization. One or more flexible pools of logical storage devices can be virtualized to maintain virtual storage devices for the server. Virtual networks can be controlled by the server 2112 using software defined networking. In various examples, the server 2112 may be adapted to run one or more services or software applications described in the foregoing disclosure. For example, the server 2112 may correspond to a server for performing processing as described above.

The server 2112 may run an operating system including any of those discussed above, as well as any commercially available server operating system. The server 2112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 2112 may include one or more applications to analyze and consolidate data feeds and/or event updates received from users of the client computing devices 2102, 2104, 2106, 2108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 2112 may also include one or more applications to display the data feeds and/or real-time events via one or more display devices of the client computing devices 2102, 2104, 2106, 2108.

The distributed system 2100 may also include one or more databases 2114, 2116. These databases may provide a mechanism for storing information such as user interaction information, usage patterns information, adaptation rules information, and other information used by the various examples discussed above. The databases 2114, 2116 may reside in a variety of locations. By way of example, one or more of the databases 2114, 2116 may reside on a non-transitory storage medium local to (and/or resident in) the server 2112. Alternatively, the databases 2114, 2116 may be remote from the server 2112 and in communication with the server 2112 via a network-based or dedicated connection. In some examples, the databases 2114, 2116 may reside in a storage-area network (SAN). Similarly, any necessary files for performing the functions attributed to the server 2112 may be stored locally on the server 2112 and/or remotely, as appropriate. In some examples, the databases 2114, 2116 may include relational databases, such as databases provided by Oracle that are adapted to store, update, and retrieve data in response to SQL-formatted commands.

Figure 22:
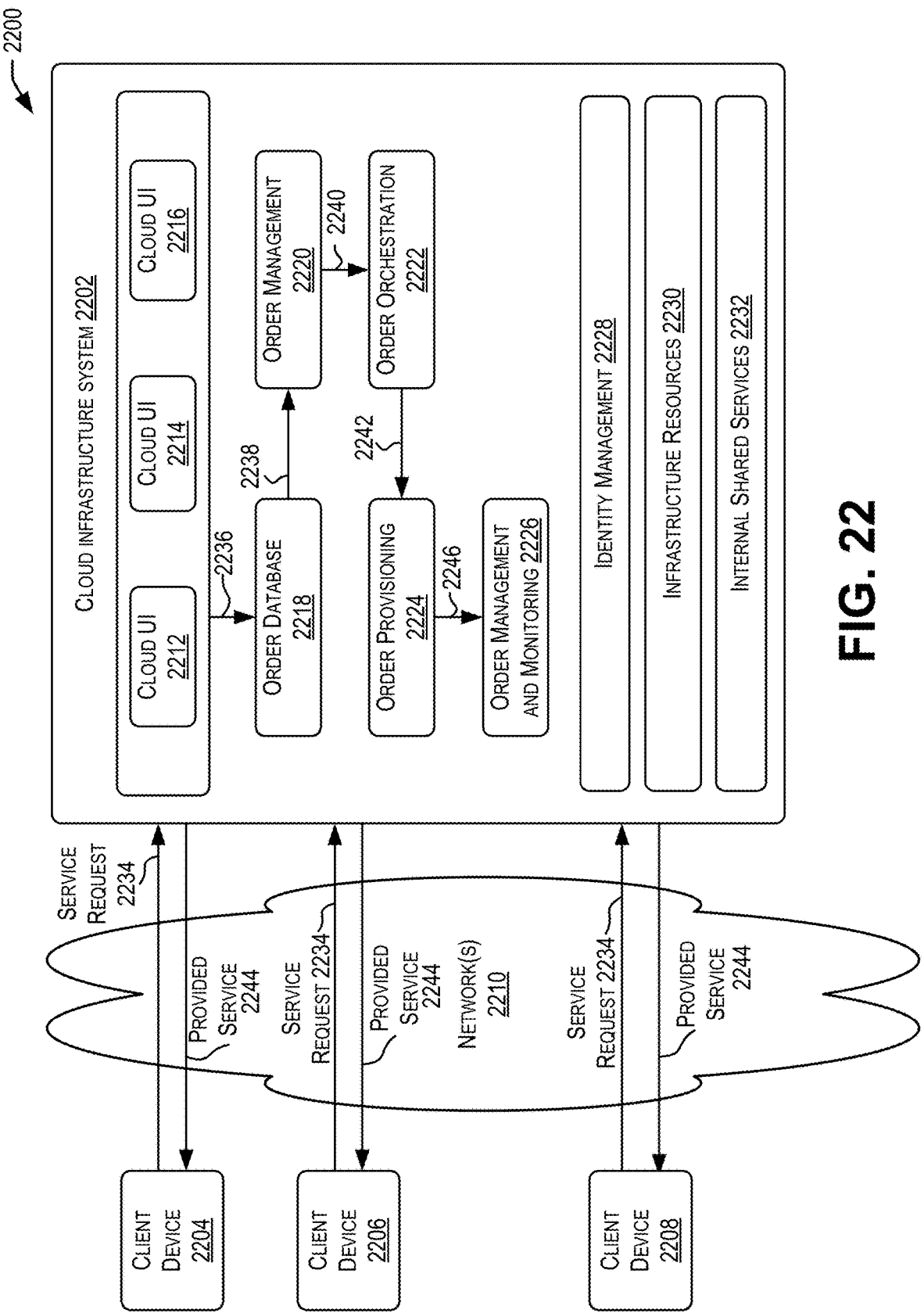
FIG. 22 is a simplified block diagram of one or more components of a system environment.

In some examples, a cloud environment may provide one or more services. FIG. 22 is a simplified block diagram of one or more components of a system environment 2200 in which services may be offered as a cloud. In the example illustrated in in FIG. 22, the system environment 2200 includes one or more client computing devices 2204, 2206, 2208 that may be used by users to interact with a cloud infrastructure system 2202 that provides cloud services. The cloud infrastructure system 2202 may comprise one or more computers and/or servers that may include those described above for the server 2112 of FIG. 21.

It should be appreciated that the cloud infrastructure system 2202 depicted in FIG. 22 may have other components than those depicted. Further, the example shown in FIG. 22 is only one example of a cloud infrastructure system that may incorporate the various examples discussed above. In some examples, the cloud infrastructure system 2202 may have more or fewer components than shown in the figure, may combine two or more components, or may have a different configuration or arrangement of components.

The client computing devices 2204, 2206, 2208 may be devices similar to those described above for the client computing devices 2102, 2104, 2106, 2108. The client computing devices 2204, 2206, 2208 may be configured to operate a client application such as a web browser, a proprietary client application (e.g., Oracle Forms), or some other application, which may be used by a user of the client computing device to interact with the cloud infrastructure system 2202 to use services provided by the cloud infrastructure system 2202. Although the example system environment 2200 is shown with three client computing devices, any number of client computing devices may be supported. Other devices such as devices with sensors, etc. may interact with the cloud infrastructure system 2202.

Network(s) 2210 may facilitate communications and exchange of data between the client computing devices 2204, 2206, 2208 and the cloud infrastructure system 2202. Each network may be any type of network familiar to those skilled in the art that can support data communications using any of a variety of commercially-available protocols, including those described above for the network(s) 2110 of FIG. 21.

In some examples, services provided by the cloud infrastructure system 2202 of FIG. 22 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In some examples, a specific instantiation of a service provided by the cloud infrastructure system 2202 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In some examples, the cloud infrastructure system 2202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

The cloud infrastructure system 2202 may also provide "big data" and related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various examples, the cloud infrastructure system 2202 may be adapted to automatically provision, manage and track a customer's subscription to services offered by the cloud infrastructure system 2202. The cloud infrastructure system 2202 may provide the cloud services via different deployment models. For example, services may be provided under a public cloud model in which the cloud infrastructure system 2202 is owned by an organization selling cloud services (e.g., owned by Oracle Corporation) and the services are made available to the general public or different industry enterprises. As another example, services may be provided under a private cloud model in which the cloud infrastructure system 2202 is operated solely for a single organization and may provide services for one or more entities within the organization. The cloud services may also be provided under a community cloud model in which the cloud infrastructure system 2202 and the services provided by the cloud infrastructure system 2202 are shared by several organizations in a related community. The cloud services may also be provided under a hybrid cloud model, which is a combination of two or more different models.

In some examples, the services provided by the cloud infrastructure system 2202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by the cloud infrastructure system 2202. The cloud infrastructure system 2202 then performs processing to provide the services in the customer's subscription order.

In some examples, the services provided by the cloud infrastructure system 2202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can use applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some examples, platform services may be provided by cloud infrastructure system 2202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some examples, platform services provided by the cloud infrastructure system may include database cloud services, middleware cloud services (e.g., Oracle Fusion Middleware services), and Java cloud services. In one example, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In some examples, the cloud infrastructure system 2202 may also include infrastructure resources 2230 for providing the resources used to provide various services to customers of the cloud infrastructure system. In one example, the infrastructure resources 2230 may include pre-integrated and optimized combinations of hardware, such as servers, storage, and networking resources to execute the services provided by the PaaS platform and the SaaS platform, and other resources.

In some examples, resources in the cloud infrastructure system 2202 may be shared by multiple users and dynamically re-allocated per demand. Additionally, resources may be allocated to users in different time zones. For example, the cloud infrastructure system 2202 may enable a first set of users in a first time zone to utilize resources of the cloud infrastructure system for a specified number of hours and then enable the re-allocation of the same resources to another set of users located in a different time zone, thereby maximizing the utilization of resources.

In some examples, a number of internal shared services 2232 may be provided that are shared by different components or modules of the cloud infrastructure system 2202 to enable provision of services by the cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In some examples, the cloud infrastructure system 2202 may provide comprehensive management of cloud services (e.g., SaaS, PaaS, and IaaS services) in the cloud infrastructure system. In one example, cloud management functionality may include capabilities for provisioning, managing and tracking a customer's subscription received by the cloud infrastructure system 2202, and the like.

In one example, as depicted in FIG. 22, cloud management functionality may be provided by one or more modules, such as an order management module 2220, an order orchestration module 2222, an order provisioning module 2224, an order management and monitoring module 2226, and an identity management module 2228. These modules may include or be provided using one or more computers and/or servers, which may be general purpose computers, specialized server computers, server farms, server clusters, or any other appropriate arrangement and/or combination.

In an example operation, at step 2234, a customer using a client device, such as the client computing devices 2204, 2206, 2208, may interact with the cloud infrastructure system 2202 by requesting one or more services provided by the cloud infrastructure system 2202 and placing an order for a subscription for one or more services offered by the cloud infrastructure system 2202. In some examples, the customer may access a cloud User Interface (UI) such as a first cloud UI 2212, a second cloud UI 2214, and/or a third cloud UI 2216 and place a subscription order via these UIs. The order information received by the cloud infrastructure system 2202 in response to the customer placing an order may include information identifying the customer and one or more services offered by the cloud infrastructure system 2202 that the customer intends to subscribe to.

At step 2236, the order information received from the customer may be stored in an order database 2218. If this is a new order, a new record may be created for the order. In one example, the order database 2218 can be one of several databases operated by the cloud infrastructure system 2202 and operated in conjunction with other system elements.

At step 2238, the order information may be forwarded to an order management module 2220 that may be configured to perform billing and accounting functions related to the order, such as verifying the order, and upon verification, booking the order.

At step 2240, information regarding the order may be communicated to an order orchestration module 2222 that is configured to orchestrate the provisioning of services and resources for the order placed by the customer. In some instances, the order orchestration module 2222 may use the services of the order provisioning module 2224 for the provisioning. In some examples, the order orchestration module 2222 enables the management of business processes associated with each order and applies business logic to determine whether an order should proceed to provisioning.

As shown in the example depicted in FIG. 22, at step 2242, upon receiving an order for a new subscription, the order orchestration module 2222 sends a request to the order provisioning module 2224 to allocate resources and configure resources needed to fulfill the subscription order. The order provisioning module 2224 enables the allocation of resources for the services ordered by the customer. The order provisioning module 2224 provides a level of abstraction between the cloud services provided by the cloud infrastructure system 2202 and the physical implementation layer that is used to provision the resources for providing the requested services. This enables the order orchestration module 2222 to be isolated from implementation details, such as whether or not services and resources are actually provisioned on the fly or pre-provisioned and only allocated/assigned upon request.

At step 2244, once the services and resources are provisioned, a notification may be sent to the subscribing customers indicating that the requested service is now ready for use. In some instance, information (e.g. a link) may be sent to the customer that enables the customer to start using the requested services.

At step 2246, a customer's subscription order may be managed and tracked by an order management and monitoring module 2226. In some instances, the order management and monitoring module 2226 may be configured to collect usage statistics regarding a customer use of subscribed services. For example, statistics may be collected for the amount of storage used, the amount data transferred, the number of users, and the amount of system up time and system down time, and the like.

In some examples, the cloud infrastructure system 2200 may include an identity management module 2228 that is configured to provide identity services, such as access management and authorization services in the cloud infrastructure system 2200. In some examples, the identity management module 2228 may control information about customers who wish to use the services provided by the cloud infrastructure system 2202. Such information can include information that authenticates the identities of such customers and information that describes which actions those customers are authorized to perform relative to various system resources (e.g., files, directories, applications, communication ports, memory segments, etc.). The identity management module 2228 may also include the management of descriptive information about each customer and about how and by whom that descriptive information can be accessed and modified.

Figure 23:
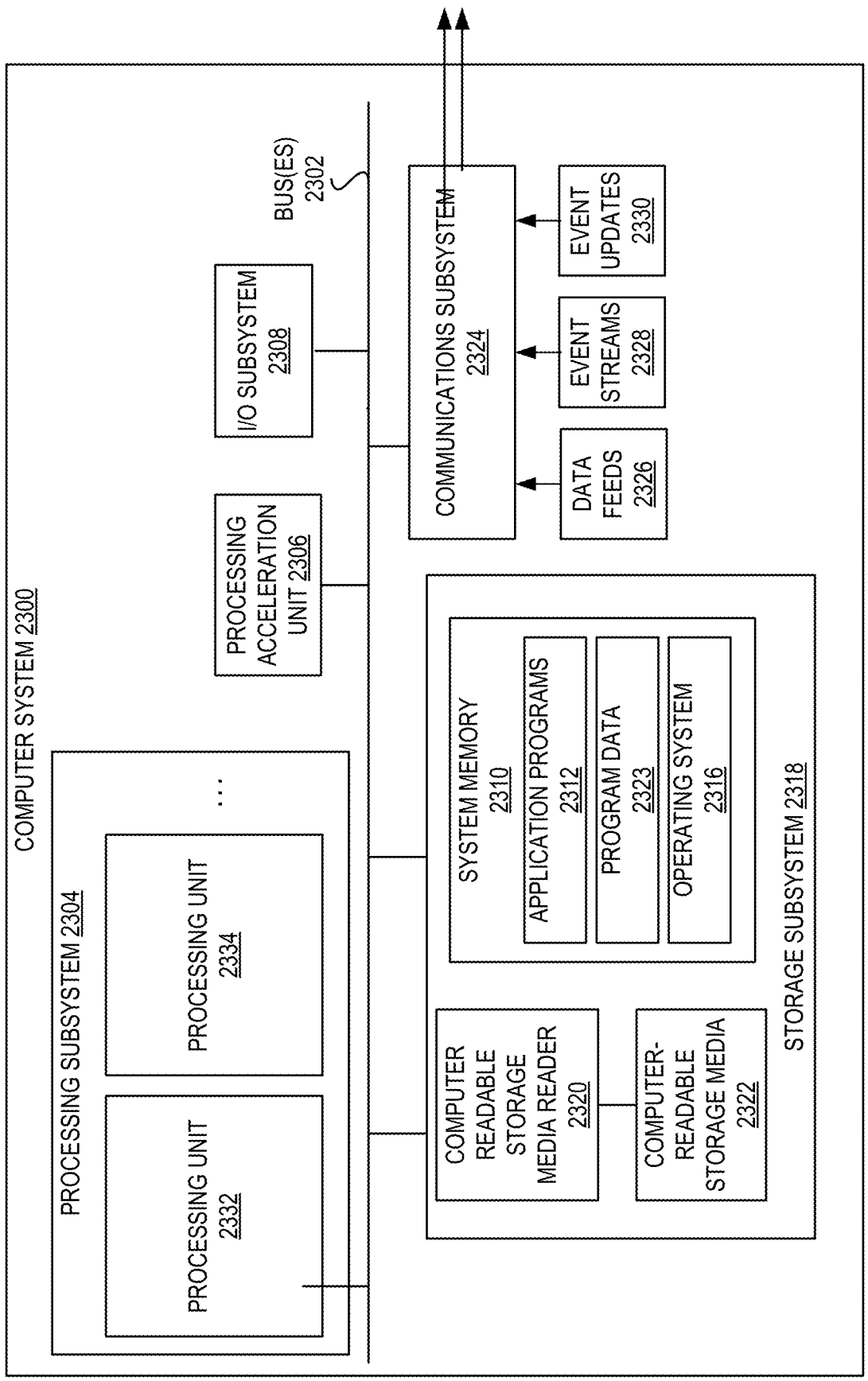
FIG. 23 illustrates an example of a computer system that may be used to implement the various examples discussed herein.

FIG. 23 illustrates an example of a computer system 2300 that may be used to implement the various examples discussed above. In some examples, the computer system 2300 may be used to implement any of the various servers and computer systems described above. As shown in FIG. 23, the computer system 2300 includes various subsystems including a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. The storage subsystem 2318 may include tangible computer-readable storage media 2322 and a system memory 2310.

The bus subsystem 2302 provides a mechanism for letting the various components and subsystems of the computer system 2300 communicate with each other as intended. Although the bus subsystem 2302 is shown schematically as a single bus, alternate examples of the bus subsystem may utilize multiple buses. The bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 2304 controls the operation of the computer system 2300 and may comprise one or more processing units 2332, 2334. A processing unit may include one or more processors, including single core or multicore processors, one or more cores of processors, or combinations thereof. In some examples, the processing subsystem 2304 can include one or more special purpose co-processors such as graphics processors, digital signal processors (DSPs), or the like. In some examples, some or all of the processing units of the processing subsystem 2304 can be implemented using customized circuits, such as application specific integrated circuits (ASICs), or field programmable gate arrays (FPGAs).

In some examples, the processing units in the processing subsystem 2304 can execute instructions stored in the system memory 2310 or on the computer readable storage media 2322. In various examples, the processing units can execute a variety of programs or code instructions and can maintain multiple concurrently executing programs or processes. At any given time, some or all of the program code to be executed can be resident in the system memory 2310 and/or on the computer-readable storage media 2322 including potentially on one or more storage devices. Through suitable programming, the processing subsystem 2304 can provide various functionalities.

In some examples, a processing acceleration unit 2306 may be provided for performing customized processing or for off-loading some of the processing performed by the processing subsystem 2304 so as to accelerate the overall processing performed by the computer system 2300.

The I/O subsystem 2308 may include devices and mechanisms for inputting information to the computer system 2300 and/or for outputting information from or via the computer system 2300. In general, use of the term "input device" is intended to include all possible types of devices and mechanisms for inputting information to the computer system 2300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 2318 provides a repository or data store for storing information that is used by the computer system 2300. The storage subsystem 2318 provides a tangible non-transitory computer-readable storage medium for storing the basic programming and data constructs that provide the functionality of some examples. Software (programs, code modules, instructions) that when executed by the processing subsystem 2304 provide the functionality described above may be stored in the storage subsystem 2318. The software may be executed by one or more processing units of the processing subsystem 2304. The storage subsystem 2318 may also provide a repository for storing data used in accordance with the present disclosure.

The storage subsystem 2318 may include one or more non-transitory memory devices, including volatile and non-volatile memory devices. As shown in FIG. 23, the storage subsystem 2318 includes a system memory 2310 and a computer-readable storage media 2322. The system memory 2310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 2300, such as during start-up, may typically be stored in the ROM. The RAM typically contains data and/or program modules that are presently being operated and executed by the processing subsystem 2304. In some implementations, the system memory 2310 may include multiple different types of memory, such as static random access memory (SRAM) or dynamic random access memory (DRAM).

By way of example, and not limitation, as depicted in FIG. 23, the system memory 2310 may store application programs 2312, which may include client applications, Web browsers, mid-tier applications, relational database management systems (RDBMS), etc., program data 2323, and an operating system 2316. By way of example, the operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 2322 may store programming and data constructs that provide the functionality of some examples. Software (programs, code modules, instructions) that when executed by the processing subsystem 2304, a processor provides the functionality described above that may be stored in the storage subsystem 2318. By way of example, the computer-readable storage media 2322 may include non-volatile memory such as a hard disk drive, a magnetic disk drive, an optical disk drive such as a CD ROM, DVD, a Blu-Ray® disk, or other optical media. The computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable media 2322 may provide storage of computer-readable instructions, data structures, program modules, and other data for the computer system 2300.

In some examples, the storage subsystem 2318 may also include a computer-readable storage media reader 2320 that can further be connected to the computer-readable storage media 2322. Together and, optionally, in combination with the system memory 2310, the computer-readable storage media 2322 may comprehensively represent remote, local, fixed, and/or removable storage devices plus storage media for storing computer-readable information.

In some examples, the computer system 2300 may provide support for executing one or more virtual machines. The computer system 2300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by the computer system 2300. Accordingly, multiple operating systems may potentially be run concurrently by the computer system 2300. Each virtual machine generally runs independently of the other virtual machines.

The communications subsystem 2324 provides an interface to other computer systems and networks. The communications subsystem 2324 serves as an interface for receiving data from and transmitting data to other systems from the computer system 2300. For example, the communications subsystem 2324 may enable the computer system 2300 to establish a communication channel to one or more client computing devices via the Internet for receiving and sending information from and to the client computing devices.

The communication subsystem 2324 may support both wired and/or wireless communication protocols. For example, in some examples, the communications subsystem 2324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 2324 can provide wired network connectivity (e.g., Ethernet) in addition to or instead of a wireless interface.

The communication subsystem 2324 can receive and transmit data in various forms. For example, in some examples, the communications subsystem 2324 may receive input communication in the form of structured and/or unstructured data feeds 2326, event streams 2328, event updates 2330, and the like. For example, the communications subsystem 2324 may be configured to receive (or send) data feeds 2326 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 2324 may be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

The communications subsystem 2324 may also be configured to output the structured and/or unstructured data feeds 2326, event streams 2328, event updates 2330, and the like to one or more databases that may be in communication with one or more streaming data source computers coupled to the computer system 2300.

The computer system 2300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 2300 depicted in FIG. 23 is intended only as a specific example. Many other configurations having more or fewer components than the system depicted in FIG. 23 are possible. Based on the disclosure and teachings provided herein, a person of ordinary skill in the art will appreciate other ways and/or methods to implement the various examples.

Although specific implementations have been described, various modifications, alterations, alternative constructions, and equivalents are also encompassed within the scope of the present disclosure. The modifications include any relevant combination of the disclosed features. Implementations described in the present disclosure are not restricted to operation within certain specific data processing environments, but are free to operate within a plurality of data processing environments. Additionally, although implementations described in the present disclosure have been described using a particular series of transactions and steps, it should be apparent to those skilled in the art that the scope of the present disclosure is not limited to the described series of transactions and steps. Various features and aspects of the above-described implementations may be used individually or jointly.

Further, while implementations described in the present disclosure have been described using a particular combination of hardware and software, it should be recognized that other combinations of hardware and software are also within the scope of the present disclosure. Implementations described in the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific implementations have been described, these are not intended to be limiting. Various modifications and equivalents are within the scope of the following claims.

What is claimed is:

1. A computer-implemented method, comprising, at a computer system of a security management system:
   obtaining activity data from a service provider system, wherein the activity data describes actions performed during use of a cloud service over a period of time, wherein the actions are performed by one or more users associated with a tenant, wherein the service provider system provides the tenant with a tenant account, and wherein the tenant account enables the one or more users to access the cloud service;
   identifying a pattern in the activity data, wherein the pattern corresponds to a set of actions performed over a subset of time during the period of time;
   generating or updating a plurality of models associated with the cloud service, wherein:
      each of the plurality of models is trained using the pattern such that each of the plurality of models is trained to recognize the pattern; and
      each of the plurality of models is generated using a different type of machine learning algorithm, such that each of the plurality of models is trained to recognize the pattern in a different way;
   obtaining additional activity data from the service provider system;
   processing the additional activity data using each of the plurality of models to generate a plurality of results, wherein each of the plurality of results indicates whether a corresponding model in the plurality of models identified the pattern in the additional activity data;
   determining whether the additional activity data includes the pattern by combining the plurality of results from the plurality of models; and
   outputting the set of actions and an indicator that identifies the set of actions as anomalous in response to a determination that the additional activity data does not include the pattern.

2. The computer-implemented method of claim 1, wherein identifying the pattern includes mapping the activity data according a set of usage levels associated with the cloud service, and wherein mapping the activity data produces normalized activity data.

3. The computer-implemented method of claim 1, wherein identifying the pattern includes using a sliding window to identify local maxima in the activity data, and wherein the pattern includes a local maximum.

4. The computer-implemented method of claim 1, further comprising:
   determining that a set of patterns in the activity data are similar; and
   generating a combined pattern by combining the set of patterns.

5. The computer-implemented method of claim 1, further comprising:
   generating a model in the plurality of models using a machine learning program, wherein the model is generated using a plurality of patterns determined from the activity data.

6. The computer-implemented method of claim 1, wherein outputting the set of actions is based on the set of actions not corresponding to a majority of the plurality of models.

7. The computer-implemented method of claim 1, wherein each model from the plurality of models is associated with a weight, and wherein whether the set of actions does not correspond to a model from the plurality of models is determined by the weight associated with the model.

8. The computer-implemented method of claim 1, wherein outputting the set of actions is based on the set of actions not corresponding to at least one model from the plurality of models.

9. A computing system, comprising:
   one or more processors; and
   one or more memory devices comprising instructions that, when executed by the one or more processors, cause the one or more processors to perform operations comprising:
      obtaining activity data from a service provider system, wherein the activity data describes actions performed during use of a cloud service over a period of time, wherein the actions are performed by one or more users associated with a tenant, wherein the service provider system provides the tenant with a tenant account, and wherein the tenant account enables the one or more users to access the cloud service;
      identifying a pattern in the activity data, wherein the pattern corresponds to a set of actions performed over a subset of time during the period of time;
      generating or updating a plurality of models associated with the cloud service, wherein:
         each of the plurality of models is trained using the pattern such that each of the plurality of models is trained to recognize the pattern; and
         each of the plurality of models is generated using a different type of machine learning algorithm, such that each of the plurality of models is trained to recognize the pattern in a different way;
      obtaining additional activity data from the service provider system;
      processing the additional activity data using each of the plurality of models to generate a plurality of results, wherein each of the plurality of results indicates whether a corresponding model in the plurality of models identified the pattern in the additional activity data;
      determining whether the additional activity data includes the pattern by combining the plurality of results from the plurality of models; and
      outputting the set of actions and an indicator that identifies the set of actions as anomalous in response to a determination that the additional activity data does not include the pattern.

10. The computing system of claim 9, wherein the operations further comprise:
   identifying the pattern as a precursor to a second pattern, where occurrence of the pattern is an indicator that the second pattern is expected to occur;
   in response to a determination that the additional activity data includes the pattern, processing the additional activity data using each of a second plurality of models to generate a second plurality of results indicating whether a corresponding model in the second plurality of models identify the second pattern in the additional activity data;

determining whether the additional activity data includes the second pattern by combining the second plurality of results from the second plurality of models; and outputting the set of actions as the indicator that identifies the set of actions as anomalous in response to a determination that the additional activity data does not include the second pattern.

11. The computing system of claim 9, wherein generating or updating the plurality of models comprises:

for a first model in the plurality of models, establishing weights of a neural network using the pattern;

for a second model in the plurality of models, determining tests to be performed at each node of a tree structure; and for a third model in the plurality of models, training a Bayesian network.

12. The computing system of claim 9, wherein the operations further comprise:

identifying an activity in the activity data;

generating mapping data for the activity;

identifying one or more active events in the activity using the mapping data;

identifying the pattern in the one or more active events;

identifying a precursor pattern for the pattern in the activity data; and determining a classification of the pattern based on a combination of the pattern and the precursor pattern.

13. The computing system of claim 9, wherein the operations further comprise:

generating a risk score for the set of actions indicating a degree of risk associated with the set of actions and indicating a likelihood that the set of actions poses a risk to the cloud service.

14. The computing system of claim 9, wherein the operations further comprise:

outputting one or more users who performed the set of actions, one or more devices from which the set of actions were initiated, an application or resource affected by the set of actions, and a time period during which the set of actions occurred.

15. A non-transitory computer-readable medium comprising instructions that, when executed by one or more processors, cause the one or more processors to perform operations comprising:

obtaining activity data from a service provider system, wherein the activity data describes actions performed during use of a cloud service over a period of time, wherein the actions are performed by one or more users associated with a tenant, wherein the service provider system provides the tenant with a tenant account, and wherein the tenant account enables the one or more users to access the cloud service;

identifying a pattern in the activity data, wherein the pattern corresponds to a set of actions performed over a subset of time during the period of time;

generating or updating a plurality of models associated with the cloud service, wherein:

each of the plurality of models is trained using the pattern such that each of the plurality of models is trained to recognize the pattern; and each of the plurality of models is generated using a different type of machine learning algorithm, such that each of the plurality of models is trained to recognize the pattern in a different way;

obtaining additional activity data from the service provider system;

processing the additional activity data using each of the plurality of models to generate a plurality of results, wherein each of the plurality of results indicates whether a corresponding model in the plurality of models identified the pattern in the additional activity data;

determining whether the additional activity data includes the pattern by combining the plurality of results from the plurality of models; and outputting the set of actions and an indicator that identifies the set of actions as anomalous in response to a determination that the additional activity data does not include the pattern.

16. The non-transitory computer-readable medium of claim 15, wherein each entry in the activity data comprises actions taken with respect to the cloud service, a resource affected by the set of actions, a user identifier for a user who performed the set of actions, and a time associated with the set of actions.

17. The non-transitory computer-readable medium of claim 15, wherein the pattern comprises a routine behavior of users of the cloud service.

18. The non-transitory computer-readable medium of claim 15, wherein the pattern is associated with a set of actions performed by a group of users having a same user type.

19. The non-transitory computer-readable medium of claim 15, wherein determining whether the additional activity data includes the pattern by combining the plurality of results from the plurality of models comprises applying an ensemble learning technique to combine the plurality of results.

20. The non-transitory computer-readable medium of claim 19, wherein the ensemble learning technique comprises boosting, bootstrap aggregating, or ensemble averaging.

* * * * *

UNITED STATES PATENT AND TRADEMARK OFFICE
CERTIFICATE OF CORRECTION

PATENT NO. : 11,165,800 B2
APPLICATION NO. : 15/989815
DATED : November 2, 2021
INVENTOR(S) : Thampy Page 1 of 2

It is certified that error appears in the above-identified patent and that said Letters Patent is hereby corrected as shown below:

In the Drawings

On sheet 19 of 24, in FIG. 18, under Reference Numeral 1812, Line 1, delete "PRECRUSOR" and insert -- PRECURSOR --, therefor.

On sheet 19 of 24, in FIG. 18, under Reference Numeral 1814, Line 3, delete "CORREPRECURSOR" and insert -- PRECURSOR --, therefor.

In the Specification

In Column 21, under TABLE 2, Line 8, delete "ipad etc)" and insert -- ipad, etc.) --, therefor.

In Column 27, Line 53, after "off" insert -- . --.

In Column 31, Line 55, delete "L1ZScore)" and insert -- L1 ZScore) --, therefor.

In Column 31, Line 55, delete "L2ZScore)" and insert -- L2 ZScore) --, therefor.

In Column 31, Line 56, delete "L3ZScore)" and insert -- L3 ZScore) --, therefor.

In Column 32, Line 46, delete "L1ZScore)" and insert -- L1 ZScore) --, therefor.

In Column 32, Line 46, delete "L2ZScore)" and insert -- L2 ZScore) --, therefor.

In Column 32, Line 47, delete "L3ZScore)" and insert -- L3 ZScore) --, therefor.

In Column 33, Line 61, delete "L1ZScore)" and insert -- L1 ZScore) --, therefor.

In Column 33, Line 61, delete "L2ZScore)" and insert -- L2 ZScore) --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,165,800 B2

In Column 33, Line 62, delete "L3ZScore)" and insert -- L3 ZScore) --, therefor.

In Column 34, Line 36, delete "L1ZScore)" and insert -- L1 ZScore) --, therefor.

In Column 36, Line 36, delete "L2ZScore)" and insert -- L2 ZScore) --, therefor.

In Column 34, Line 37, delete "L3ZScore)" and insert -- L3 ZScore) --, therefor.

In Column 34, Line 65, delete "(Download ounts" and insert -- (Download counts --, therefor.

In Column 35, Line 3, delete "(Download ounts" and insert -- (Download counts --, therefor.

In Column 35, Line 7, delete "(Download ounts" and insert -- (Download counts --, therefor.

In Column 35, Line 13, delete "L1ZScore)" and insert -- L1 ZScore) --, therefor.

In Column 35, Line 13, delete "L2ZScore)" and insert -- L2 ZScore) --, therefor.

In Column 35, Line 14, delete "L3ZScore)" and insert -- L3 ZScore) --, therefor.

In Column 67, Line 36, delete "in in" and insert -- in --, therefor.